April 26, 1960 R. A. KOLPEK 2,934,596

AUTOMATIC TELEGRAPH SWITCHING SYSTEM

Filed Nov. 29, 1956 26 Sheets-Sheet 1

INVENTOR.

Robert A. Kolpek

BY C. A. Gulbrandsen

Atty.

April 26, 1960 R. A. KOLPEK 2,934,596

AUTOMATIC TELEGRAPH SWITCHING SYSTEM

Filed Nov. 29, 1956 26 Sheets-Sheet 2

INVENTOR.
Robert A. Kolpek
BY
C. A. Gulbrandsen
atty.

INVENTOR.
Robert A. Kolpek
BY
C. A. Gullbrandsen
atty.

INVENTOR.
Robert A. Kolpek
BY
C. A. Gulbrandsen
Atty.

INVENTOR.
Robert A. Kolpek
BY
C. A. Gulbrandsen
Atty.

April 26, 1960 R. A. KOLPEK 2,934,596

AUTOMATIC TELEGRAPH SWITCHING SYSTEM

Filed Nov. 29, 1956 26 Sheets-Sheet 6

INVENTOR.
Robert A. Kolpek
BY
C. A. Gulbrandsen
atty.

INVENTOR.
Robert A. Kolpek
BY
C. A. Gulbrandsen
atty.

INVENTOR.
Robert A. Kolpek
BY
C. A. Bullbrandsen
Atty.

INVENTOR.
Robert A. Kolpek
BY
C. A. Gulbrandsen
Atty.

INVENTOR.
Robert A. Kolpek
BY
C. A. Gulbrandsen
atty.

INVENTOR.
Robert A. Kolpek
BY
C. A. Gulbransen
Atty.

INVENTOR.
Robert A. Kolpek
BY
C. A. Gulbrandsen
Atty.

April 26, 1960 R. A. KOLPEK 2,934,596

AUTOMATIC TELEGRAPH SWITCHING SYSTEM

Filed Nov. 29, 1956 26 Sheets-Sheet 13

INVENTOR.
Robert A. Kolpek
BY C. A. Gulbrandsen
Atty.

INVENTOR.
Robert A. Kolpek
BY
C. A. Gulbransen
Atty.

April 26, 1960 R. A. KOLPEK 2,934,596

AUTOMATIC TELEGRAPH SWITCHING SYSTEM

Filed Nov. 29, 1956 26 Sheets-Sheet 15

INVENTOR.
Robert A. Kolpek

BY C. A. Gulbrandsen
Atty.

INVENTOR.
Robert A. Kolpek
BY
C. A. Gulbrandsen
Atty.

April 26, 1960 R. A. KOLPEK 2,934,596

AUTOMATIC TELEGRAPH SWITCHING SYSTEM

Filed Nov. 29, 1956 26 Sheets-Sheet 17

INVENTOR.
Robert A. Kolpek
BY C. A. Gulbrandsen
atty.

April 26, 1960 R. A. KOLPEK 2,934,596

AUTOMATIC TELEGRAPH SWITCHING SYSTEM

Filed Nov. 29, 1956 26 Sheets-Sheet 18

INVENTOR.
Robert A. Kolpek
BY
C. A. Gulbrandsen
atty.

INVENTOR.
Robert A. Kolpek
BY C. A. Gulbrandsen
atty.

INVENTOR.
Robert A. Kolpek
BY
C. A. Gulbrandsen
Atty.

INVENTOR.
Robert A. Kolpek
BY
C. A. Gullbrandsen
Atty.

April 26, 1960 R. A. KOLPEK 2,934,596

AUTOMATIC TELEGRAPH SWITCHING SYSTEM

Filed Nov. 29, 1956 26 Sheets-Sheet 22

INVENTOR.
Robert A. Kolpek
BY
C. A. Gulbrandsen
Atty.

INVENTOR.
Robert A. Kolpek
BY
C. A. Gulbransen
Atty.

April 26, 1960 R. A. KOLPEK 2,934,596

AUTOMATIC TELEGRAPH SWITCHING SYSTEM

Filed Nov. 29, 1956 26 Sheets-Sheet 24

INVENTOR.
Robert A. Kolpek
BY
C. A. Gulbrandsen
atty.

INVENTOR.
Robert A. Kolpek
BY
C. A. Gulbrandsen
atty.

April 26, 1960 R. A. KOLPEK 2,934,596

AUTOMATIC TELEGRAPH SWITCHING SYSTEM

Filed Nov. 29, 1956 26 Sheets-Sheet 26

INVENTOR.
Robert A. Kolpek

BY

C. A. Gulbrandsen Atty.

United States Patent Office 2,934,596

Patented Apr. 26, 1960

2,934,596

AUTOMATIC TELEGRAPH SWITCHING SYSTEM

Robert A. Kolpek, Libertyville, Ill., assignor to General Telephone Laboratories, Incorporated, a corporation of Delaware Application November 29, 1956, Serial No. 625,111

19 Claims. (Cl. 178—2)

The present invention is directed to a multipoint or party line telegraph system and more particularly relates to an arrangement whereby a plurality of telegraph stations having a common connection to a central office or switching center are automatically controlled to permit automatic transmission and reception of messages.

Application Serial No. 625,004, filed jointly by Stiles, Stoffels and Kolpek on November 29, 1956, simultaneously with this application, discloses the details of the type of automatic telegraph switching center or central office apparatus, which may be used with the present invention. That application discloses an arrangement whereby messages are automatically routed through the switching center in accordance with both a precedence indicator or designation and the destination indicated thereon by a routing indicator forming part of the message. In the present invention apparatus is provided whereby any one of a number of stations having a common connection to the central office can transmit a message to the central office, which then processes the message in one of the manners described in the aforementioned application, and which enables any one of the stations to receive messages from the central office over another connection common to the stations. The apparatus is arranged to permit successive stations to transmit to the central office over the first common connection on the basis of the precedence of the message to be transmitted, and is arranged so that only a selected station conforming to the destination of the message can receive a message to be transmitted over the other common connection.

Accordingly, the improvements of the present invention pertain to an arrangement whereby one of a plurality of stations is selected at one time to transmit over a common connection to a central office; one of a plurality of stations corresponding to a message destination is selected at any one time to receive a message from the central office over a common connection; simultaneous transmission can take place to said central office and from said central office over the respective common connections; and incoming messages of low precedence being transmitted to the central office may be interrupted to permit a message of high precedence from one of the stations to be transmitted to the central office.

In addition to the above-noted improvements, other accomplishments of the present invention will be apparent on reading of the following description together with the drawings.

Figure 1 illustrates the arrangement whereby a plurality of stations 1, 2 and 3 are connected over a line 5 to the central office 300 for the purpose of transmitting messages thereto, and are connected over line 6 for the purpose of receiving messages from the central office 300. It should be noted that although lines 5 and 6 are indicated as a continuous physical transmission connection, that in practice the transmission connection may include repeaters, radio and carrier.

Figures 1, 3:
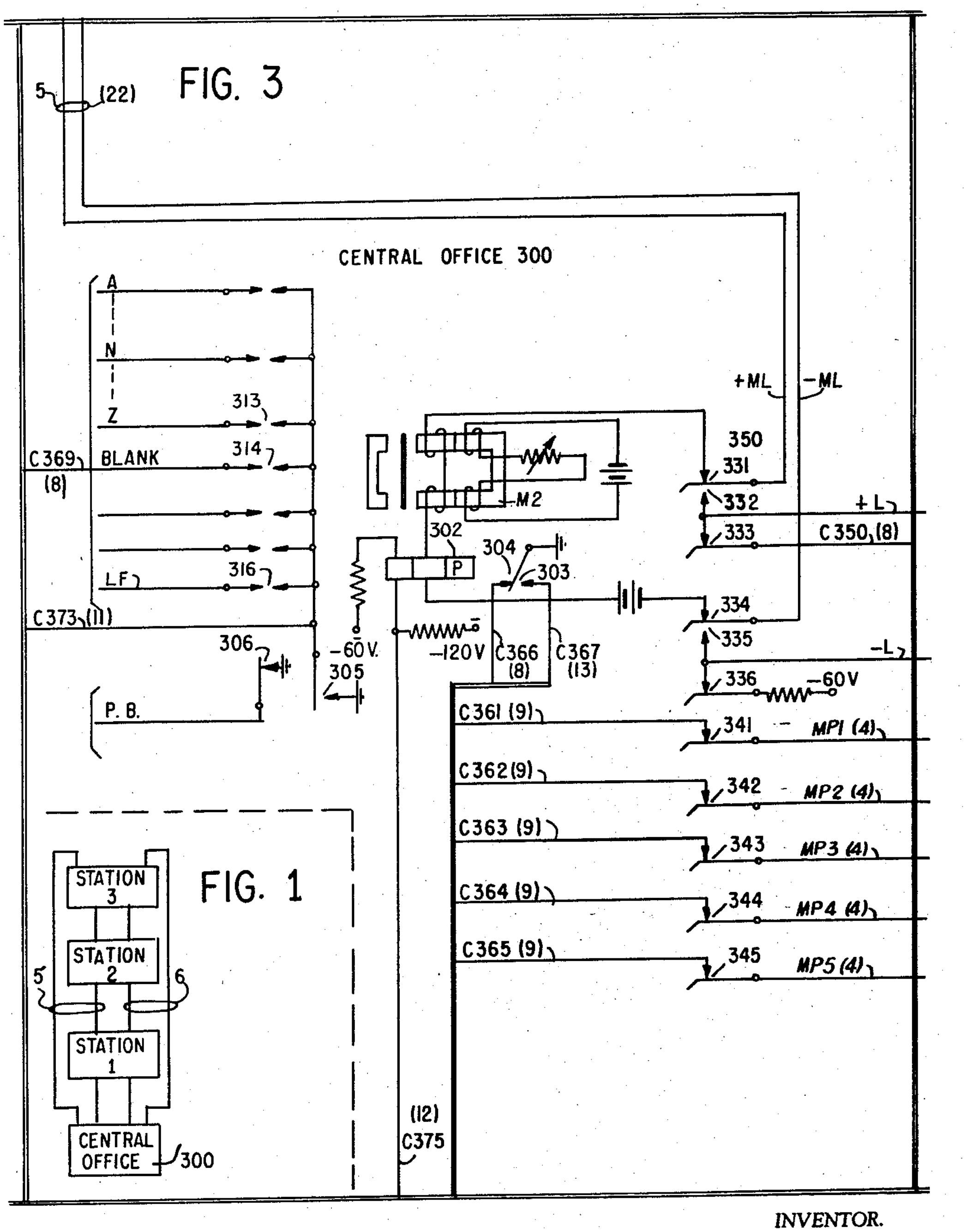
Figure 3 illustrates certain receiving equipment at the central office and associated with line 5, whereby incoming signals may be used for certain control functions.
Figures 2, 4:
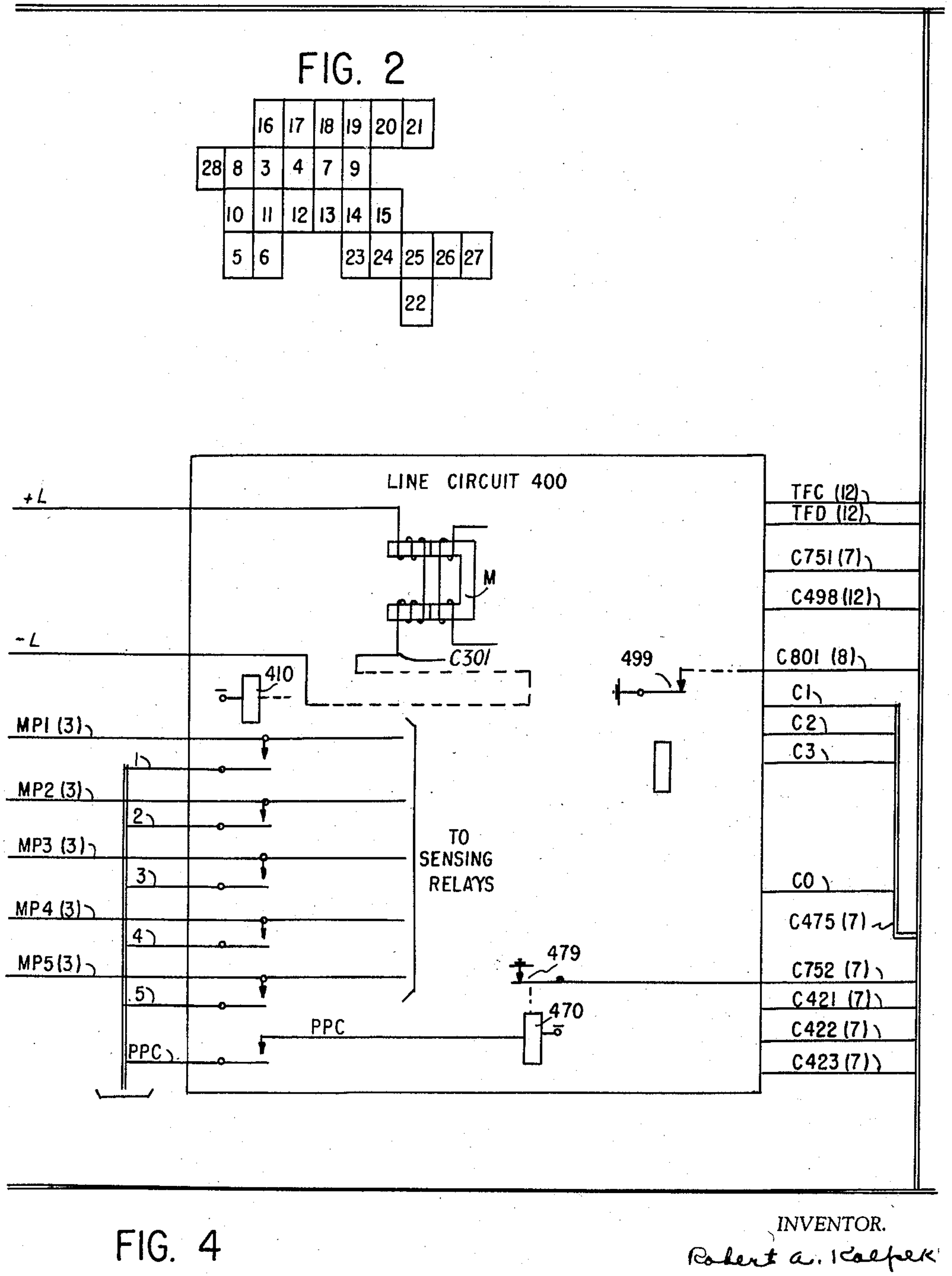
Figure 2 illustrates a manner in which the various figures may be arranged to permit the invention to be most easily comprehended.

Figure 4 indicates largely in block diagram a line circuit 400, which is similar in type to that described in the aforementioned application, and which is adapted to function with the equipment described therein, as will become apparent.

It will be noted that key 350 is provided to enable the line circuit 400 to be used with a single station line as described in the previous application. By operating key 350 contacts 331, 333, 334, 336 and 341–345 are opened, while contacts 332 and 335 close. Opening contacts 331 and 334 disconnects magnet M2 and relay 302 from line 5, while closing contacts 332 and 335 connect reperforator magnet M directly to line 5 so that it can respond directly to incoming signals. In addition opening contacts 333 and 334 disconnects magnet M from the contacts 304 of relay 302. At contacts 341–345 certain sensing relays for permitting a station message number check are disconnected from the line circuit tape reader sensing leads. Additional contacts (not shown) permit a channel number comparator to be operated as described in the aforementioned application.

Figure 5:
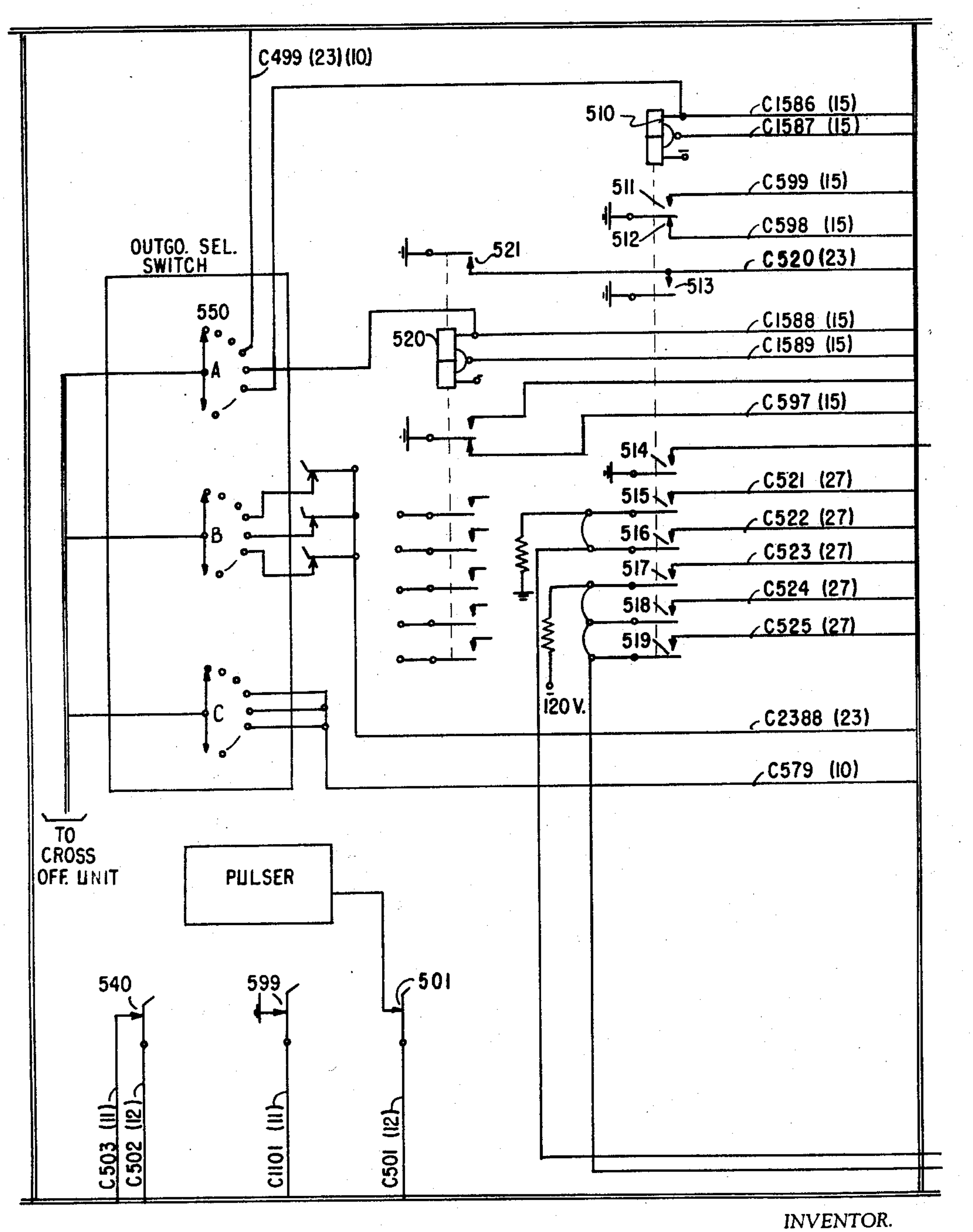

Figure 5 illustrates a portion of an outgoing selector switch 550 associated with a cross office unit and which is operated in a manner described in the aforementioned application to connect to an outgoing channel unit such as 2300. In addition, Figure 5 illustrates certain control relays individual to each station, and utilized in conjunction with channel unit 2300.

Figure 6:
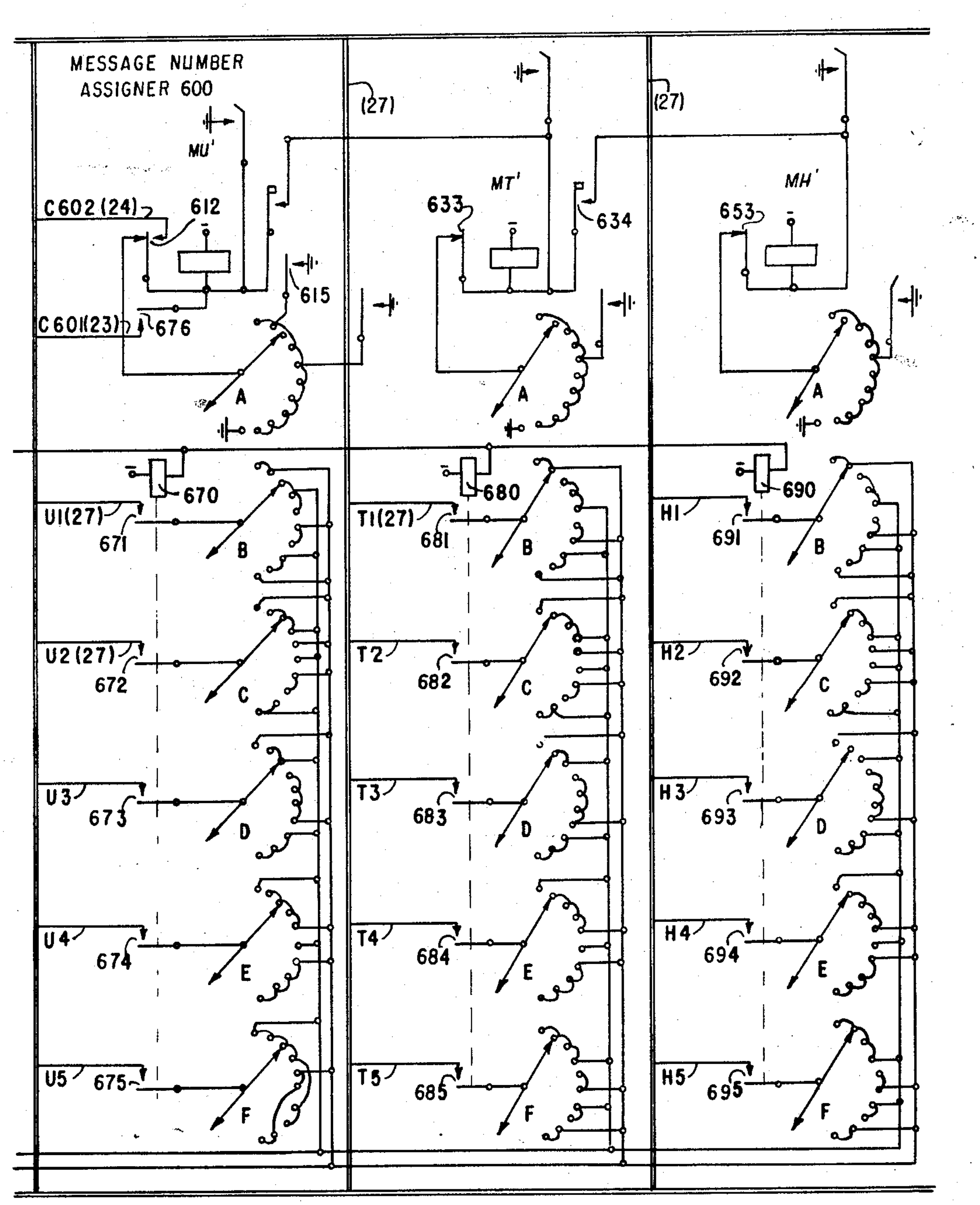

Figure 6 illustrates a message number assigner 600, individual to one station, and used to mark a switch in the channel unit 2300 in accordance with the message number assigned to the message being transmitted to its corresponding station. It is similar in operation and construction to a message number assigner shown in the aforementioned application.

Figure 7:
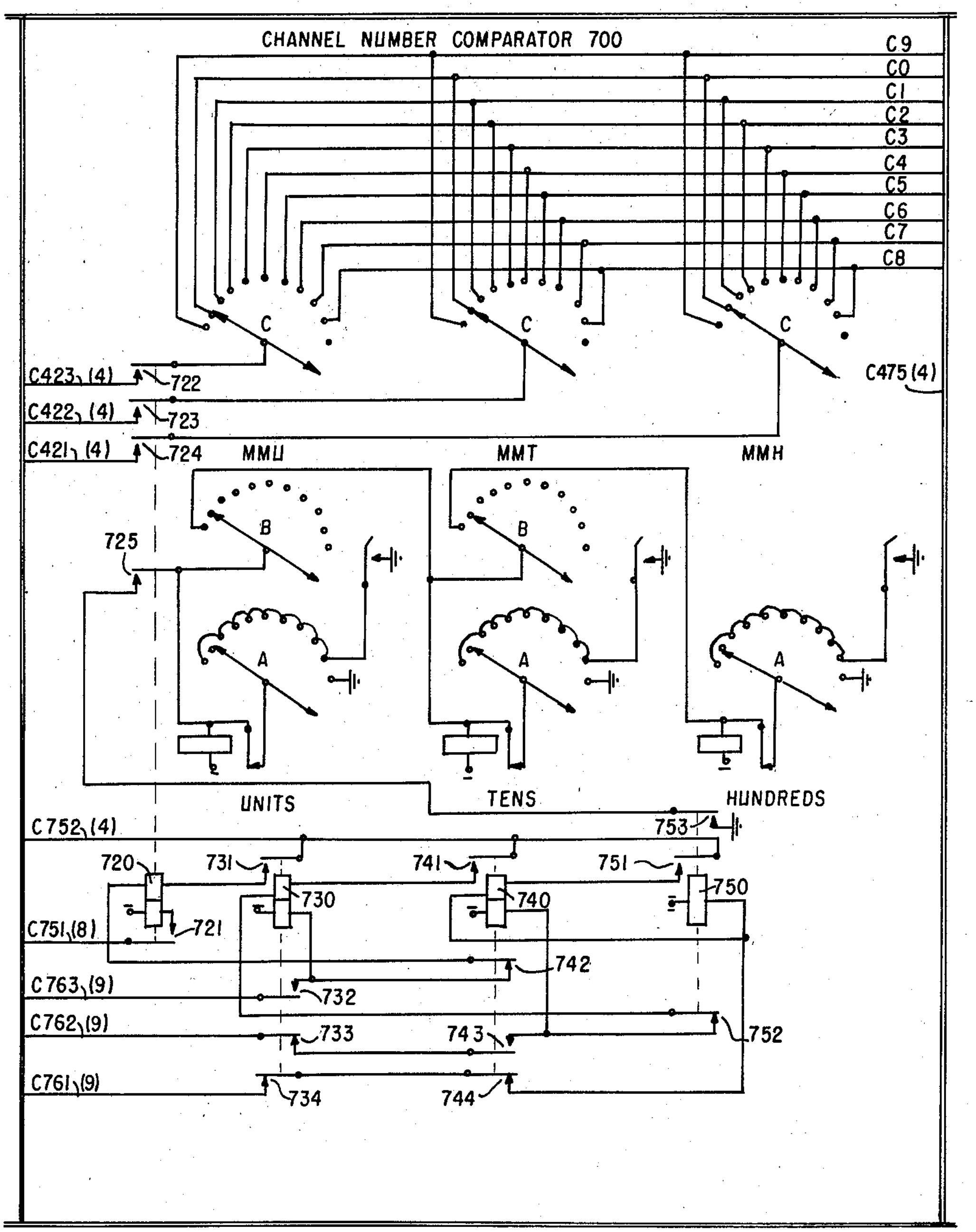

Figure 7 illustrates a channel number comparator 700. It is somewhat similar to the channel number comparator shown in the aforementioned application, however in this arrangement one comparator is provided for each station.

Figure 8:
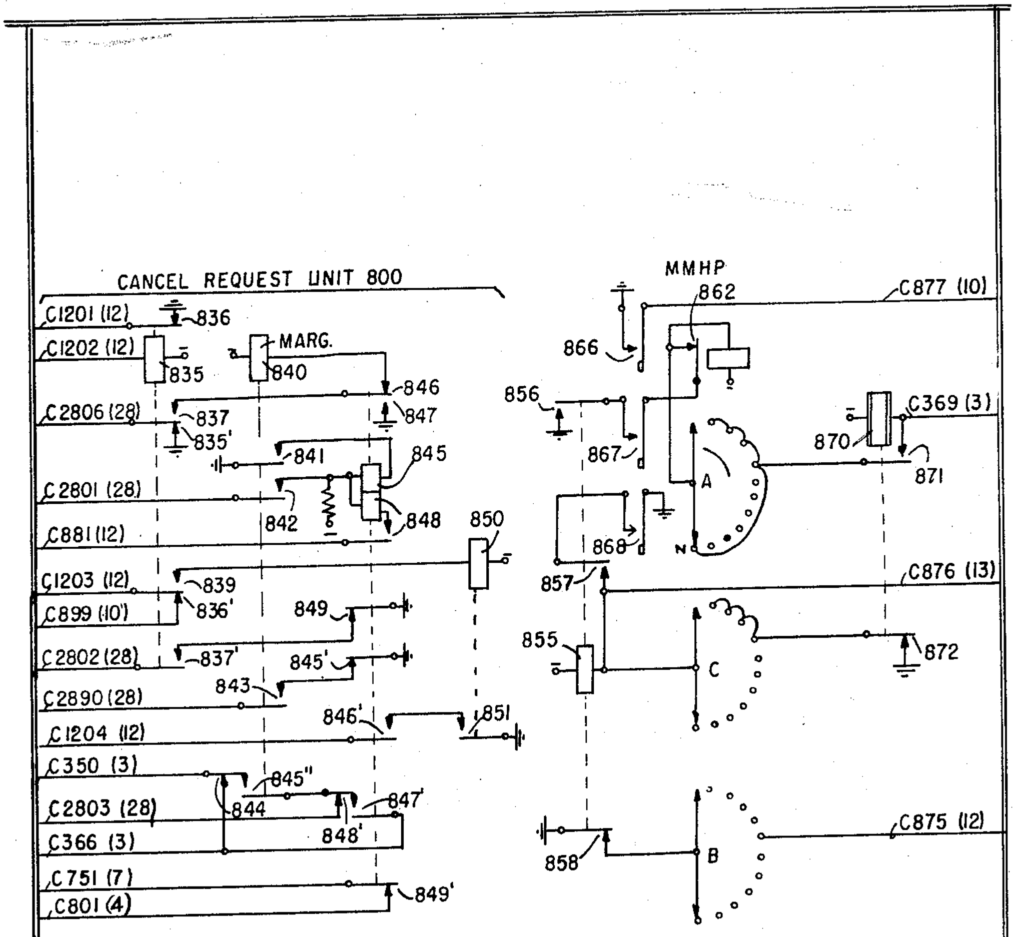

Figure 8 illustrates the cancel request unit 800, which operates responsive to the interruption of a message which is being transmitted to the central office for requesting and controlling the use of the cancel transmission unit 2800.

Figure 9:
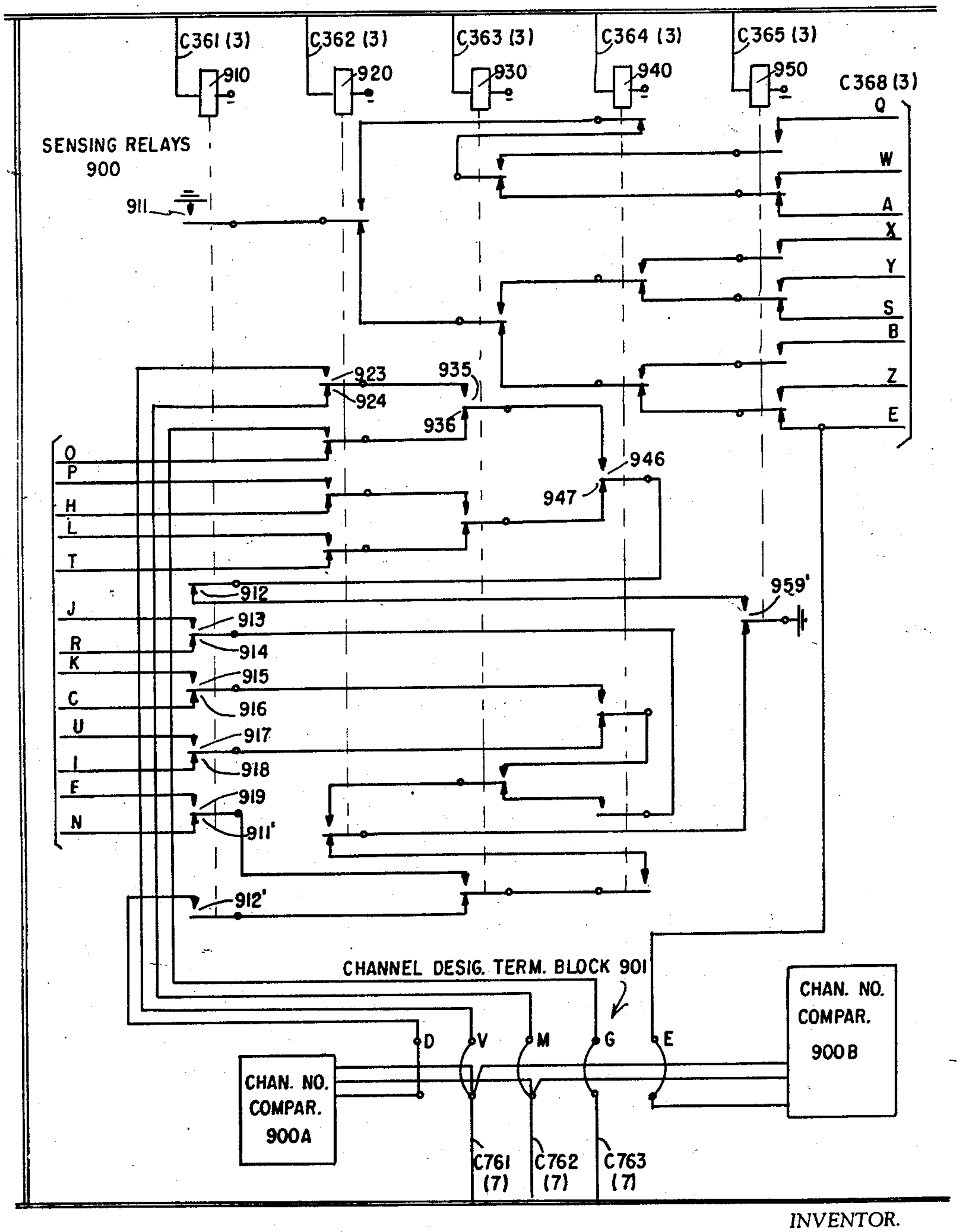
Figure 10:
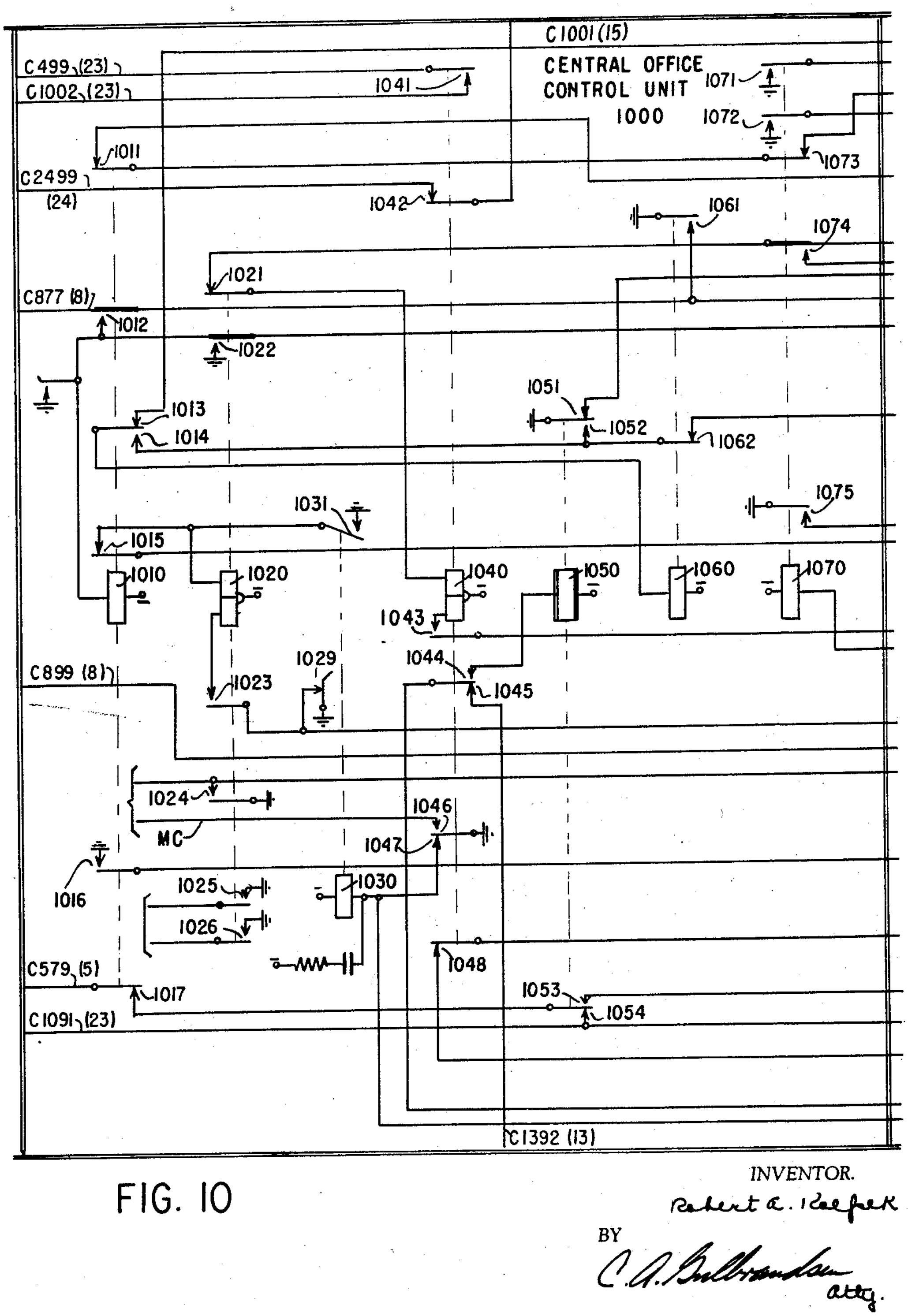
Figure 11:
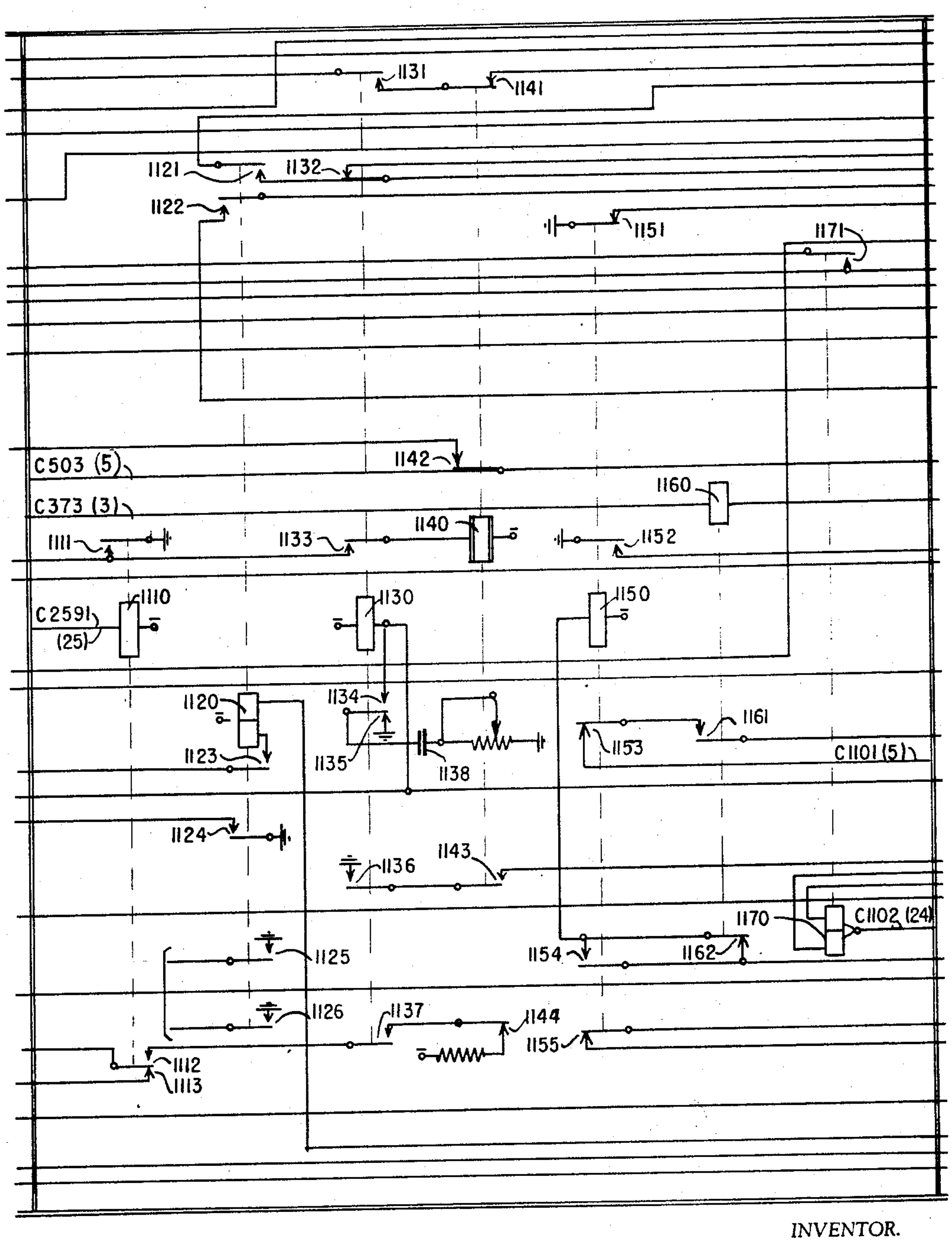
Figure 12:
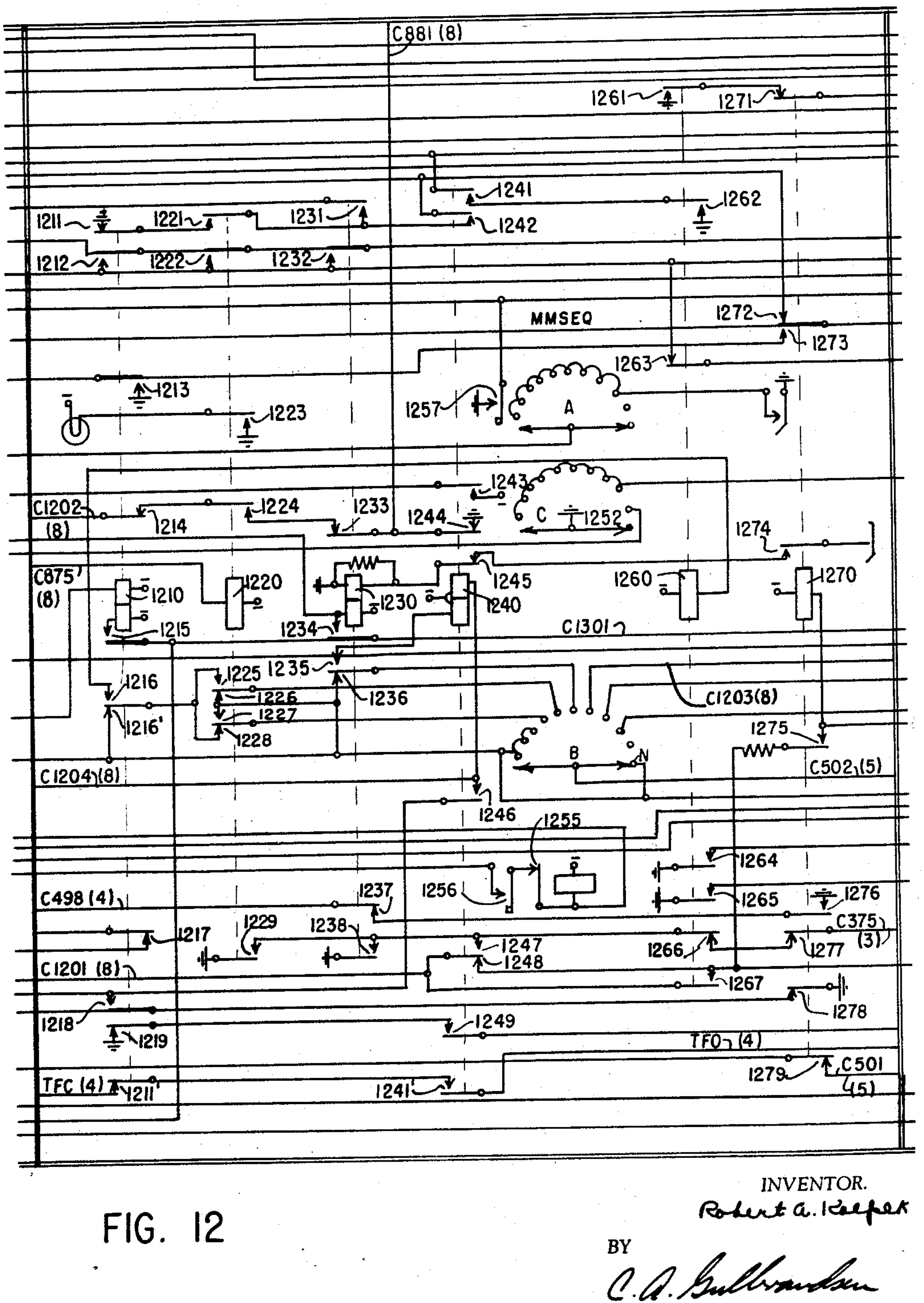
Figure 13:
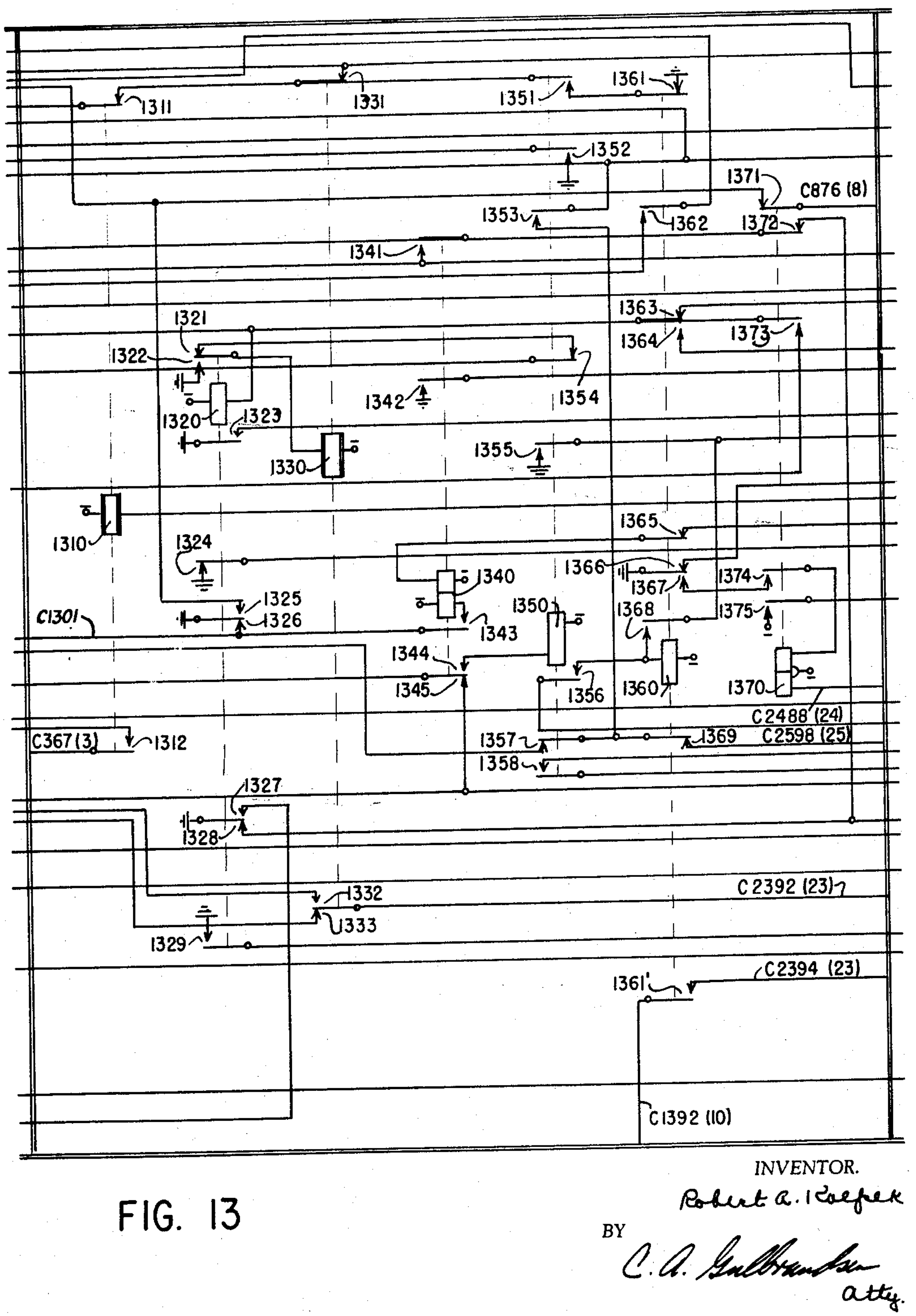
Figure 14:
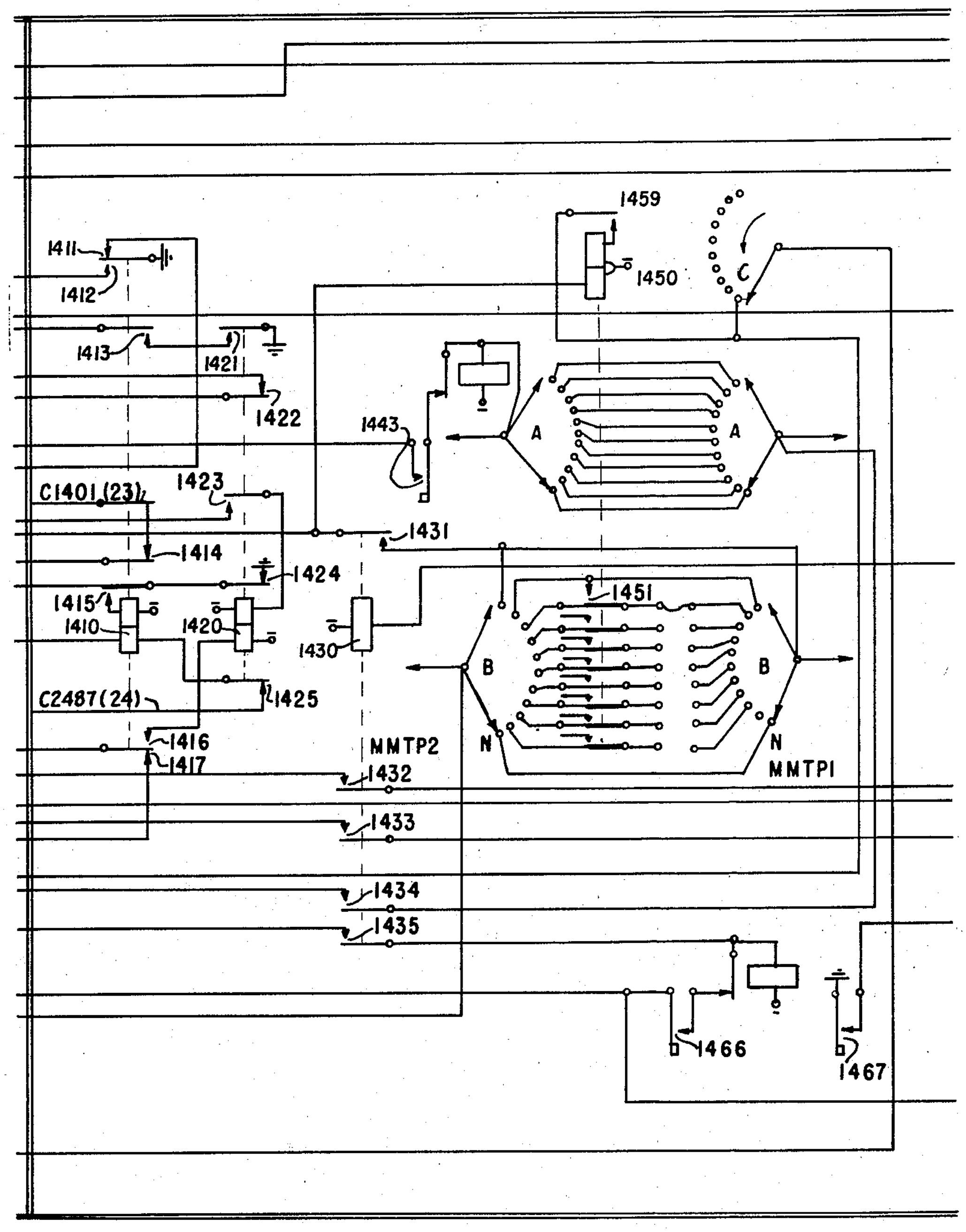
Figure 15:
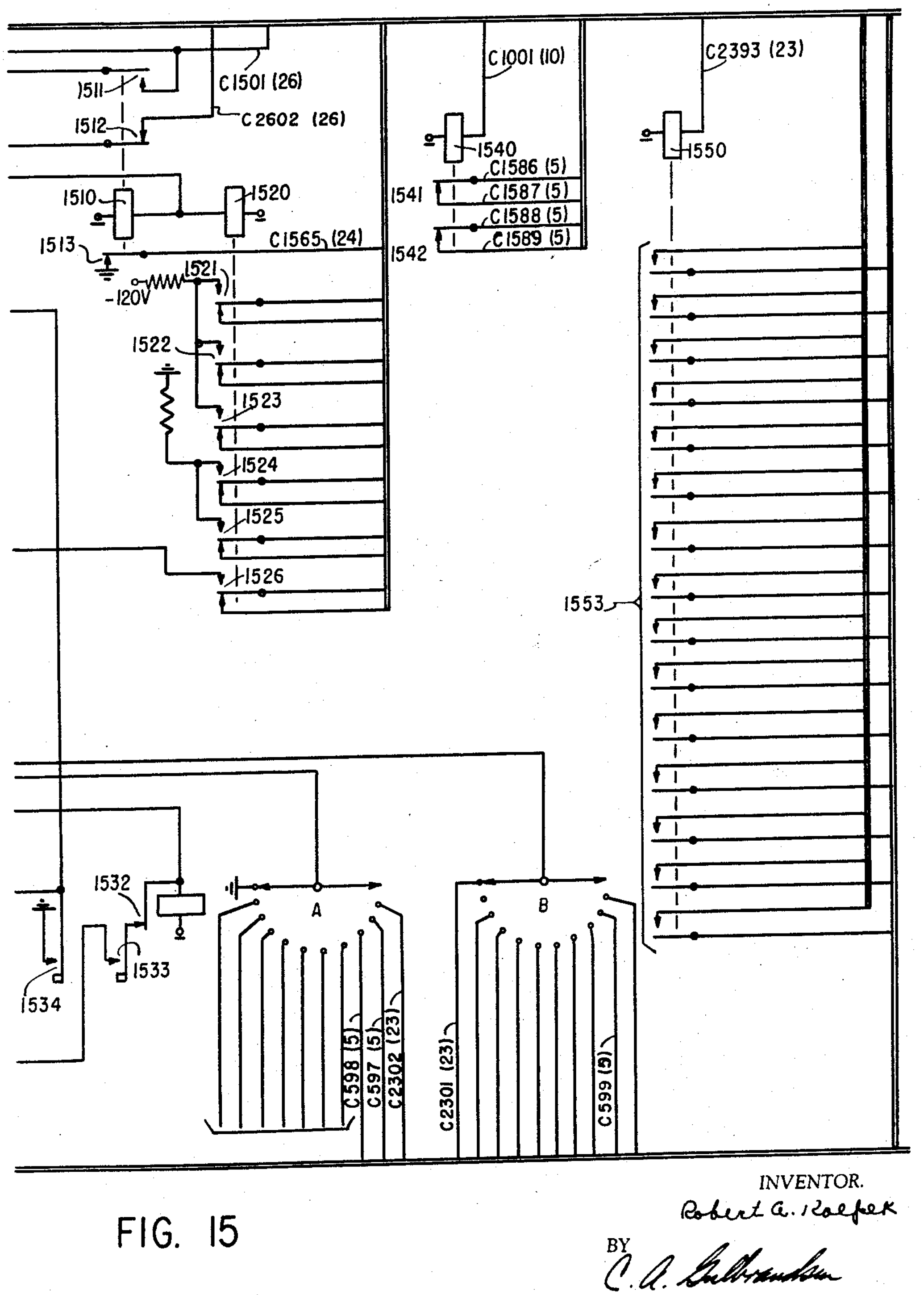
Figure 16:
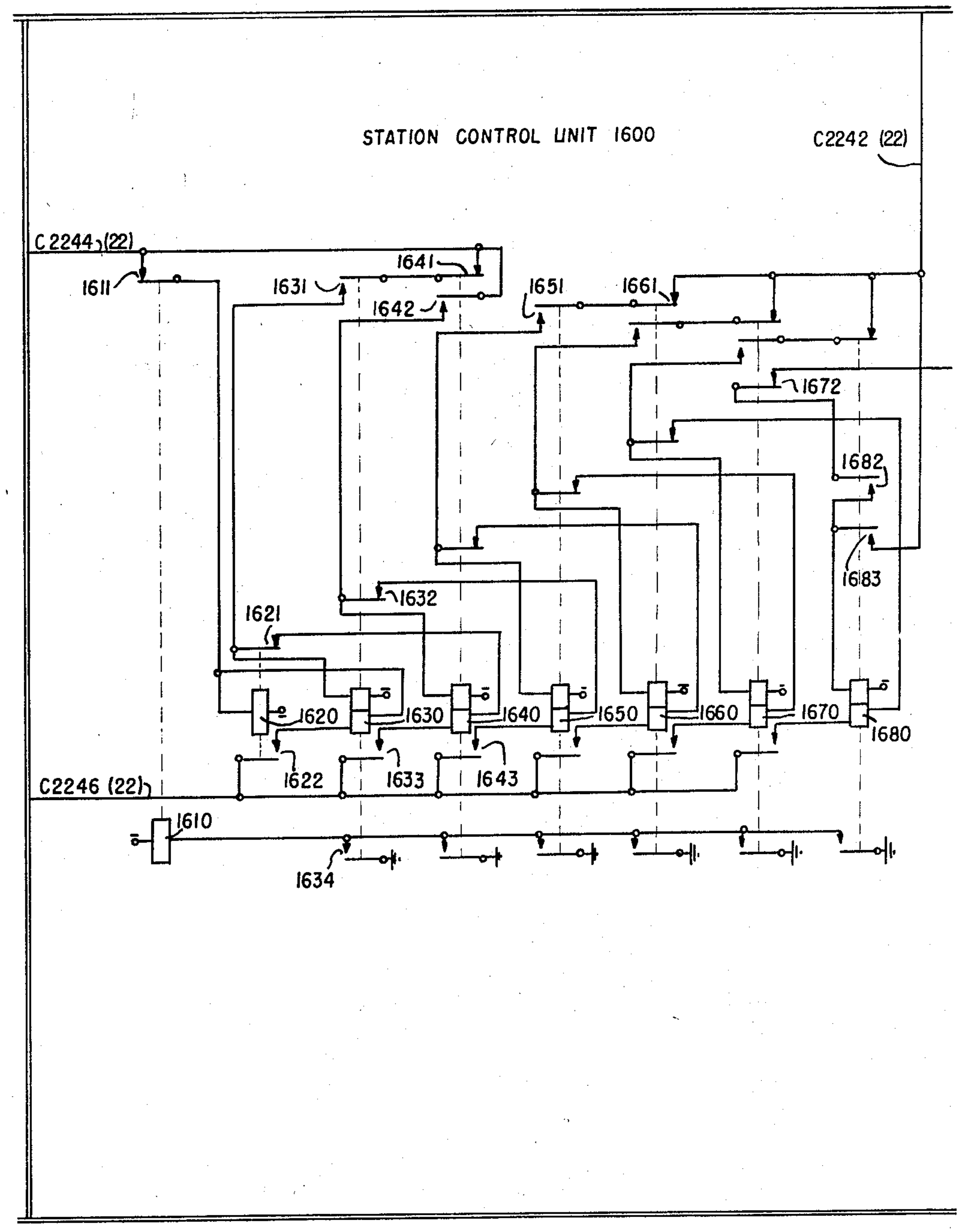
Figure 17:
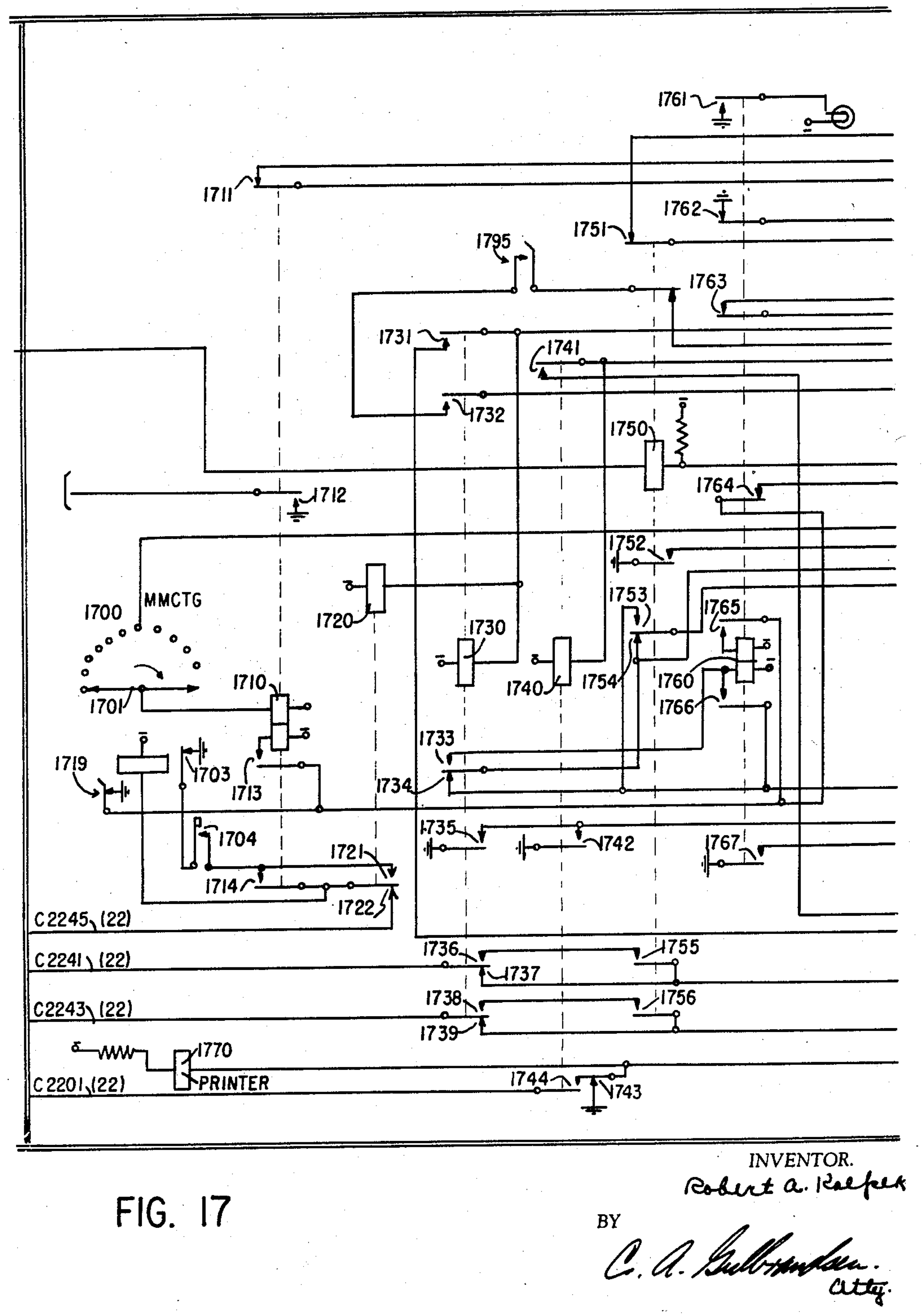
Figure 18:
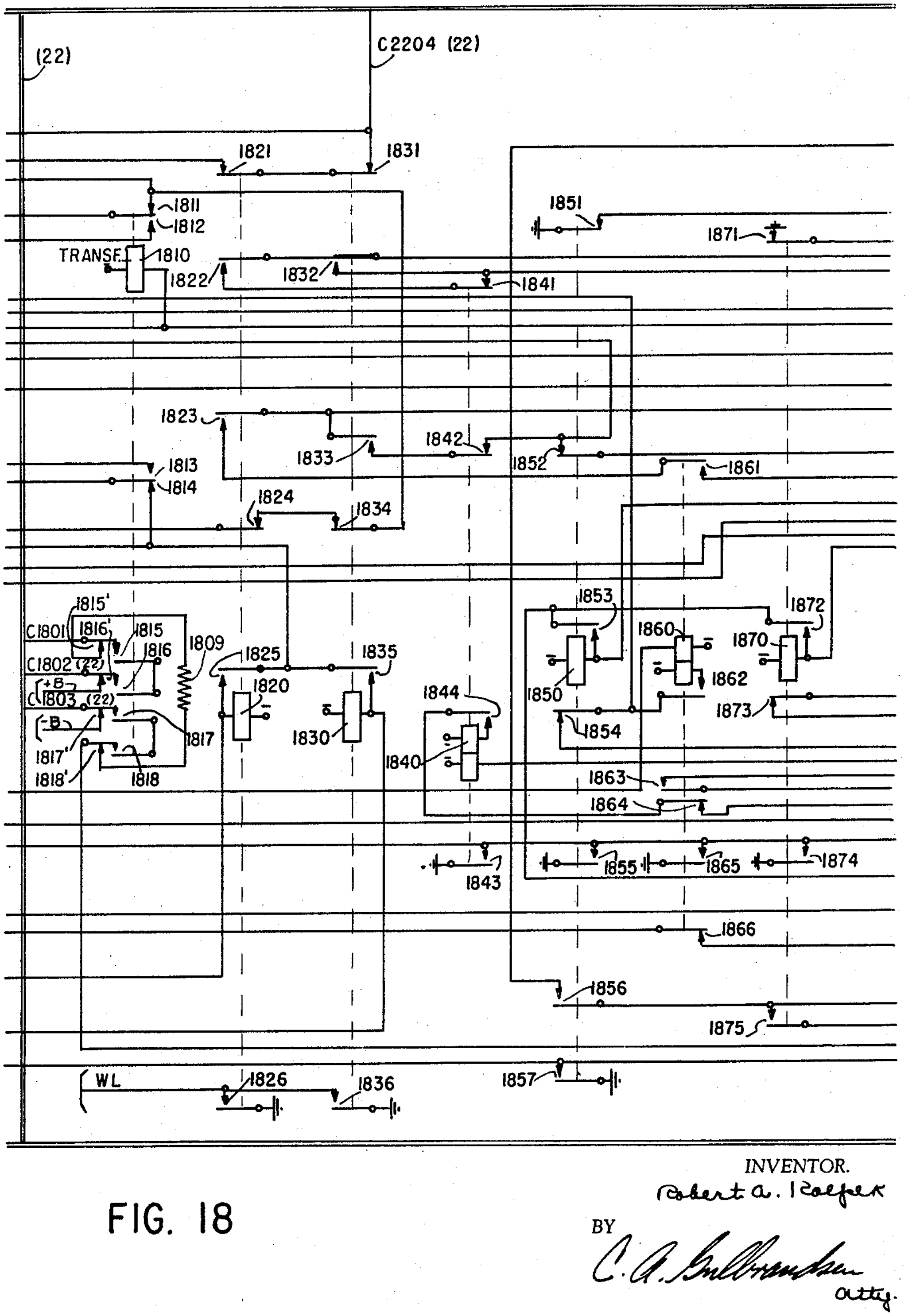
Figure 19:
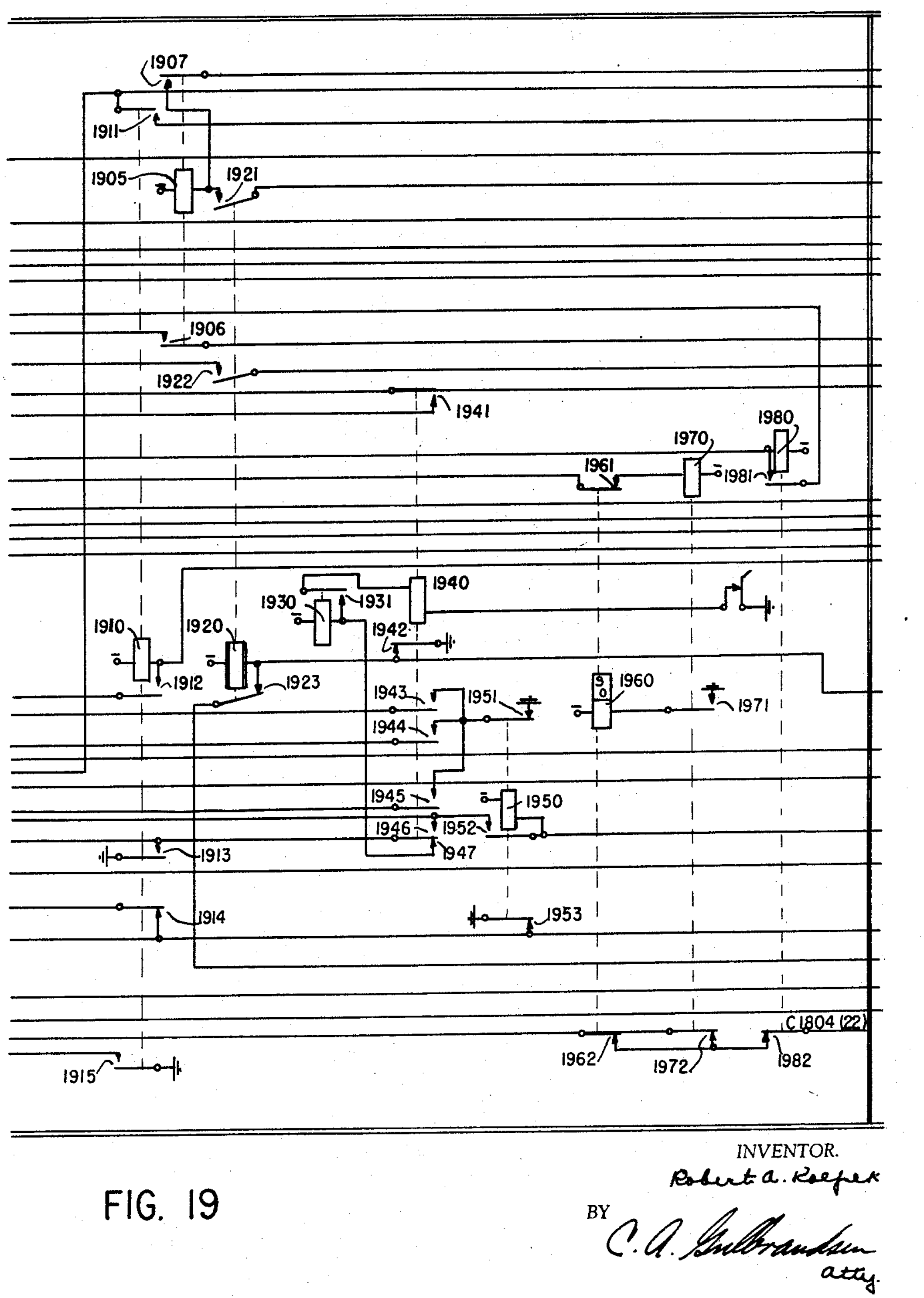
Figure 20:
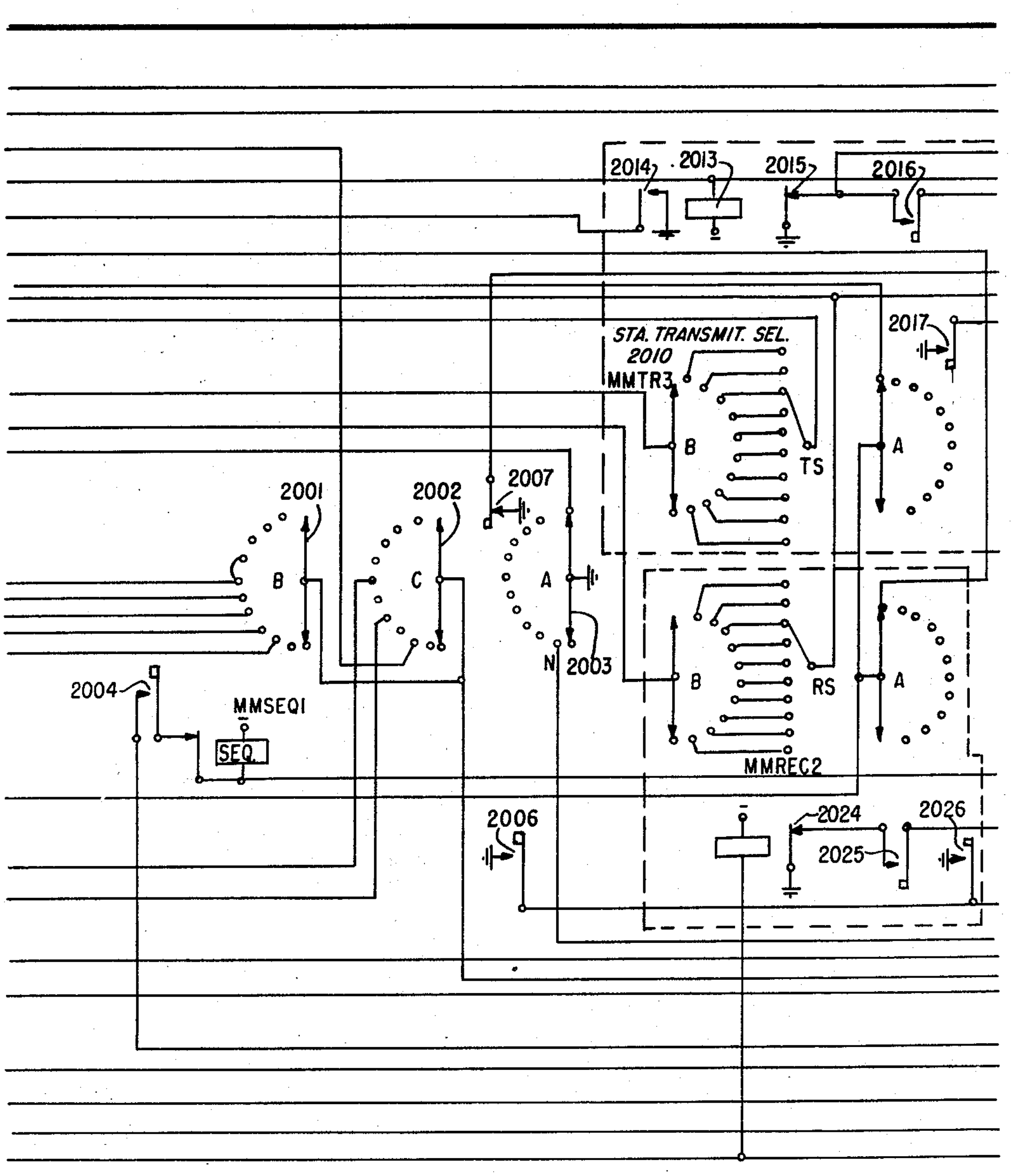
Figure 21:
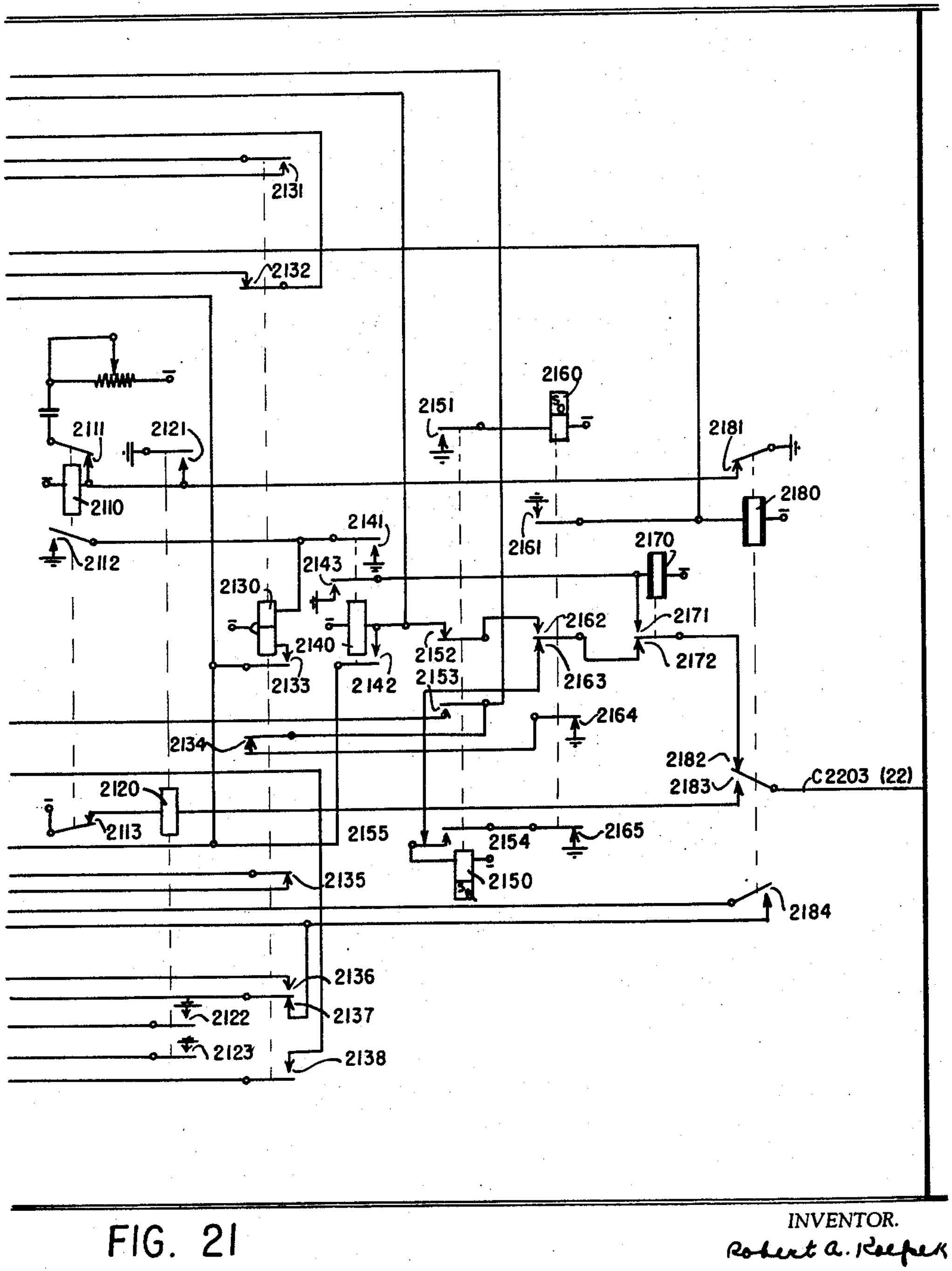

Figure 9 illustrates a sensing relay arrangement operated under control of a tape reader at the line circuit 400, for extending letter detection chain circuits individual to the station, whereby a channel number comparator such as 700 is selected.

Figures 10–15, inclusive, illustrate the details of the central office control unit 1000 utilized for transmitting various control character sequences to the station.

Figures 16–21 illustrate the station control unit 1600 at each station for permitting the station to respond to various control characters received from the central office.

Figure 22:
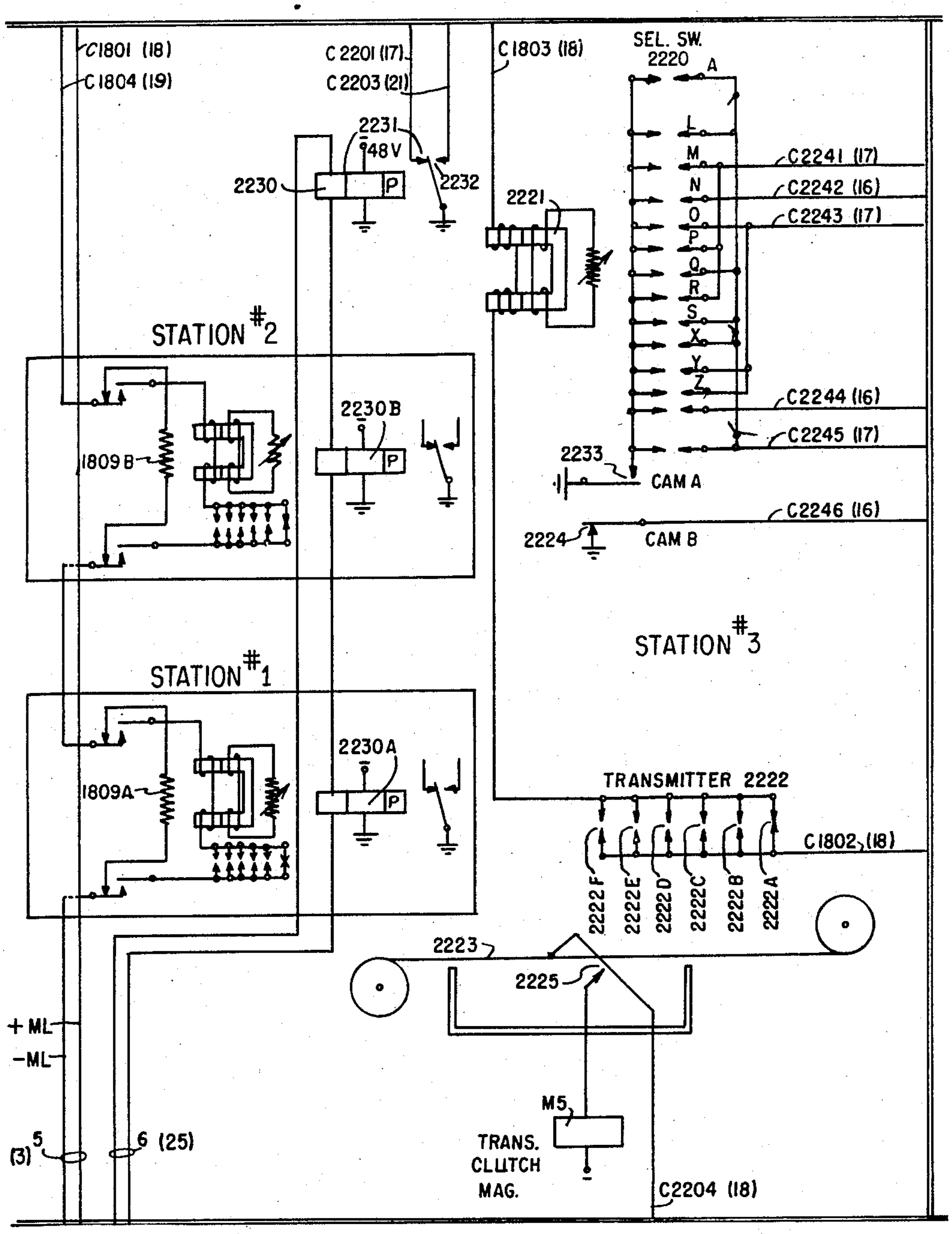
Figure 23:
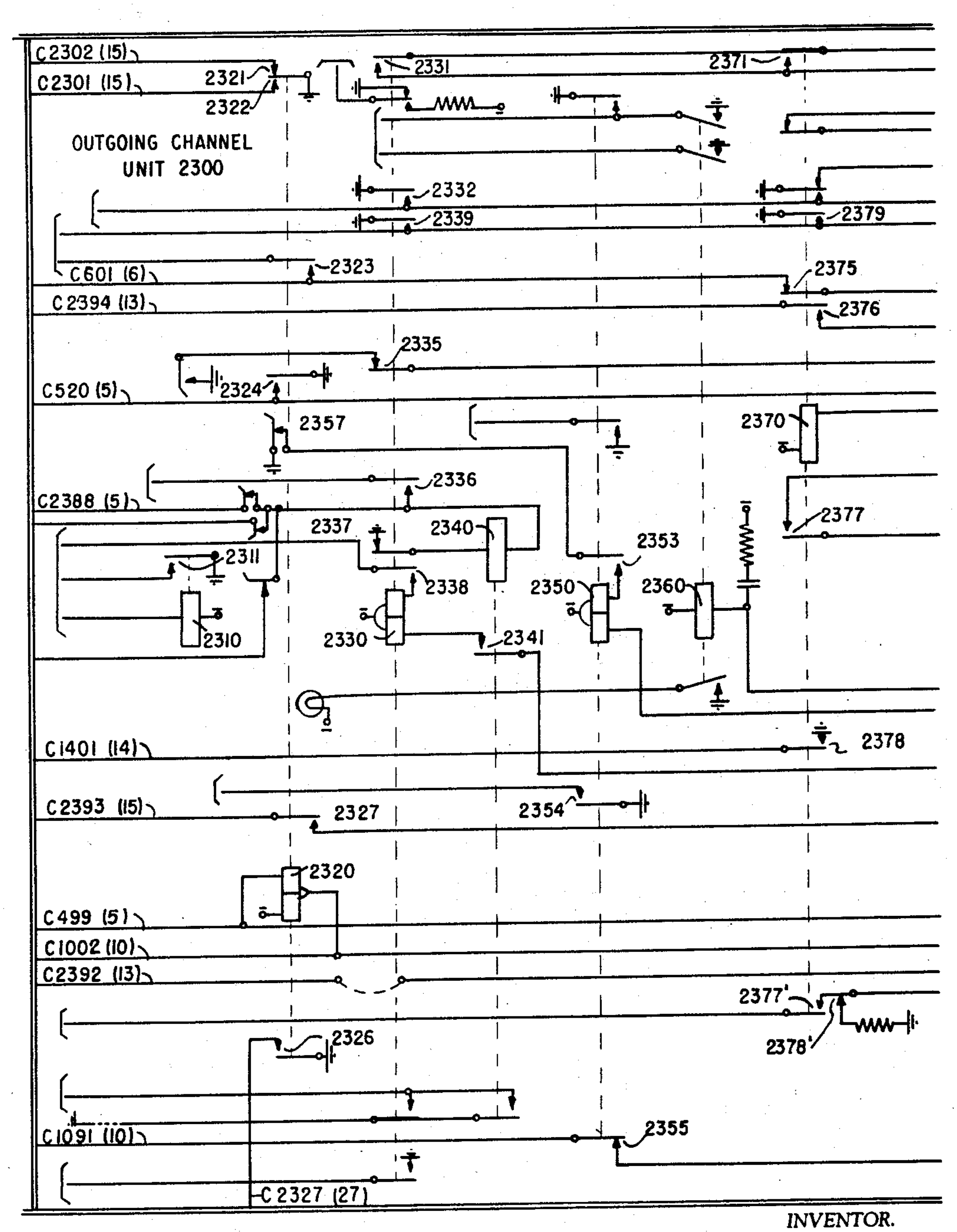
Figure 24:
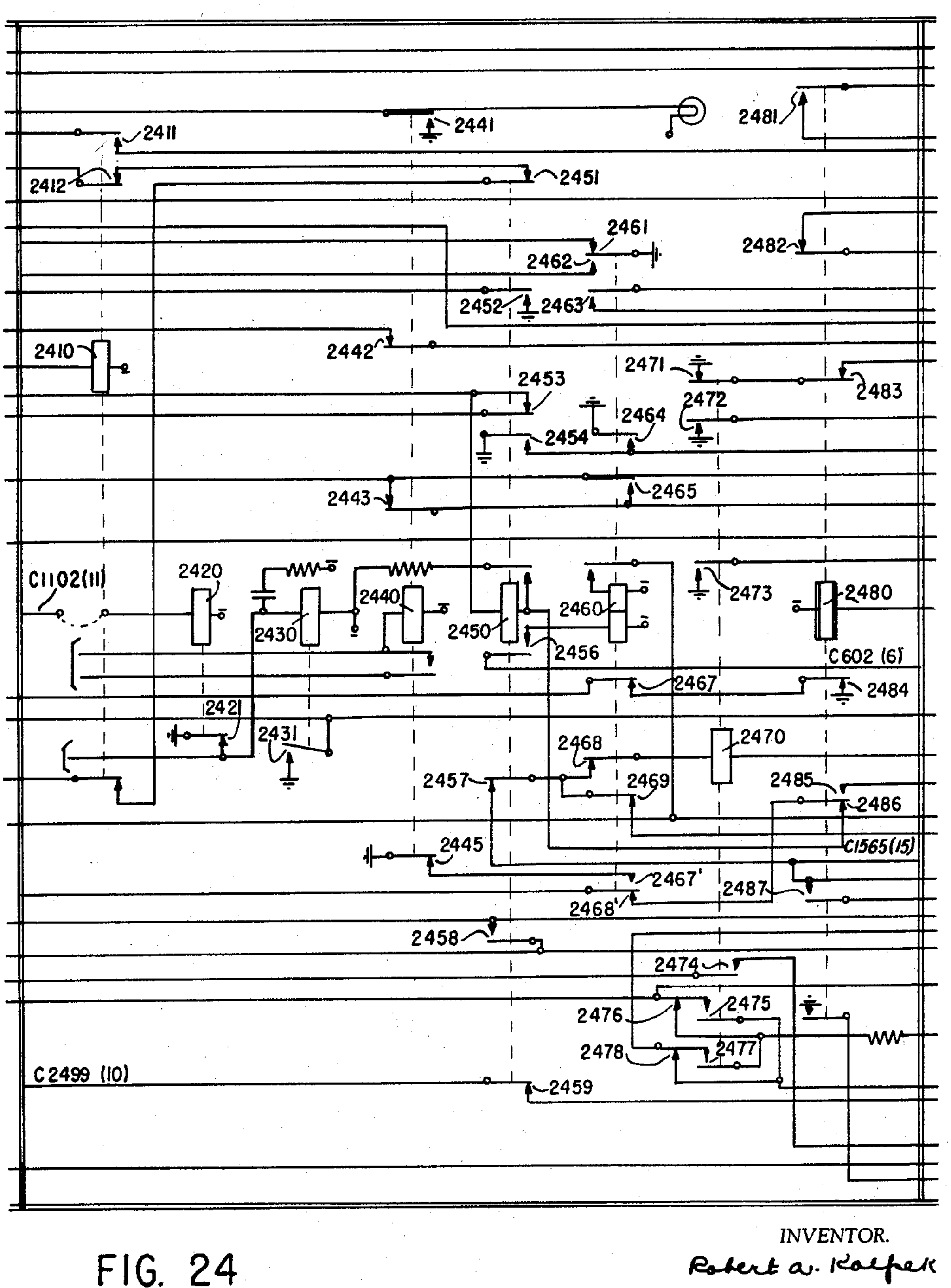
Figure 25:
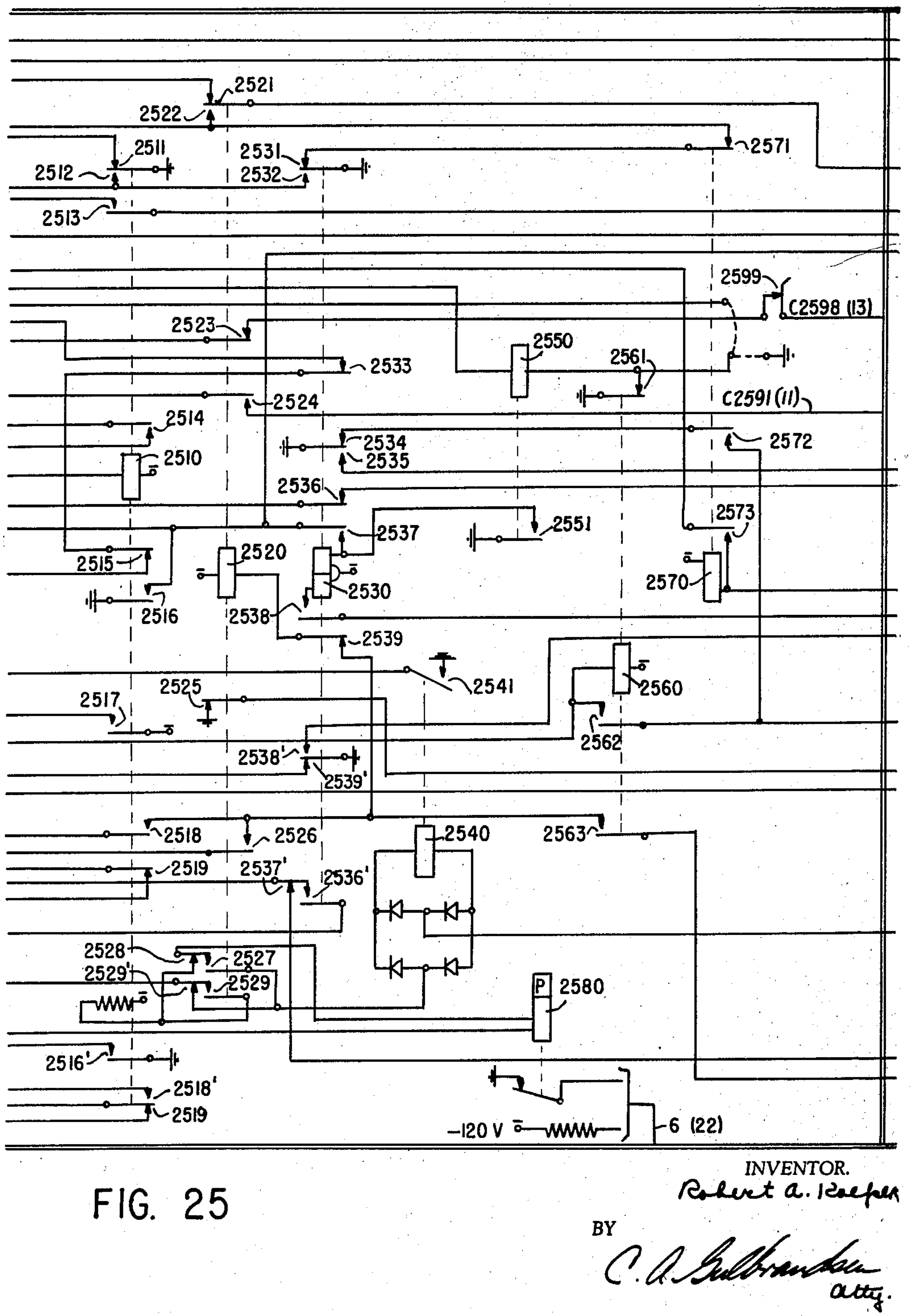
Figure 26:
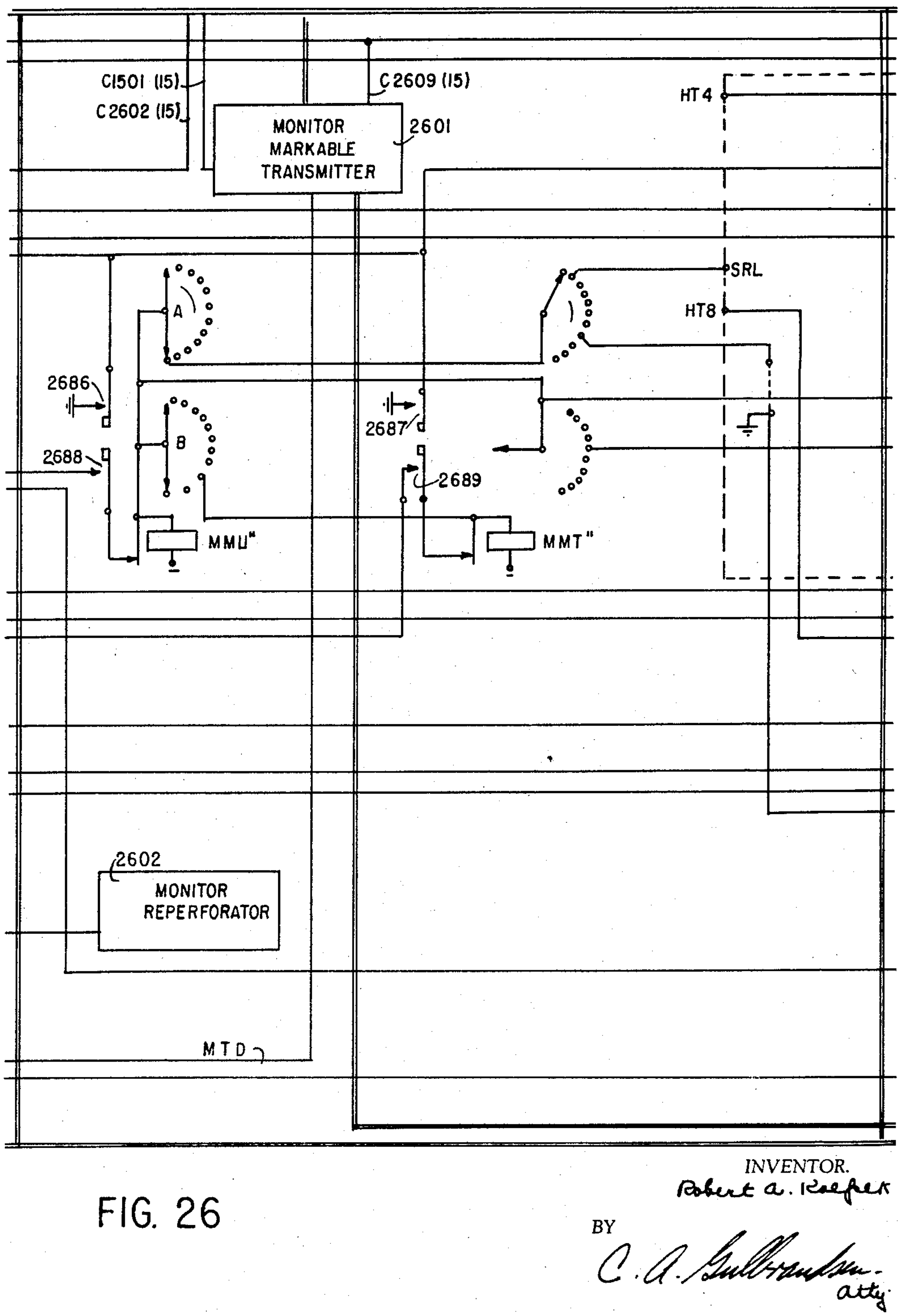
Figure 27:
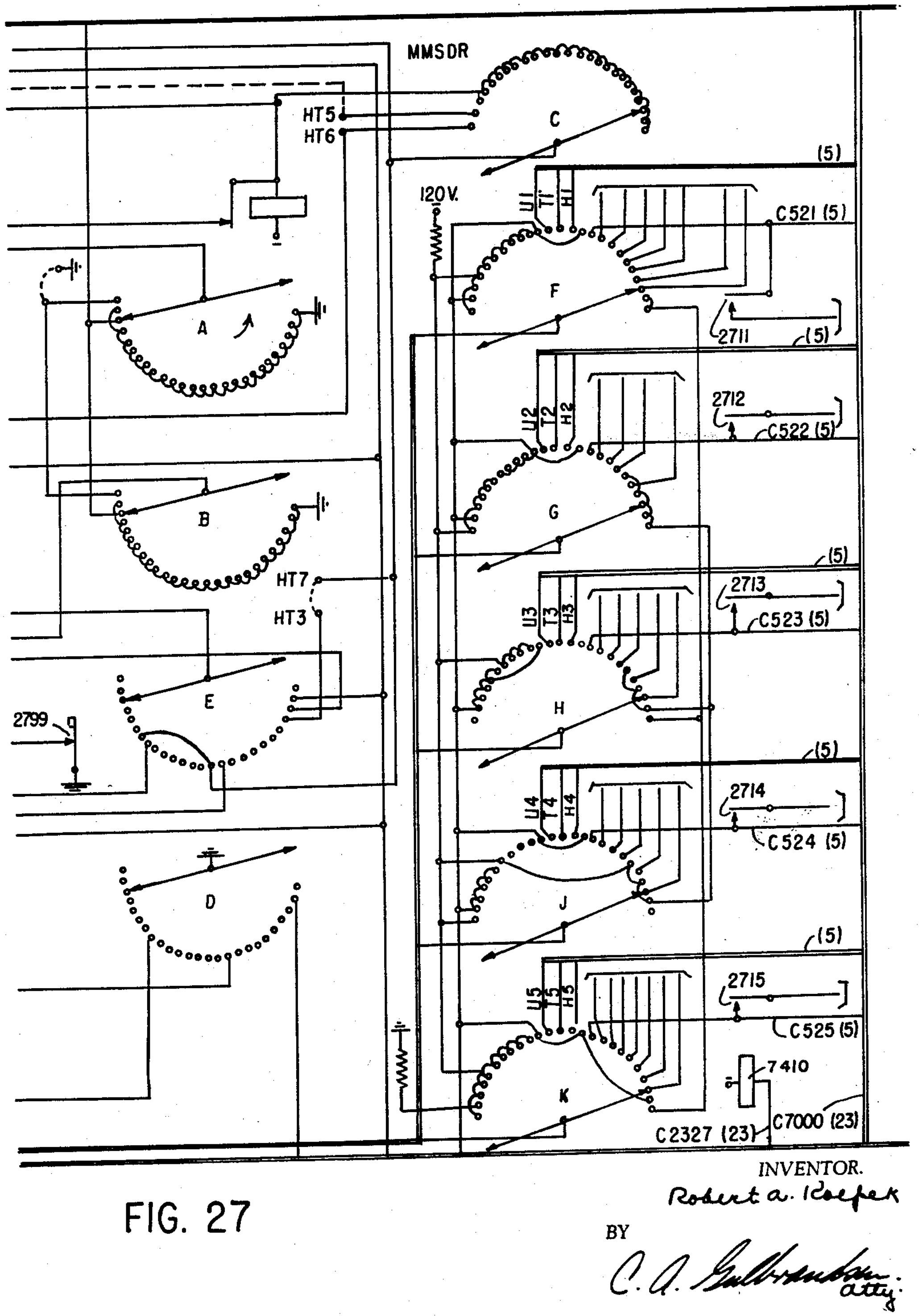

Figure 22 illustrates certain equipment at each station for responding to received signals and for transmitting signals.

Figures 23–27 illustrate the details of the central office outgoing channel unit 2300, whereby transmission is accomplished over line 6 to the stations. It is similar to the outgoing channel unit described in the aforementioned application, with certain changes, which permit it to operate with the present equipment. Only those operations of the channel unit 2300, which relate particularly to the present invention, will be described.

Figure 28:
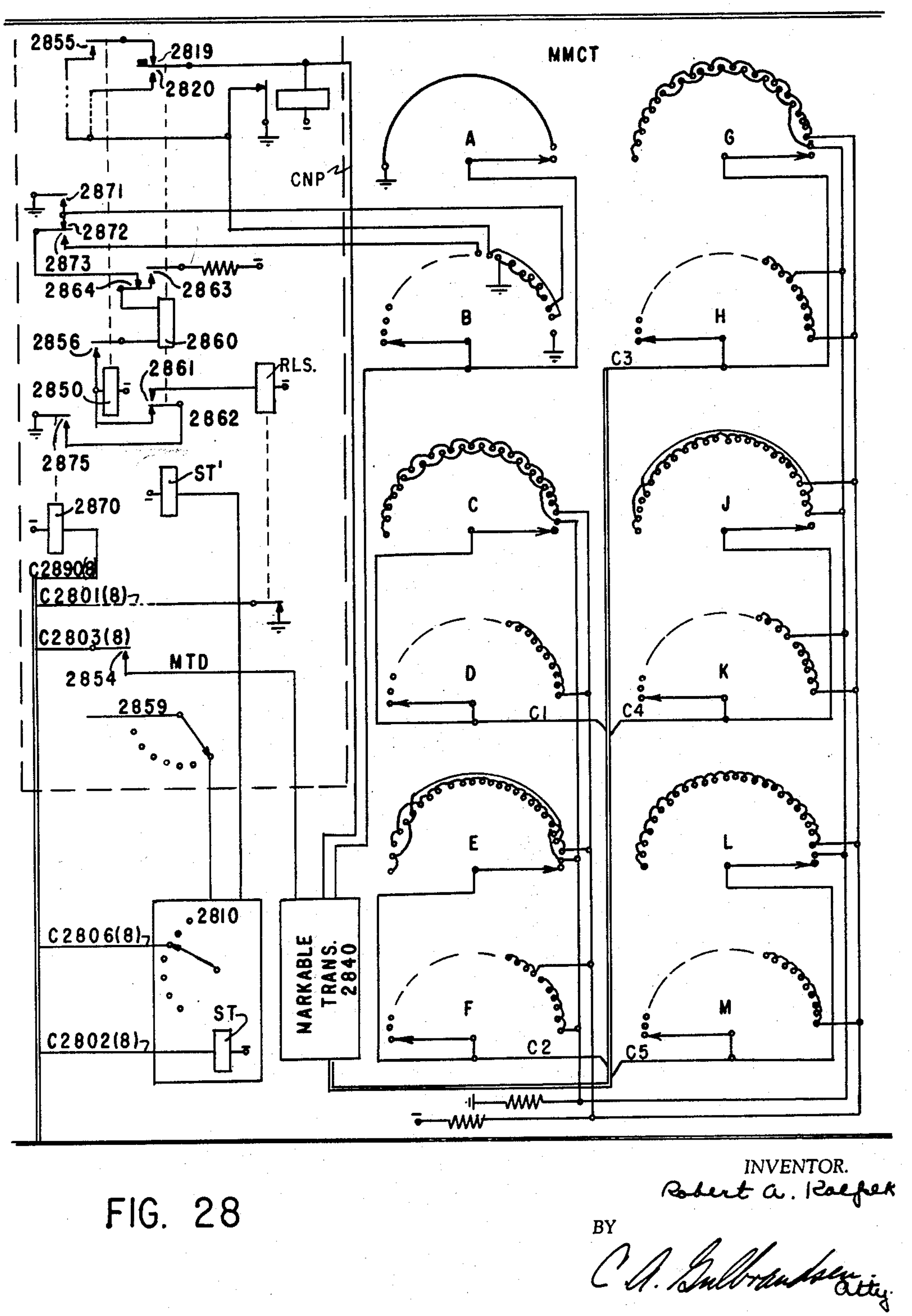

Figure 28 is largely a schematic illustration of a cancel transmission unit 2800, such as shown in the aforementioned application. Only those portions of the cancel transmission unit whose operations are affected when used in conjunction with the present invention are shown. A relay 2870 together with its contacts is added thereto to permit the transmission of certain characters to the line circuit perforator magnet M, whereas in the aforementioned application transmission was made to an outgoing channel unit such as 2300.

Generally during the day the central office control unit 1000 is utilized for controlling a markable transmitter 2601 in the outgoing channel unit 2300 for periodically transmitting a control sequence comprising 6 characters each followed by a pause. The markable transmitter is the type described in the aforementioned application. That is, it has five sequentially closed contacts to which markings are extended at various times, so that a signal lead is marked in sequence in accordance with the markings, to control apparatus in accordance with a character represented by a marking. The markable transmitter is generally controlled by unit 1000 to transmit the character "0."

The stations may be opening at various times during the day, and therefore may receive only a portion of a control sequence, which is being sent from the central office. They are placed in a ready-to-transmit position, however, if they receive a 4, 5, 6, 7, 8, or 9 character control sequence followed by a 6 character control sequence. A station initiating transmission controls a selector magnet 2221 at the station to ground a lead corresponding to the character being transmitted by the transmitter 2222 associated therewith. This provides a request-to-transmit signal to line 5 dependent on the message precedence to enable the central office to respond by returning control sequences to select a station having a message to transmit.

Messages transmitted from the stations contain a start-of-message indicator hereinafter abbreviated SOM, a channel designation comprising several letters identifying the channel and one letter identifying the station on the channel, a message number indicating the message of the day from the station, a precedence designation, one or more routing indicators, the body of the message, and an end-of-message indicator hereinafter abbreviated EOM. In the aforementioned application six degrees of message precedence were described, as indicated by the characters MM, RR, PP, OO, YY and ZZ, in order from the lowest to the highest. In addition, before the SOM, a precedence designation is included in the message to provide a signal to the central office, for enabling cancellation of an interrupted incoming message if the new message is of high precedence. This preceding precedence designation is indicated by the appropriate aforementioned characters, however all of the three lower precedence designations are treated as low precedence for the purpose of interruption, while the three higher precedence designations are treated as of equal high precedence for the purpose of message interruption.

A station after being opened and having received the sequences required to permit it to transmit, and having a message to transmit initiates transmission by opening line 5, in accordance with whether it has a high or low precedence message to transmit. Opening line 5 in accordance with a letter shift character indicates the message is of one of the three lower precedences. Opening line 5 in accordance with a blank character indicates the message is of one of the three highest precedences. At the central office a magnet M2 responds to the precedence designation signal to ground an appropriate lead. This initiates operation by control unit 1000 to send a four or five character pause control sequence depending on whether the message is low or high precedence, respectively. The magnets M2 and 2221 both have cam contacts associated therewith. Cam contacts such as 305 close for a certain portion of the associated magnet cycle, while cam contacts 306 open after contacts 305 close and close before contacts 305 open. Cam contacts 2223 and 2224 associated with magnet 2221 operates in a manner similar to contacts 305 and 306, respectively. In the event a message is being received at the time magnet M2 reacts to a blank character, the control unit 1000 sends a seven character pause control sequence to the stations so that the station from which a message was being transmitted is caused to stop transmission. A 5 character pause sequence is then transmitted to the stations to place those stations having a high precedence message in a position to be selected for transmission.

After a 4 or 5 character pause control sequence is transmitted to the stations, a selection must be made of a station having a message to transmit. This is done by first sending a series of characters without pauses to step a switch at each station to a position corresponding to the last station to transmit. Then a series of characters each followed by a pause is transmitted to select a station in the group succeeding the last station to transmit. The first station in that group having a message to transmit immediately begins transmission, when the switch at that station is in a position corresponding to that assigned the stations. Immediate reception of the message at the central office then terminates further transmission of control characters. It will be noted that a station having a low precedence message to transmit must wait until all stations having high precedence messages have transmitted their respective messages.

At the end of the message the EOM is detected at both the sending station and the central office. The central office then sends a six character control sequence to each of the stations for permitting the station, which just finished transmission, to be placed in position to again transmit.

A message intended for one of the multipoint stations on line 6, may be routed to a cross office unit from an incoming line circuit such as 400 in one of the manners explained in the aforementioned application. One or several cross office units each having a message for a station on line 6 then has an outgoing selector switch such as 500 set to the outgoing channel unit 2300, as explained in the aforementioned application. Specifically, the selector switch is set on a terminal corresponding to the station to which the message is to be transmitted, however a message to any of the stations must be controlled by the channel unit 2300. Therefore, certain connections, which will be apparent, are multipled on the outgoing selector switch bank terminals, corresponding to the stations. The outgoing channel unit 2300 has one relay, which is individual to station 1 on the line, so that the outgoing channel unit can be easily converted to use with a single station line.

After performing the precedence comparison test described in the aforementioned application, one cross office unit of several, which may be set to terminals having access to the channel unit 2300, is permitted to seize the outgoing channel unit 2300. A relay individual to the station to which the message is to be transmitted is then operated. The central office control unit 1000 is then effective to send a series of 8 characters each followed by a pause to the respective stations 1, 2 and 3. Thereafter a switch in each station control unit 1600 is stepped in accordance with a marking provided by the operated relay individual to the station, which is to receive the message. At the selected station only, a page printer is connected so as to print received characters of the message transmitted over line 6. During message transmission, a cancellation procedure may taken place as described in the aforementioned application. After the message has been fully transmitted the control unit 1000 transmits a 9 character control sequence to each of the stations so that the station which received the message is reset to receive another message.

In the event control sequences must be sent while a message is being transmitted, the cross office unit transmitter is controlled from the control unit 1000 to permit the characters of the message to be used as part of a control character sequence, thereby avoiding the problem of interrupting an outgoing message.

Thus having outlined the various functions of the apparatus involved in the present invention, the following detailed description is provided for the purpose of fully explaining the manner in which the invention functions.

*Initiating control character sequence transmission*

When the outgoing channel unit 2300 is idle, the unit supplies ground from contacts 2471, 2483 and 2523, through key contacts 2599 to conductor C2598(13). The ground completes a circuit via the contacts 1369 and 1357 to battery through the relay 1070 in the central office control unit 1000. Upon operating relay 1070 completes at contacts 1072 a circuit for operating the relays 1510 and 1520. Relay 1510 at contacts 1511 prepares a circuit for the markable transmitter indicated by the block 2601 associated with the outgoing channel unit 2300 while relay 1520 prepares markings therefor at contacts 1521, 1522, 1523, 1524 and 1525, and at contacts 1526 prepares a circuit from the transmitter numbering contacts to relay 1430.

With key contacts 501 closed, a momentary ground pulse furnished at regular intervals from a pulser in any well-known manner, is extended periodically to the conductor C501(12), contacts 1279, 1048, 1217 and 1162 to energize relay 1150. Relay 1150 operates to complete at contacts 1152, a circuit for the lower winding of relay 1230. Relay 1230 operates and energizes its lower winding over a circuit including the contacts 1234 and 1326. At contacts 1232 a circuit is completed from ground at contacts 1328, over contacts 1372, 1232, 1263, 1354 and 1321 to operate slow-to-operate relay 1330. The ground at contacts 1232 is also extended past previously operated contacts 1074 and contacts 1021 to operate the upper winding of relay 1040.

Relay 1040 energizes its lower winding over contacts 1043, 1372 and 1328. At contacts 1044 a circuit for relay 1050 is completed, which extends via the hold conductor C1301 to ground at contacts 1326. Relay 1040 interrupts at the contacts 1048 the circuit from conductor C501(5) to relay 1150 to release relay 1150. At contacts 1047 relay 1040 opens the circuit to relay 1030, which does not restore immediately due to the condenser resistor network connected thereto. Opening of the contacts 1042 and closure of contacts 1041 control circuits, which will prevent the transmission of an outgoing message, as will be explained. At contacts 1046 a circuit is completed over the conductor MC to cause operation of a motor (not shown) for use in operating the outgoing channel unit markable transmitter.

Upon operating, the relay 1050 completes at contacts 1052, a circuit extending over contacts 1062 and 1142, conductor C503(5), key contacts 540, conductor C502(12), the wiper and contacts N of switch MMSEQ level B to time delay relay 1130. Slow-to-operate relay 1140 is then energized by relay 1130 over a circuit including contacts 1133 and previously operated contacts 1075. At contacts 1134 relay 1130 connects a variable resistor condenser network to itself for controlling its release time. At contacts 1131 a circuit from ground at contacts 1071 and including contacts 1141 and 1511 is completed over the conductor C1501(26) to the clutch magnet (not shown) of the outgoing channel unit markable transmitter 2601. The clutch magnet energizes to allow the transmitter to operate.

Referring to the marking relay 1520, it is seen that at the closed contacts 1521, 1522 and 1523, respectively conductors extending to cable C1502(26) are marked by —120 volt resistance battery, respectively, and at the closed contacts 1524 and 1525 other conductors extending to the cable C1502(26) are marked with resistance ground, respectively. Each of the conductors extends the respective marking thereon by means of cable C1502(26) through five respective sequentially closed contacts of the markable transmitter as it goes through a cycle. The markings on the conductors are therefore sequentially extended over signal lead MTD through contacts 2537′, 2478, the winding of signal relay 2580, to resistance —60 volt battery through contacts 2528. The signal relay 2580 in turn is therefore controlled to transmit a start signal followed by control signals conforming to the character 0, over the line 6 to each of the polar relays 2230A, 2230B and 2230 connected to line 6 in series at stations 1, 2 and 3, respectively. This character is transmitted to as many stations as are on the line, which in this example is chosen as 3.

The slow relay 1140 operates, while the character 0 is being transmitted to the stations. It opens at contacts 1141 the circuit to the markable transmitter clutch magnet. The markable transmitter is therefore prevented from going through more than one cycle at this time. Relay 1140 operates somewhat before the transmitter cycle is completed, to prevent the sending of a second 0 immediately, as the transmitter operates very rapidly.

The operation of relay 1140 interrupts at contacts 1142 the above original operating circuit for relay 1130. The restoration time of relay 1130 is delayed by the time required to discharge the capacitor 1138 associated with this relay. This controls the time between characters and is recognized by the stations 1, 2 and 3, as a signal from the central office, as will be apparent. At contacts 1143 a circuit is completed from contacts 1136 to the motor magnet of switch MMSEQ before relay 1130 restores.

When the relay 1130 finally restores, the circuit for relay 1140 is opened at contacts 1133 to permit relay 1140 to restore and close contacts 1141 and 1142. When relay 1130 restores the path for energizing the magnet is opened at contacts 1136 to restore the magnet and cause the wipers of the switch MMSEQ to take one step.

Relay 1130 is again operated over a circuit similar to that previously traced, except in this case the wiper of switch MMSEQ level B completes the circuit by way of the first contact instead of through contact N. As a result of the reoperation of relay 1130, relay 1140 reoperates, while another 0 character is transmitted as before described followed by a pause controlled by the release of relays 1130 and 1140. Switch MMSEQ is stepped once for each character transmitted, and a sequence of six 0 characters separated by pauses as described is sent to the stations 1, 2 and 3. Switch MMSEQ level B wiper in its first three positions completes a circuit already described for relay 1130 each time relay 1140 restores. In its fourth position it completes the circuit for relay 1130 from ground extended to its B wiper, as explained, over contacts 1228 and 1216′ and in its fifth position completes the circuit over contacts 1226 instead. Switch MMSEQ is then stepped to its sixth contact at which time six characters each followed by a pause have been transmitted.

When the counting switch MMSEQ is in the sixth position, the ground from contacts 1052 instead of operating the time delay relay 1130, is extended to the level B wiper as explained and over contacts 1235 to the lower winding of relay 1240 to operate relay 1240. Relay 1130 therefore remains unoperated so that the transmitter clutch magnet circuit remains incomplete and relay 1140 remains restored.

Relay 1240 completes at contacts 1246 a circuit for its upper winding from ground at contacts 1278 and 1155. Relay 1240 completes at contacts 1247, a circuit including the conductor C1201(8) and the ground at contacts 836, contacts 1266 and 1277 to conductor C375(3) for reversing the current direction through the bias winding of the polar relay 302 to prevent it from closing contacts 303 in the event line 5 is opened. At contacts 1243 a circuit is prepared for relay 1160. At contacts 1242, a circuit from ground at contacts 1151 is extended by way of contacts 1231, 1242 and 1272 to the relays 1010 and 1320 in multiple.

Relay 1010 operates to complete at contacts 1012 a holding circuit for itself and relay 1320, from ground at the off-normal springs 1257. At contacts 1014 relay 1010 completes a circuit for relay 1060 from ground at contacts 1052. Relay 1060 opens contacts 1062 to prevent any circuit from being completed by switch MMSEQ, when it is stepped home, and at contacts 1061 closes another holding circuit for relays 1010 and 1320. At contacts 1015 relay 1010 prevents relay 1020 from operating when switch MMSEQ level C is stepped past its tenth contact. At the contacts 1016 relay 1010 completes a self-interrupted homing circuit for switch MMSEQ over off-normal springs 1256 and interrupting contacts 1255. The switch MMSEQ is stepped to its normal position where the off-normal springs 1257 open to open one of the holding circuits for relays 1010 and 1320. When stepping off its sixth contact, switch MMSEQ opens the original circuit for relay 1240, however the upper winding of that relay remains energized as described.

At the contacts 1322 relay 1320 closes a circuit for holding the slow-to-release relay 1330 operated despite the opening of contacts 1328. Contacts 1328 on opening also open the circuit to the lower winding relay 1040. At contacts 1326 ground is removed from the conductor C1301, permitting relays 1230 and 1050 to deenergize. Slow-to-release relay 1050 does not immediately restore when relay 1040 opens its circuit at contacts 1044. At contacts 1327 a circuit is completed to relay 1030 to hold it operated until relay 1040 is restored for completing the original circuit therefor at contacts 1047.

If relay 1030 should have restored before relay 1320 operated, it closes contacts 1031 to energize the upper winding of relay 1020. Relay 1020 energizes its lower winding over contacts 1023 and key contacts 1029. At contacts 1024, 1025 and 1026 it completes various signal circuits. At contacts 1021 it opens the original circuit for operating relay 1040, and at contacts 1022 it operates relays 1320 and 1010. Likewise it will be noted that if switch MMSEQ were stepped to its tenth position without relay 1010 operating, ground from wiper C thereof is forwarded past contacts 1015 to operate relay 1020.

When relay 1050 is restored the circuit to relay 1060 is opened at contacts 1052. Relay 1060 restores to open the holding circuits to relays 1010 and 1320 at contacts 1061 and both restore, if switch MMSEQ off-normal springs 1257 are open. Relay 1320 then opens the circuit to relay 1330, which restores. Relay 1240 remains operated over its holding circuit.

A ground pulse appearing upon the conductor C501(12) at a later time again operates relay 1150. It restores relay 1240 at contacts 1155. The just-described series of operations for transmitting six 0 characters each followed by a pause to stations 1, 2 and 3 then takes place again. At the end of this second sequence of six characters, relay 1240 operates as described to initiate the resetting of the switch MMSEQ and other aforedescribed operations.

*Character control sequence to open stations*

Referring now to the multipoint station equipment, it will be observed that the polar relays such as 2230A, 2230B and 2230 at each of the stations 1, 2 and 3, respectively, are connected in series. Each responds to the pulse representing characters transmitted thereto by polar relay 2580 at the central office. As these stations are generally open only eight hours a day, an operator at each station turns on the power supply for the associated equipment at the beginning of each day.

Referring now particularly to the station control unit 1600 at station 3, this operates slow-to-release relay 2180 from ground at the associated off-normal springs 2007. At contacts 2181 relay 2180 operates relay 2110. Relay 1920 also operates from ground at contacts 1942; from ground at contacts 1851 extended over the wiper of level A of switch MMREC2 in its normal position, and from ground at contacts 1871 extended over the wiper of level A of switch MMTR3 in its normal position. If switch MMSEQ1 is not at normal, when the power at the station is turned on, relay 2180 fails to operate as off-normal springs 2007 are open. The upper winding of relay 2130 is energized from ground at contacts 2112 as relay 2110 is then unoperated. At contacts 2133 relay 2130 energizes its lower winding from ground at off-normal springs 2006, and at contacts 2136 forwards ground from contacts 1953 through contacts 2136 and off-normal springs 2004 to complete a self-interrupted stepping circuit for the motor magnet of switch MMSEQ1. The switch steps home in a self-interrupted manner to open springs 2006 thereby deenergizing the lower winding of relay 2130. It closes springs 2007 to energize slow-to-release relay 2180. Relay 2180 in turn operates relay 2110, which opens the circuit to the upper winding of relay 2130 at contacts 2112. Relay 2130 restores.

Turning the power on at the station also completes a circuit to the bias winding of the polar relay 2230 so that normally ground is placed on conductor C2201(17) at contacts 2231. When a start signal is received over line 6 each of the polar relays 2230A, 2230B and 2230 at open stations respond thereto to close the associated contacts such as 2232 and extend ground over lead C2203(21) at each station. Following the start signal, a coded series of five space or mark conditions representing a character transmitted by signal relay 2580 in the central office opening and closing line 6 in accordance therewith, controls the polar relay at each station accordingly so that ground is extended over conductor C2203(21). The ground is extended to conductor C2203(21) and completes a circuit including the contacts 2182, 2172, 2163 and 2155 to slow-to-release relay 2150 and battery. Relay 2150 closes contacts 2151 to operate the slow-to-operate pause relay 2160. Relay 2150 completes at contacts 2153 a circuit including contacts 2134 and 2164 for energizing the motor magnet of switch MMSEQ1. Relay 2150 also opens its original circuit at contacts 2155 and closes a holding circuit for itself over contacts 2165 and 2154. It will be noted that a parallel operation is taking place at stations 1 and 2, if they are open.

The pause relay 2160 interrupts at contacts 2163 the original circuit for the signal relay 2150, and at contacts 2165 opens the holding circuit for relay 2150 so that it starts to restore. At contacts 2164 relay 2160 opens the circuit for the motor magnet of switch MMSEQ1 so that the switch takes its first step. At contacts 2161 a circuit for energizing relay 2180 is completed so that when springs 2007 open relay 2180 does not restore. The slow-to-release signal relay 2150 restores after the polar relay 2230 has completely responded to the character. It opens contacts 2151 to open the operating circuit for the pause relay 2160. It restores after a delay and at the contacts 2163 again recloses the circuit for the signal relay 2150.

If ground now again appears on lead C2203(21) from the polar relay contacts 2232, relay 2150 is reoperated and the cycle repeated. The above release action occurs during the pause between the transmission of the characters such as "0" from the central office, as explained, to the polar relay 2230. Relay 2160 is again operated to step switch MMSEQ1. In the above manner the character register switch MMSEQ1 is operated once for each transmitted character such as "0" followed by a pause of sufficient duration to allow the pause relay 2160 to operate and restore between each received character. It is noted that the station relay 2180 is slow to release and is repeatedly energized by relay 2160 so that it remains operated during the period between pulses on conductor C2203(21) to allow relays 2150 and 2160 to be operated.

If the characters operating polar relay 2230 are not followed by a pause, ground is extended repeatedly over lead C2203(21) under control of relay 2230. Ground therefore appears on conductor C2203(21), while relay 2160 is operated and after relay 2150 is restored. It is therefore extended past contacts 2182, 2172, 2162 and 2152 to energize relay 2140. Relay 2140 energizes and completes a holding circuit for itself over contacts 2142 and off-normal springs 2006. At contacts 2143 slow-to-release relay 2170 is energized, and it opens the circuits for originally energizing relays 2140 or 2150 at contacts 2172. At contacts 2141 it energizes the upper winding of relay 2130. Relay 2130 at contacts 2134 opens a point in the aforementioned energizing circuit for the motor magnet of switch MMSEQ1, and completes a self-interrupted stepping circuit for switch MMSEQ1 over contacts 1953 and 2136 and off-normal springs 2004. At contacts 2133 relay 2130 energizes its lower winding from off-normal springs 2006. At contacts 2171 relay 2170 extends lead C2203(22) to its own winding so that ground thereon continues to energize relay 2170.

Switch MMSEQ1 may, at the time relay 2140 was operated, be on any of its first three contacts without completing any circuit. The aforedescribed homing circuit for switch MMSEQ1 completed by relay 2130 causes the switch to step home and open the holding circuits for relay 2130 and 2140 at off-normal springs 2006. Switch MMSEQ1 also closes springs 2007 to maintain relay 2180 operated. The original operating circuit for relay 2170 is opened at contacts 2143, however it remains operated as long as pulses are received on lead C2203(21). Thus it may be seen that, when message characters are being transmitted from the central office, switch MMSEQ1 is stepped for no purpose and the switch is stepped home.

In the event transmission from the central office should stop for a sufficient interval, relay 2170 may restore to again prepare a circuit for relay 2150, however it is reoperated as soon as a few more message characters are received at the station in a manner already explained. The just-described procedure then take place again.

In the event the station power was turned on at a time when only some of the control characters of the six sent as described previously from the central office could be received at the station, switch MMSEQ1 thereat is stepped to a position corresponding to the number of received control characters in a manner explained heretofore. As no further pulses are received over the signal circuit extending from conductor C2203(22), relay 2150 remains restored, and relay 2160 which releases some time thereafter remains restored. Relay 2180 in turn restores after a time as both contacts 2161 and off-normal springs 2007 are open. It opens the circuit to relay 2110 at contacts 2181. If switch MMSEQ1 is in any of its first three positions, it completes no circuit. If switch MMSEQ1 is in its fourth or fifth position, a circuit is completed from ground at contacts 1953 and 2137, through contacts 2184, level B of switch MMSEQ1 in its fourth of fifth position to relay 1850. If the switch is in its fifth position the ground from contacts 1953 is also extended over switch level C to energize relay 1840.

Relay 2110 is held operated for a period of time determined by the condenser resistor network connected thereto at contacts 2111. It eventually restores to close contacts 2112 to energize relay 2130, as described. Relay 2130 opens the circuits for relays 1840 and 1850 at contacts 2137, and they restore. It completes an aforedescribed circuit for stepping switch MMSEQ1 home and relay 2180 is reoperated, while relay 2130 is restored, as described. The station is then again ready to receive pulses.

Relay 1850, which operated over the fourth or fifth contact of level B of switch MMSEQ1, extends ground at contacts 1855 over contacts 1947 to operate relay 1930. At contacts 1931 relay 1930 extends a holding circuit for itself through relay 1940 to ground, however relay 1940 remains shunted by the original operating ground for relay 1930. Likewise relay 1840, if operated, completes a circuit from contacts 1843 for relay 1930. When relay 2130 operates the circuits for holding relays 1840 and 1850 operated, is opened and those relays release to open contacts 1843 and 1855, respectively. This removes the shunting ground from relay 1940 which operates in series with relay 1930. Relay 1940 opens contacts 1947 to prevent a shunt from again being extended thereto. At contacts 1943, 1944 and 1945 it prepares respective holding circuits for relays 1910 and 1980, 1860 and 1840, respectively.

The receipt of a full six character control sequence from the central office results in a stepping of switch MMSEQ1 to its sixth position. After relay 2180 restores, and before relay 2110 restores to operate relay 2130, as already explained, ground from contacts 1953 is extended through contacts 2137 and 2184, through the wiper of level B of switch MMSEQ1 on its sixth contact, through contacts 1734 to energize the upper winding of relay 1860. If switch MMSEQ1 were stepped to its seventh position as a result of seven character control sequence being transmitted from the central office in a manner which will be explained, the ground from contacts 1953 is forwarded over level B of switch MMSEQ1 in that position, and contacts 1734 to energize the upper winding of relay 1860. Relay 1860 energizes its lower winding over contacts 1862, 1854, 1944 and 1951, if relay 1940 was previously operated. If switch MMSEQ1 is in its seventh position the ground from contacts 1953 is also extended over switch level C and contacts 1863 to energize relay 2140. Switch MMSEQ1 is thereafter stepped home in either case in a manner explained, by operation of relay 2130.

If relays 1930 and 1940 were not previously operated, relay 1860 energizes relay 1930 at contacts 1865 and 1947. Relay 1860 releases as soon as relay 2130 opens contacts 2137, and switch MMSEQ1 starts stepping. Relay 1930 then locks operated in series with relay 1940 as explained. It then prepares the just-described circuit for the lower winding of relay 1860 at contacts 1944 so that when relay 1860 is operated on a second control sequence of six or seven characters, the circuit to its upper winding is completed.

In the event an eight character control sequence is transmitted from the central office in a manner which will be explained, to step switch MMSEQ1 to its eighth position, ground is extended in a manner already explained from contacts 1953 to the eighth contact of wiper B of switch MMSEQ1 to operate relay 1870. At contacts 1874 it completes the circuit for energizing relay 1930, if relay 1940 were not previously operated to open contacts 1947. Switch MMSEQ1 is stepped home in a manner explained under control of relay 2130, and the circuit for holding relay 1870 operated is opened. Relays 1930 and 1940 are then held operated in series so that a next six or seven character sequence received for operated relay 1860 results in relay 1860 remaining operated over the described circuit for its lower winding.

In the event a nine character control sequence is transmitted from the central office in a manner which will be explained, switch MMSEQ1 on its ninth contact extends ground from its level B wiper, in a manner explained, to relay 1910. Relay 1910 extends ground at contacts 1913 for operating relay 1930. Relay 2130 is therefore operated in a manner explained to step switch MMSEQ1 home and to open the circuit to relay 1910 at contacts 2137. This allows relay 1940 to operate the series relay 1930. If relays 1940 and 1930 were previously operated, relay 1910 is not restored, but remains operated over a holding circuit including contacts 1912, 1873, 1944 and 1951. A six or seven character control sequence following operation of relays 1940 and 1930 by relay 1910 results in relay 1860 being able to complete the circuit to its upper winding, as explained.

If a ten character control sequence is received, ground is extended from level A of switch MMSEQ1 to contacts 2135 to operate relay 1950. It opens contacts 1951 to restore any relay held operated therefrom, and also opens contacts 1953 to prevent any circuit from being completed thereby. Relay 2130 is thereafter operated in a manner explained to step switch MMSEQ1 home. Relay 1950 completes a holding circuit for itself over contacts 1952 and either contacts 1735 or contacts 1946 and, for example, 1865 if the relays controlling these contacts are operated. Opening contacts 1953 will restore the relays operating these contacts to in turn open the just-mentioned holding circuits.

Thus in all events where the station receives a 4, 5, 6, 7, 8 or 9 character control sequence at the beginning of the day followed by a 6 or 7 character sequence, relay 1860 is held operated thereafter. Relay 1860 and 1940 must be operated to permit messages to be handled at their associated station.

*Initiating station message transmission*

The message to be sent from one of the multipoint stations includes in sequence an SOM, a message number having the channel designation and station identification followed by the message number of the day, a precedence designation and station identification, one or more routing indicators, the body of the message and SOM. This is then followed by a series of letter shift characters, which serve primarily to advance the tape at the central office from the reperforator. Before the SOM, a precedence designation is added to the message. This information is punched into a tape as a series of five lateral perforations or spaces individual to and representing each character of the message, and the tape is extended to the transmiter 2222. The tape indicated by the reference character 2223 extending to the transmitter is then slack so that contacts 2225 close to extend the battery from one side of the transmitter clutch magnet M5 over lead C2204(18), contacts 1831, 1821, 1711, 1811 and contacts 1762 to ground. This energizes the clutch magnet and the transmitter begins to pull the tape past its sensing contacts.

When the transmitter sensing pins respond to the first character of the precedence designation preceding the SOM, it transmits to the selector magnet 2221 a series of five coded, space or mark conditions conforming to the first character. The potential for controlling transmission is provided from the +B lead in Fig. 18, contacts 1816′, lead C1802(22), the transmitter contacts 2222A–2222F, the left windings of magnet 2221, lead C1803(18) and contacts 1817′ to the −B lead. Transmitter contacts 2222A open at the start of each transmitter cycle to provide a start signal to the selector magnet 2221. The selector magnet marks an output lead individually corresponding to each character transmitted thereto, as the transmitter sensing contacts 2222B–2222F respond to the tape perforations. It is actually arranged to mark an output lead corresponding to the character preceding the character last transmitted thereto by the transmitter 2222. The characters which generally precede the precedence designation are usually one of the last 12 letter shift characters perforated in the tape at the end of the preceding message.

The selector magnet 2221 responds to the continued operation of the transmitter by providing eventually an output corresponding to the first character of the precedence designation preceding the SOM. Ground is then extended from contacts 2233 closed during each cycle of the magnet 2221, over either leads M, P or R to lead C2241(17) if the message is low precedence, or over either leads O, Y or Z to lead C2243(17) if the message is high precedence.

Magnet 2221 also extends ground from contacts 2233 to lead C2245(17) during each cycle, if the magnet is not responding to a blank or letter shift character. Ground on lead C2245(17) is extended past contacts 1722 to energize the motor magnet of switch MMCTG. At the end of the cycle, ground is removed and the switch steps. If it reaches its fifth position, the upper winding of relay 1710 is energized over the contacts 1824, 1834, 1811 and 1762. It energizes its lower winding at contacts 1713 and 1719, and opens the circuit to magnet M5 at contacts 1711 to stop the transmitter. At contacts 1712 relay 1710 completes a signal circuit and at contacts 1714 completes a self-interrupted homing circuit for switch MMCTG over springs 1704 and 1703.

In the event lead C2241(17) is grounded, the ground is extended over contacts 1737 to operate relay 1820. At contacts 1826 it completes a signal circuit. At contacts 1825 it locks to ground over contacts 1814, 1764 and key contacts 1719. At contacts 1824 it opens the incomplete circuit to relay 1710 to prevent its operation. At contacts 1821 it opens the circuit to the transmitter clutch magnet M5 to stop further operation of the transmitter 2222. At contacts 1823 it extends the battery from one side of relay 1970, past contacts 1961, through previously operated contacts 1861 to contacts 1941 and ground over the contact N and wiper of level A of switch MMSEQ1.

Relay 1970 closes contacts 1971 to energize the slow-to-operate relay 1960. At contacts 1961 relay 1960 opens the circuit for operating relay 1970. Relays 1960 and 1970 respectively hold contacts 1962 and 1972 open for a period conforming to the transmission of a start signal, after which relay 1970 restores to open the circuit for relay 1960. It is operated for a period conforming to the transmission of the five codes of a character. It then restores to reoperate relay 1970 and the cycle is repeated. A circuit normally extends from one side of battery at the central office 300, through key contacts 334, the −ML conductor of line 5, over contacts such as 1982, over contacts such as 1962 and 1972 in shunt at station 1, contacts such as 1818′ at station 1, resistance 1809A, contacts such as 1815′ at station 1, over conductor −MLA extending to station 2, over a similar circuit at station 2 including resistance 1809B, to conductor 1804(19), contacts 1982, contacts 1972 and 1962 in shunt, contacts 1818′, resistance 1809, contacts 1815′, back over the +ML side of line 5, key contacts 331, the right windings of the selector magnet M2 at the central office 300, through the right winding of polar relay 302, back to battery. When this series circuit is opened at contacts 1962 and 1972 in station 3, the magnet M2 at the central office reacts to the start signal represented thereby to close contacts 305 and extend ground over lead C373(11). It also goes through a cycle corresponding to the transmission period of a character, and reacts to ground a lead corresponding to the character transmitted as represented by a series of five coded open or closed conditions of line 5 corresponding to the transmitted character. The grounded output lead corresponding to the transmitted letter shift character, however, completes no circuit.

At the central office the polar relay 302, if its bias windings are effective, opens contacts 304 during the start signal transmitted from station 3 to simulate a start signal over conductor C366(8) at the beginning of the transmitted character. It then operates contacts 304 to ground or open lead C366(8) in accordance with the character represented by the opening and closing of line 5 for the remainder of the character transmission period and then closes contacts 304 to provide a stop signal. Contacts 303 closing during the start signal extends ground over lead C367(13). With relay 1240 in the central office operated at this time to ground the bias windings of relay 302 in an explained manner, it does not respond to the incoming signals.

The ground on lead C373(11) is extended through relay 1160 and contacts 1243 to operate relay 1160, if relay 1240 is operated. If relay 1240 were restored, this circuit is not completed until relay 1240 operates. The magnet M2 in the meantime is responding continuously to the incoming signals to pulse lead C373(11). At contacts 1161 relay 1160 completes a circuit including contacts 1153, the conductor C1101(5) and the ground at key contacts 599 for operating the upper winding of relay 1210. Relay 1210 operates its lower winding over contacts 1215 and 1326. At contacts 1218 it completes an alternate holding circuit for relay 1240 from contacts 1278. At contacts 1212, the relays 1330 and 1040 are operated from ground at contacts 1328 and 1372 extended over contacts 1263, 1354 and 1321 in one case and over contacts 1074 and 1021 in the other case. At contacts 1217 the circuit for relay 1150 is opened to prevent it from responding to a pulse on lead C501(5). At contacts 1216 relay 1260 is connected via contacts 1228 to the fourth contact associated with the wiper B of switch MMSEQ.

Relay 1040 operates relay 1050 which in turn energizes relay 1130, as described. An aforedescribed sequence is now completed for stepping switch MMSEQ and for transmitting over line 6 a series of "0" characters each followed by a pause to each of the polar relays 2230A, 2230B or 2230 at the respective multipoint stations 1, 2 and 3.

Relay 1260 is operated when switch MMSEQ level B reaches contact 4, from ground at contacts 1052 extended over contacts 1062 and 1142, conductor C503(5), key contacts 540, conductor C502(12), switch MMSEQ wiper B on its fourth contact, contacts 1228 and 1216. Switch MMSEQ stepping from its third contact therefore prevents the circuit to relay 1130 from being completed, as contacts 1216' are open. Switch MMSEQ is therefore stepped no further at this time. Thus a total of four "0" characters each followed by a pause are transmitted over line 6 to the station polar relays, before transmission ceases.

Relay 1260 at contacts 1263 opens the circuit to slow-to-release relay 1330 and that relay starts to restore. At contacts 1266 it opens lead C375(3) to enable the polar relay 302 to respond to the incoming message characters. It will be recalled that the transmitter clutch magnet at the sending station is still deenergized, however relays 1960 and 1970 at the station are cooperating to transmit a series of letter shift characters.

The polar relays 2230A, 2230B and 2230 at the respective stations each responds to the series of characters transmitted thereby by grounding a conductor such as C2203(21) at their respective stations. Switch MMSEQ1 at each station is therefore stepped in accordance with the received character pause control sequence in a manner explained. When switch MMSEQ1 takes its first step, the circuit to relay 1970 is opened at switch level A. Relay 1970 remaining restored prevents further transmission to the central office by maintaining the circuit over line 5 closed. As four characters were sent, switch MMSEQ1 is stepped to its fourth position to operate relay 1850, as already explained. It locks operated over contacts 1853, 2137 and 1953. At contacts 1854 it opens the circuit to the lower winding of relay 1860 to restore that relay. At contacts 1852 it opens a possible circuit to relay 1980, and at contacts 1851 it opens one of the circuits to relay 1920.

*Selection of station to transmit*

The stations on a line are selected on the in-turn basis, and in accordance with the position of the station select switch MMTR2. After all of the stations on the line have been alerted by a four character pause control sequence as described, a pause is introduced while relay 1330 restores as above described. This pause, after the just-described four character pause sequence, permits relays 2170 and 2180 in the station control unit 1600 to restore, as will be explained in more detail.

Upon release of the relay 1330, a circuit is completed at contacts 1331 including contacts 1261, 1271, 1311 and 1511 to conductor C1501(26) for operating the clutch magnet of the outgoing channel unit markable transmitter 2601. On each cycle of operation of the markable transmitter ground is applied to the conductor C2609(15) which is extended via contacts 1526 to relay 1430 and battery. In operating relay 1430 now completes at the contacts 1435 a circuit from ground at contacts 1265 for operating the magnet of the transmit switch MMTR1.

The station select switch MMTR2 is provided to record, which of the ten or less stations on a given line has last been used, and the A and B level wipers thereof remain in contact with the bank terminals corresponding to that station after the switch has been stepped thereto, as will be explained. The station next to be selected for use is chosen from among the group succeeding the last selected station.

Now with the relay 1430 operating once per cycle over the conductor C2609(15) as previously stated, the contacts 1435 pulse the magnet of switch MMTR1 thereby stepping its wipers over their respective bank contacts. The A level wiper of switch MMTR1 scans the level A bank contacts of switch MMTR2 in sequence. A circuit is completed, when switch MMTR1 reaches a contact preceding the contact to which switch MMTR2 is set. This circuit extends from contacts 836, conductor C1201(12), contacts 1267, the wiper of level B of switch MMTR2 on any one of contacts 2–9, a strap between that contact and a preceding contact on level B of switch MMTR1, contacts 1431 to the lower winding of relay 1450 and to relay 1310. Relay 1310 operates to open the transmitter clutch magnet circuit at contacts 1311.

At the termination of the pulse on lead C2609(15), the relay 1430 restores and opens the circuit for the motor magnet of switch MMTR1 at contacts 1435. The wipers of the switch then take one step so that they are now set to the same position as switch MMTR2. Also the number pulse relay 1430 interrupts at the contacts 1431, the circuit for relay 1310 which is slow to restore. After a delay relay 1310 restores. It holds contacts 1311 open for a predetermined period, after which the previously traced circuit for the clutch magnet of the markable transmitter 2601 is completed. Another "0" character is then transmitted. The switch MMTR1 is then in the position corresponding to the last station selected as determined by the position of the switch MMTR2. Relay 1430 operating, while the character is being transmitted, completes a circuit from contacts 1264 and 1434, the level A wiper of switch MMTR1 and the level A wiper of switch MMTR2 to energize the motor magnet of switch MMTR2. The magnets then step their wipers in synchronism to their succeeding contacts under control of relay 1430 as explained. Relay 1310 is operated as explained to open the clutch magnet circuit to introduce another pause while a determination is made if the station corresponding to the position of the switch has a message to transmit.

Switch MMTR1 thus takes a number of steps depending upon the position of switch MMTR2, during which time a sequence of "0" characters are transmitted to the stations on line 6, in a manner explained. None of these characters except the last are followed by pauses. After this the switches are stepped in synchronism while a series of "0" characters each followed by a pause is transmitted to the stations. It will be noted in this connection that if switch MMTR2 is in its normal position, that switch MMTR1 completes the just-described circuits immediately over the normal contacts of each switch, while the first "0" is being transmitted. In this manner stepping continues until a station is found having a message to transmit.

The time interval between the sending of the last character of the four character pulse pause sequence counted by switch MMSEQ1 for operating relay 1850 and the sending of the first character of the sequence without pauses counted by switch MMTR1 in the central office is determined by the release time of relay 1330. A sufficient interval elapses between these sequences to allow relay 2180 in each station to restore. It closes the contacts 2183 so that the polar relay such as 2230 at the station on responding to the character of the next sequence grounds lead C2203(22) to operate relay 2120. The circuit to relay 2110 is opened at contacts 2181, however the second sequence starts to arrive at each station, before relay 2110 can restore to operate relay 2130 for stepping switch MMSEQ1 home.

Relay 2120 responding to the pulses representing one character on lead C2203(21) closes contacts 2121 to hold relay 2110 operated. At contacts 2122 it extends ground past contacts 1923 to hold slow-to-release relay 1920 operated and at contacts 2123 extends ground past contacts 1856, operated by relay 1850 on the receipt of the previously described four character pause control sequence to energize the motor magnet of switch MMTR3. Relay 2120 restores, when ground is removed from lead C2203(21) during the interval between each transmitted character. It opens contacts 2122 to step switch MMTR3, and energizes the switch motor magnet when the next character is received. When switch MMTR3 steps, a circuit extending to relay 1920 from contacts 1871 is opened at level A of switch MMTR3, while another circuit for relay 1920 is already open at contacts 1851. Switch MMTR3 is stepped once for each transmitted character of the second sequence and counts the same in synchronism with switch MMTR1 in the central office.

When switch MMTR1 is standing on the contact preceding the contact on which switch MMTR2 is standing, it will be recalled that relay 1310 is operated and a character pause sequence thereafter transmitted. With relay 2120 remaining unenergized for the duration of the pause introduced by relay 1310, relay 1920 restores, as all circuits thereto are open. At this time switches MMTR1, MMTR2 and MMTR3 are each positioned on the contact corresponding to the last station to transmit. Relay 1920 closes contacts 1921 and 1922 and opens contacts 1923. Closing contacts 1921 at each station prepares a circuit for relay 1905 at each station. Closing contacts 1922 prepares a circuit for relay 1740 for no purpose now. Opening contacts 1923 prevents the circuit from being completed to relay 1920, when relay 2120 is again operated as a result of a character transmitted from the central office.

Relay 1310 in the central office releasing completes the markable transmitter clutch circuit, and the transmitter goes through another cycle to send another "0" and also reoperating relay 1430 in the central office as described. The motor magnets of switches MMTR1 and MMTR2 are energized as before described. The character transmitted over the line reoperates the polar relays 2230A, 2230B and 2230 at each of the stations to extend a ground over each of the conductors such as C2203(21) and operate relay 2120 at each station. Relay 2120 again energizes the motor magnet of switch MMTR3, which closes the self-interrupting contacts 2014 to extend a circuit to relay 1905 over contacts 1921. At the end of the character the switches MMTR1, MMTR2 and MMTR3 are each stepped to a succeeding contact representing the first station in the group succeeding the last station to transmit. Relay 1905 in the meantime locks energized over contacts 1907, 2134 and 2164. Switch MMTR3 at each station is then stepped to a succeeding contact, as explained. If the position of the switch MMTR3 at one of the stations then corresponds to that assigned the particular station, a circuit is completed from the self-interrupting contacts 2015, contacts 2132, 1822 and 1841, the strap between the terminal TS and contacts of level B of switch MMTR3 corresponding to the station and contacts 1906 to relays 1810, 1730 and 1720. The message will now immediately be transmitted to the central office to terminate further stepping of switches MMTR1, MMTR2 and MMTR3, as will be explained. If the station does not have a message to transmit, relay 1820 thereat is unoperated and contacts 1822 open to prevent the completion of a circuit to relays 1810, 1730 and 1720. The switches MMTR1, MMTR2 and MMTR3 continue to step until a station having a message to transmit is found.

Relay 1810 on operating closes contacts 1813 to extend ground from key contacts 1719 past contacts 1764 to maintain a shunt on relay 1750. At contacts 1814 it releases relay 1820, which opens the circuit to relays 1810, 1720 and 1730 at contacts 1822, however, relay 1730 has already completed a holding circuit for itself and relays 1810 and 1720 over contacts 1731, 1866 and 1953. At contacts 1812 relay 1810 extends ground from contacts 1762, past contacts 1751 to lead C2204(22) to energize the clutch magnet M5 of the transmitter 2222. At contacts 1816' and 1817' it disconnects the original battery for the transmitter 2222 and the selector magnet 2221, and connects them in series over line 5 with the polar relay 302 and selector magnet M2 at the central office, at contacts 1815, 1816, 1817 and 1818, while disconnecting the resistance 1809 from the line 5 at contacts 1815' and 1818'. The station transmitter 2222 is now operating to transmit the message automatically to the polar relay 302 and the magnet M2 at the central office over line 5. The resistance in the line loop is not changed by the insertion of transmitter 2222 and magnet 2221 in place of resistance 1809. In this manner the first station in the group succeeding the last station to transmit, and having a message to transmit, as indicated by operated relay 1820, automatically begins transmission to the central office.

Relay 1720 at contacts 1722 prevents switch MMCTG from being stepped by pulses on lead C2245(17), and at contacts 1721 completes a self-interrupted homing circuit for switch MMCTG. Relay 1730 at contacts 1737 opens the original circuit for relay 1820, and at contacts 1735 prepares a holding ground for relay 1950. At contacts 1733 it prepares a circuit for relay 1760.

At the central office the first character of the SOM is received to operate the selector magnet M2 accordingly thereby closing contacts 313 to ground lead Z for no purpose. The polar relay 302 responding to the first character of the SOM as relay 1260 has removed ground from lead C375(3), closes contacts 303 to ground lead C367(13). This ground is extended past contacts 1312 still held operated by relay 1310 to operate relay 1270. Simultaneously the circuit extending from contacts 304, lead C366(8), contacts 844, lead C350(3), key contacts 333, lead +L(4), the windings of reperforator magnet M at line circuit 400, circuit connections described in the aforementioned application, lead —L(3) and key contacts 331 is opened at contacts 304. This serves as a start signal to the reperforator magnet M, and it responds to the succeeding series of open or closed conditions of contact 304 controlled by relay 302 in accordance with the transmitted character for perforating the tape extending to the line circuit tape reader accordingly. Characters representing letter shifts, blanks or precedence designations which may be transmitted to magnet M ahead of the first Z of the SOM only cause the tape to be perforated accordingly and to advance to the tape reader.

Relay 1270 opens contacts 1271 to prevent reoperation of the markable transmitter clutch magnet by the restoration of relay 1310. Therefore no further control pulses are transmitted. At contacts 1278, relay 1270 removes the holding ground for relay 1240, which restores. At contacts 1279 relay 1270 opens lead C501(5)

to open another point in the circuit for extending ground pulses to relay 1150. At contacts 1275 a holding circuit for relay 1270 is extended through contacts 1267 to ground over lead C1201(8) and contacts 836. As soon as relay 1240 restores this circuit is completed through contacts 1248 instead of 1267 as relay 1260 will shortly be restored. At contacts 1276 ground is extended over contacts 1237 to lead C498(4) and to the incoming line circuit 400 to signal the line circuit that an incoming message is being received in a manner explained in the aforementioned application. At contacts 1277, lead C375(3) is maintained open to insure that the polar relay 302 is not interfered with during receipt of the message. At contacts 1243 relay 1240 opens the circuit to relay 1160 so that it cannot be pulsed by contacts 305.

A circuit for relays 1010 and 1320 is also completed on operation of relay 1270 over contacts 1273 and 1213. Relay 1320 in turn energizes relay 1330 as explained, and removes the holding ground for relays 1210 and 1050 at contacts 1326. At contacts 1327 it energizes relay 1030 as previously described. At contacts 1329 a self-interrupted homing circuit for switch MMTR1 is completed through off-normal springs 1466 and the switch steps home. Switch MMTR2 remains in the position to which it was last stepped, unless it is in its tenth position, so that the next station to be selected for transmission will be from the group succeeding the station presently transmitting. At contacts 1323 relay 1320 completes a self-interrupted homing circuit through off-normal springs 1443 for switch MMTR2, if the switch is on its tenth contact as the off-normal springs close only in that position. At contacts 1328 the circuits to the upper winding of relays 1450 and 1040, respectively, are opened, and they restore. A circuit is also prevented from being completed at contacts 1328, to the upper winding of relay 1120, through the wiper of level C of switch MMTR1 and its tenth contact as switch MMRT1 steps home.

If relay 1270 should not be operated, when switch MMTR1 is on its tenth contact, a circuit is completed from contacts 1328 extended through the wiper of level C of switch MMTR1 to the upper winding of relay 1120. It will be noted that this level is provided with a single wiper, whereas other levels are each provided with three so that level C of the switch must actually step through thirty-three positions before relay 1120 can operate. Relay 1120 operates to complete an energizing circuit for its lower winding at contacts 1123 to ground at key contacts 1029. At contacts 1124, 1125 and 1126, respectively, it completes various signal circuits and at contacts 1122 extends ground from contacts 1213 past contacts 1272 to operate relays 1010 and 1320. Switches MMTR1 and MMTR2 are then stepped home.

Relay 1010 on operating completes a homing circuit for switch MMSEQ over contacts 1016 and off-normal springs 1256 as already explained. At contacts 1014 it operates relay 1060. When relay 1050 is restored, relay 1060 also restores. It in turn restores a holding circuit for relays 1010 and 1320 at contacts 1061, as explained. When switches MMSEQ and MMTR1 are stepped home, their various off-normal springs are reset and holding circuits provided for relays 1010 and 1320 from both off-normal springs 1257 and 1467, respectively, are opened.

In the preceding description it was assumed that one or more stations in a group succeeding the last station to transmit has a message to transmit. If, however, the station having a message to transmit is the last station to transmit or is one of the preceding stations, switch MMRT1 is stepped to the position corresponding to the last station to transmit, as explained. Switches MMTR1, MMTR2, and MMTR3 then step in synchronism until contacts 10 are reached at which time relay 1120 may be operated to step the switches home. As relay 1270 is not operated to restore relay 1240, relay 1160 is operated to maintain relay 1210 operated, and the markable transmitter clutch magnet circuit is therefore effective. The switches are therefore stepped to contacts 1 and a search made of the station having a message to transmit. If, as is most likely, relay 1120 is not operated, the switch magnets are energized as described and step to their first position in a manner similar to that already described. Switch MMTR2 on stepping to its first contact completes the circuit for relay 1310 directly, and thereafter as switches MMTR1 and MMTR2 continue to set up the circuit for relay 1310 is completed from the connection between the contacts of level B of switch MMTR2 extended through contacts such as 1451 of relay 1450 to the corresponding contact of level B of switch MMTR1. The number of straps provided between the contacts of level B of switches MMRT1 and MMTR2 is dependent on the number of stations. Thus for contacts representing no station a strap is not provided and therefore relay 1310 cannot be energized when the switches are in those positions. Although a series of "0" characters are transmitted while the switches are stepped over these positions, a pause is not introduced between these characters as relay 1310 cannot operate.

The markable transmitter 2601 stops transmission of characters as explained, after relay 1270 operates from the incoming message transmission. The subsequent pause causes the relay 2120 at each station to remain restored for a sufficient period to enable relay 2110 to restore. It completes a circuit to relay 2130 at contacts 2112 and relay 2130 interrupts the circuit for relay 1850 at contacts 2137. At contacts 2134 it opens the holding circuit to relay 1905 so it restores. With relay 1850 restored the circuit to relay 1920 is completed over level A of switch MMREC2 in its home position and that relay reoperates to open contacts 1921. Thus relay 1905 at each station and relay 1920 at each station is restored and operated respectively. Switch MMTR3 is stepped home over self-interrupting contacts 2015, off-normal springs 2016 and contacts 2131, while switch MMSEQ1 steps home as described. At the station transmitting, however, relays 1810, 1730 and 1720 remain operated over the aforedescribed holding circuits therefor. Relay 2130 is held operated from off-normal springs 2006 and from ground at off-normal springs 2017 until both switches MMSEQ1 and MMTR3, respectively, are stepped home. At this time the off-normal springs open and relay 2130 restores. Relay 2180 is reoperated in a manner already described so that incoming pulses to the stations may be extended to relay 2150 in a manner already explained.

*High precedence message transmission*

If one of the stations 1, 2 or 3 has a high precedence message to transmit to the central office, the tape with a high precedence designation preceding the SOM and perforated in accordance with the message is fed to the transmitter 2222. As the first character of the high precedence characters OO, YY, or ZZ are transmitted from transmitter 2222 to the selector magnet 2221, it grounds the high precedence lead C2243(17) over either lead O, Y or Z. This completes a path via contacts 1739 for operating the high precedence relay 1830. At the contacts 1831 the circuit for operating the clutch magnet M5 is opened to stop the operation of the transmitter 2222. At contact 1835 a locking circuit is completed for relay 1830 over contacts 1814 and 1864 to key contacts 1719. At contacts 1834 a possible circuit for relay 1710 is interrupted, and at contacts 1836 a signal circuit is completed. At contacts 1833 ground from switch MMSEQ1 level A is extended past contacts 1842 and 1852 to operate relay 1980.

Relay 1980 interrupts at the contacts 1982, the loop over line 5 to the polar relay 302 and selector magnet M2 at the central office so as to simulate the transmission of a series of blank characters to the central office. Relay 1980 locks operated over contacts 1981, 1763,

1854, 1944 and 1951. The line 5 is now held open and the magnet M2 responds thereto, as though a continuous series of blanks are received at the central office. It will be noted that in the event a message is being transmitted to the central office when the line is opened, that the message is interrupted.

The magnet M2 at the central office goes through one cycle for each time period equivalent to the sending of a blank character, and it grounds lead C373(11) at contact 305 for each cycle to operate relay 1160 as previously described. It also grounds an output lead C369(8) individually corresponding to the blank character. This lead C369(8) extends to slow-to-release relay 870, which operates from the ground thereon. At contacts 871 it extends the ground on lead C369(8) past the N contact of switch MMHP level A to energize the switch motor magnet. Relay 870 remains operated while the ground is removed between blanks, however the motor magnet deenergizes to step its wipers. After stepping to contact one switch MMHP level A extends the ground for energizing its motor magnet over its first four multipled contacts. If less than five blanks are received, relay 870 restores to open the stepping circuit for switch MMHP, and closes contacts 872 to complete a circuit to relay 855 over the level C wiper. Relay 855 closes contacts 857 so that it locks operated over off-normal springs 868, and also closes contacts 856 to step the switch home in a self-interrupted manner over off-normal springs 867 and interrupting contacts 862. When the switch is home, springs 868 open to restore relay 855. If five blanks are received, ground is extended from contacts 858 and the level B wiper of switch MMHP in its fifth position to lead C875(12) to operate relay 1220. Switch MMHP is not stepped past contact 5 as its stepping circuit is opened at contact 5. Relay 1220 at contacts 1223 completes a circuit for lighting a high precedence lamp. At contacts 1222 it completes circuits to relays 1040 and 1330, and at contacts 1229 it renders the polar relay 302 ineffective by extending ground over lead C375(3).

Relay 1160 in the meantime operates relay 1210 as previously described, and it in turn operates relay 1040, as described. Relay 1040 operates relay 1050 and a previously described sequence for transmitting the characters "0" each followed by a pause is now instituted, and the characters are counted by switch MMSEQ. If an incoming message were being received, when blank transmission starts, relay 1210 fails to operate, as relay 1240 is maintained restored at contacts 1278. Relay 1220 completes the aforementioned circuits to relays 1040 and 1330 at contacts 1222, and also completes at contacts 1224 a circuit including contacts 1244, 1233 and 1210 to lead C1202(8) for operating relay 835. It releases relay 1270 at contacts 836 and initiates other operations, which will be described later for cancelling the incoming message.

With relay 1220 operated before the sequence is completely sent, relay 1260 is prevented from operating, when switch MMSEQ steps to contact 4, as contacts 1228 are open at that time. Instead ground from contacts 1052 and 1062 is extended past contacts 1142, conductor C503(5) and an already described circuit to conductor C502(12), the level B wiper of switch MMSEQ to contacts 1227 for energizing relay 1130 again. This completes the markable transmitter clutch magnet circuit and another "0" character is transmitted to the stations on line 6. This is followed by a pause controlled by the release period of relay 1130 as previously described. This MMSEQ is stepped to contacts 5 at which time the ground on conductor C502(12) is forwarded past contacts 1125 and 1216 to operate relay 1260 instead of relay 1130. At contacts 1266 lead C375(3) is opened to permit the relay 302 to respond to incoming signals. Relay 1330 starts to release as described previously. An aforedescribed sequence now takes place for stepping switch MMTR1, after release of relay 1330, to count a series of "0" characters which are transmitted to the stations on line 6 without pauses therebetween, as explained. When switch MMTR1 is aligned with switch MMTR2 in the manner previously explained, each character that is transmitted is followed by a pause, in the manner explained.

At the multipoint stations 1, 2 and 3, each switch corresponding to MMSEQ1 is stepped on receipt of the five pulse pause sequence in the same manner as described for the receipt of the four character pulse pause sequence. When switch MMSEQ1 at each station reaches its fifth contact, relay 1850 is operated over a circuit previously described, on the release of relay 2180 during the pause following the transmission of the five character control sequence from the central office. At contacts 1852 it opens the circuit to relay 1980, and at contacts 1854 it opens the holding circuit for relay 1980, if operated. The ground for operating relay 1850 is also forwarded over wiper C of switch MMSEQ1 in its fifth position to energize the lower winding of relay 1840. Relay 1840 energizes its upper winding over contacts 1844, 1864, 1945 and 1951. At contacts 1842 it opens the original circuit to relay 1980. This prevents operation of relay 1980 at any station thereafter having a high precedence message to send. Relay 1980 now restores to close contacts 1982 so that the line 5 remains complete and transmission of blanks to the central office stops. At contacts 1841 at each station, a circuit for operating relays 1810, 1730 and 1720 is opened. This prevents a completion of a circuit to relays 1810, 1730 or 1720 at any station not having a message to send, and prevents the completion of a circuit to relays 1810, 1730 and 1720 at any station having the low precedence relay 1820 already operated.

Switch MMTR3 at each station is then stepped to a position corresponding to the last station to transmit under control of switch MMTR1, as previously described, while switch MMTR1 is stepped to a position in alignment with switch MMTR2. A character pulse pause sequence is transmitted thereafter as described from the central office to step switch MMTR3 in accordance with the number of characters transmitted. When switch MMTR3 is in the position corresponding to the last station to transmit, relay 1905 is operated by the energized motor magnet of switch MMTR3, as relay 1920 is restored by then, as explained. When switch MMTR3 is thereafter positioned on the contact corresponding to its station, and relay 1830 thereat is operated indicating that a message is to be transmitted, ground is extended from contacts 2015, 2132 and 1832, past terminal TS, to the corresponding contact of level B of switch MMTR3, past contacts 1906 to operate relays 1810, 1720 and 1730 as previously described. An aforementioned sequence now takes place for initiating transmission of the station message to the central office.

Polar relay 302, at the central office, responding to the first character of the message, grounds lead C367(13) to operate relay 1270, during the operate time of relay 1310, as previously described. An aforedescribed operation now takes place for stepping switches MMSEQ, MMTR1, MMSEQ1 and MMTR3 home. Relay 1320 which partially controls the release operation as described, closes contacts 1325 to extend ground over lead C876(8) to energize relay 855. It steps switch MMHP home. At off-normal springs 866 ground is maintained on lead C877(10) to relays 1010 and 1320 until the springs open. Relay 870 restores when blank transmission is stopped. Relays 1850 and 1905 at the stations are restored as described, while relay 1920 is operated. Relay 1840 at each station remains operated to prevent relay 1980 at any station from being operated and a message is attempted to be sent therefrom at contacts 1842.

*Receipt of message at central office*

Responsive to the start signal of the first character received over line 5 the polar relay releases to open contacts 304. This serves as the start signal to the reperforator magnet M at the line circuit 400 and it now goes through its cycle. Polar relay 302 responds to the coded series of five space or mark conditions, represented by the opening or closing of line loop 5 in accordance with the first character of the SOM. Contacts 304 are controlled accordingly so that the reperforator magnet M responds in accordance therewith and perforates a tape in accordance therewith. The transmitted characters thus control relay 302, which in turn controls magnet M in accordance with the received characters. The magnet perforates a tape in accordance with the received characters of the SOM, message number, precedence designation routing indicators, body of the message and an EOM and feeds this tape to a tape reader.

The line circuit 400 has an SOM detector which is described in the previously mentioned application, and when the first Z of the SOM is detected by the line circuit tape reader, relay 410 in the line circuit is operated to connect leads MP1(3)–MP5(3), extending from individually corresponding keys contacts 341–345 and from there over leads C361(9)–365(9) to the respective sensing relays 910–950, to the reader sensing leads 1–5. The sensing relays 910–915 are connected in multiple to individually corresponding line circuit sensing relays so that both respond to ground pulses over the reader sensing leads 1–5 from the incoming line circuit 400 tape reader. Therefore the sensing relays of the line circuit respond to the characters read by the reader, as do the sensing relays 910–950. In addition, a sensing relay 470, which is operated shortly after the beginning of the following tape reader sensing cycles and released shortly before the end thereof, is provided in the line circuit for controlling the SOM detector holding circuits. The remaining characters of the SOM affect the SOM detector in the line circuit, while relays 910–950 also complete letter chain detection circuits corresponding to the SOM characters for no purpose.

The channel designation which follows the SOM comprises two letters, which identify the line or channel and a third letter which identifies the station on the line or channel. The sensing relays in the line circuit respond to the channel designation characters for no effect, while sensing relays 910–950 respond to each character of the channel designation by completing letter detection chain circuits corresponding to each character. Thus of the first two characters of the channel designation comprising for example, the letters V and M, relays 950, 940, 930 and 920 are operated on the first character V, and relays 950, 940 and 930 respond to the second character M to complete a corresponding detection chain circuit.

In the case of the character V, ground is extended from contacts 959′, 912, 946, 935 and 923, to terminal V on terminal block 901. Terminal V is connected over lead C761(7), past contacts 734 and 744 to relay 750 in the channel number comparator 700 individually corresponding to station 3. Terminal V is also multipled over a similar connection to similar relays in channel number comparator 900A and channel number comparator 900B, respectively, individually corresponding to stations 1 and 2, respectively.

Thus in each channel number comparator a relay such as 750 is operated, when ground is extended to terminal V. Relay 750 closes contacts 751 and opens contacts 752. Relay 750 energizes in series with the upper winding of relay 740, contacts 751, lead C752(4) to break contacts 479, when relay 470 in the incoming line circuit restores shortly before the end of the sensing cycle. Relay 740 does not operate until the end of the sensing cycle when relays 950, 940, 930 and 920 restore to remove ground from lead C761(7). Relay 740 closes contacts 743 to prepare a circuit for its lower winding and opens lead C762(9) at contacts 744.

When the second character of the channel designation is sensed, ground is extended from contacts 959′, 912, 946, 936 and 923 to the terminal M on terminal block 901. From there ground is extending over lead C762(7) and a similar lead to channel comparators 900A and 900B. At comparator 700 the ground is extended over contacts 733 and 743 to energize the lower winding of relay 740. A similar circuit is completed in each of the other channel number comparators. During the sensing cycle relay 470 operates to open the circuit through the upper winding of relay 740 and to relay 750. Relay 750 is therefore restored. At the end of the sensing cycle, when ground is removed from lead C762(7), the lower winding of relay 740 energizes in series with the upper winding of relay 730, over contacts 752, the upper winding of relay 730, contacts 741, lead C752(4) extending to the contacts 479. Relay 730 in each channel comparator now prepares a circuit for relay 720 in each channel comparator. This circuit is only completed if sensing relays 910–950 complete a letter detection chain circuit individual to the station corresponding to the channel number comparator.

In this case it is assumed that the third character received over the incoming channel is a letter G and that it corresponds to station 3. When this character is read by the tape reader associated with the incoming line circuit, relays 920, 940 and 950 are operated to extend ground from contacts 959′, contacts 912, 946, 936 and 925 to terminal G on terminal block 901. This ground is extended only over conductor C763(7) individual to the channel number comparator 700 and over contacts 732 to energize the lower winding of relay 730. During the sensing cycle, contacts 479 open to restore relay 740 and the upper winding of relay 730. At the end of the sensing cycle, ground is removed from lead C763(7) and the lower winding of relay 730 energizes in series with the upper winding of relay 720 over contacts 742, the upper winding of relay 720, contacts 731, lead C752(4) and contacts 479. Relay 720 locks its lower winding over contacts 721, lead C751(8), contacts 849′ and lead C801(4) extending to ground at break contacts 499 of a relay (not shown) in the line circuit 400, and which is operated only when the EOM is detected. During a succeeding tape reader sensing cycle contacts 479 open to restore relay 730 and the upper winding of relay 720. The lower winding of relay 720 remained energized. Relay 720 closes contacts 722, 723 and 724 to connect the units, tens and hundredths digit switches MMU, MMT and MMH, respectively, of its comparator 700 over leads C423(4), C422(4) and C421(4) to the respective bank terminals of a switch in the incoming line circuit. This switch counts the received characters in a manner explained in the previous application and steps its wipers to leads C421(4), C422(4) and C423(4) in that order.

The channel number switches MMU, MMT and MMH are much the same as described in the aforementioned application. The sensing relays in the line circuit operate in response to the message number now read by the tape reader thereat to ground one of the leads C1–C0 in accordance with the hundredths digit of the message. These leads are extended over cable C475(7) to respective bank contacts of the C level of each of the switches MMH, MMT and MMU. The ground therefore extended over one of the leads is extended past level C of switch MMH, if its wiper is on the corresponding contact, past 724 to lead C421(4) to the contact corresponding to the hundred digit on the counting switch in the line circuit. This enables the switch to be stepped so that the second character of the message number corresponding to the tens digit is checked. A ground corresponding to the second character of the message number is then extended over one of the conductors C1–C0 to level C of switch MMT. If that switch wiper is standing on the contact corresponding to the lead which is grounded, the ground is extended over contacts 723 and lead C422(4) to the corresponding contact on the character counting switch. A similar procedure is then repeated for the units digit of the message number and the ground which is extended over level C of switch MMU, if the message number corresponds to the switch position, is extended past contacts 722 and lead C423(4) to the character counting switch. If ground is not extended over either leads C421, C422 or C423 in the sequence described, a relay in the line circuit is operated to indicate the message number is improper.

With the receipt of a proper message number, the line circuit responds thereto by requesting a register and the message is then processed in a manner described in the previous application. Relay 410 is released in a manner described in the previous application and the sensing relays 910—950 are disconnected on its release.

*EOM detection*

While the message is transmitted over line 5, under control of the transmitter 2222 at the transmitting station, selector magnet 2221 thereat reacts thereto for no purpose. At the end of the message, when the EOM is read, it responds thereto by grounding lead C2244(16) from cam contacts 2233 a number of times corresponding to the number of line feeds which precede the EOM characters NNNN.

Ground from lead C2244(16) is extended over contacts 1611 to energize relay 1620. At the end of the sensing cycle contacts 2233 open, however contacts 2224 have closed so that a locking circuit is completed for relay 1620 through the lower winding of relay 1630 and contacts 1622 to ground on lead C2246(22). Relay 1630 operates in this circuit, when ground is removed from lead C2244(16), to close contacts 1631. At contacts 1634 it energizes relay 1610 which opens contacts 1611 to prevent another line feed character from affecting relay 1620. If the next character read is not a line feed, ground is not extended to lead C2244(16) and as contacts 2224 are then open relays 1620 and 1630 restore.

If the next character is a line feed, lead C2244(16) is grounded, and the upper winding of relay 1630 is energized over contacts 1641 and 1631. Contacts 2284 open during the cycle to restore relay 1620 and the lower winding of relay 1630. At the end of the cycle contacts 2233 open, while contacts 2224 are closed so that the upper winding of relay 1630 energizes over contacts 1621, the lower winding of relay 1640 and contacts 1633 to ground on lead C2246(22). If the next character is not a line feed, ground is not extended on lead C2244(22) while contacts 2224 open to restore the upper winding of relay 1630 and the lower winding of relay 1640. If the next character sensed is a line feed, lead C2244(22) is grounded to energize the upper winding of relay 1640 over contacts 1642, while the upper and lower windings, respectively, of relays 1630 and 1640 are restored. At the end of the sensing cycle the upper winding of relay 1640 locks operated over contacts 1632, the lower winding of relay 1650, and contacts 1643 to ground on lead C2246(22). Succeeding line feed cycles result in reoperation of the upper winding of relay 1640.

If the character following receipt of the line feeds is an N, lead C2242(16) is grounded at contacts 2233. This ground is extended over contacts 1661 and 1651 to energize the upper winding of relay 1650. The lower winding of relay 1650 and the upper winding of relay 1640 are of course deenergized when contacts 2224 open. At the end of the cycle the upper winding of relay 1650 energizes in series with the lower winding of relay 1660 in a manner already described. A succeeding N character results in lead C2242(16) being grounded, and this time the upper winding of relay 1660 is energized over a similar circuit to that already described, while the lower winding of relay 1660 and the upper winding of relay 1650 deenergize. The upper winding of relay 1660 and the lower winding of relay 1670 are energized in series at the end of the cycle over a circuit similar to that already described for other relays.

The third N of the EOM results in the energization of the upper winding of relay 1670 over a circuit similar to that described for other relays, while the lower winding of relay 1670 and the upper winding of relay 1660 are deenergized. At the end of the cycle the upper winding of relay 1670 energizes in series with the lower winding of relay 1680 over a circuit similar to that described for other relays. The last N of the EOM operates the upper winding of relay 1680 over contacts 1683, while relay 1670 and the lower winding of relay 1680 restore. Relay 1680 extends the ground on lead C2242 over contacts 1683, 1682 and 1672 to relay 1750. After the sensing cycle ground is removed from lead C2242(22) and the upper winding of relay 1680 is energized in series with relay 1750 over contacts 1682, 1672, 1813, 1764 and 1719.

At contacts 1751, relay 1750 opens the circuit extending over lead C2204(22) to the clutch magnet of the transmitter 2222 so that the transmitter is stopped. At contacts 1755 and 1759 it connects leads C2241(17) and C2243(17) from contacts 1736 and 1738, respectively, to relays 1820 and 1830, respectively, so that they may operate, if a second message is to be transmitted. At contacts 1752 it provides a holding circuit for either of these relays, when operated.

At the central office the magnet M2 responding to the line feed characters preceding the EOM, extends ground from contacts 305 over contacts 316 to lead LF for operating in a similar manner to that explained for relay 1620, a relay corresponding to 1620 in an EOM detector (not shown) at the central office. A series of relays (not shown) corresponding to relays 1610–1680 are then controlled in a manner similar to that explained for relay 1610–1680 at the station, as the remaining characters of the EOM are received at the central office. Cam contacts 306 furnish a holding ground for the operated relays during the periods when ground is not supplied to either lead LF or lead N during receipt of the EOM. After the last character of the EOM is read, battery is extended to contacts 1274 and 1245 to operate the upper winding of relay 1230. The battery supplied to the upper winding is furnished from a relay (not shown) corresponding to relay 1680. It is operated in the same manner as relay 1680 on transmission of the last character of the EOM.

Relay 1230 energizes its lower winding over contacts 1234 and ground at contacts 1326. At contacts 1235 it connects the lower winding of relay 1240 to the sixth contact of switch MMSEQ level B, and at contacts 1238 it prepares a ground for lead C375(3) and the bias windings of the polar relay 302. At contacts 1232 it extends ground from contacts 1328 and 1372 to energize relays 1040 and 1320 in a manner explained. Relay 1040 operates relay 1050, as explained, and a sequence is now started for operating relays 1130 and 1140 intermittently to energize the clutch magnet of the transmitter 2601, as explained. Switch MMSEQ is stepped, as explained, and each transmitted character is followed by a pause in a manner already explained.

Switch MMSEQ is stepped until it reaches its sixth contact by which time six "0" characters each followed by a pause have been transmitted to each of the stations on line 6. The ground for energizing relay 1130 is then extended over the sixth contact of level B of switch MMSEQ and contacts 1235 to energize the lower winding of relay 1240 instead of relay 1130.

Relay 1240 energizes and opens contacts 1248 to restore relay 1270, which closes contacts 1278. Relay 1240 then energizes its upper winding over a circuit already described. At contacts 1245 it opens the circuit extending between the upper winding of the last operated EOM detection relay and the upper winding of relay 1230. Only the EOM detection chain relay restores, as relay 1230 is held operated over the circuit to its lower winding. At contacts 1241' it completes a circuit extending from lead TFO(4) over contacts 1211' to lead TFC(4) for operating a relay in the line circuit, which initiates blank tape feed out from the reperforator at the line circuit to the tape reader, in a manner described in the previously mentioned application. Relay 1270 operates relays 1010 and 1320 to give rise to an afore-described operation for restoring switch MMSEQ and the various operated relays, as already described.

When the EOM is read at the line circuit tape reader, an EOM relay is operated thereat, as explained in the aforementioned application to open contacts 499. This removes ground from lead C801(8) extending to lead C751(7). This deenergizes relay 720, which removes the ground extending from contacts 753 to the motor magnet of switch MMU at contacts 725. This steps the switch to a succeeding position so that the next message number may be checked. If MMU is in its ninth position, removal of ground also steps switch MMT. If MMT is in its ninth position removal of ground also steps switch MMH.

In the meantime the 6 character control sequence transmitted to each of the stations on line 6, results in the operation of switch MMSEQ1 at each of the stations in a manner already described. When the switch reaches contact 6, ground is extended in a manner already explained, to the wiper B of the switch, past contacts 1754 and 1734 to directly operate relay 1860 at each station except the transmitting station. In the case of the station having transmitted the message, operated relay 1750 thereat extends the ground transmitted from level B of switch MMSEQ1, over contacts 1753 to energize the upper winding of relay 1860. Relay 1860 locks its lower winding over contacts 1862, 1854, 1944 and 1951. At contacts 1864 it opens the holding circuit, if completed, to the upper winding of relay 1840 and that relay restores. At contacts 1866 relay 1860 opens the holding circuits for relays 1720, 1730 and 1810 so that they restore. Relay 1810 opening contacts 1813 restores relay 1750 and relay 1680. Relay 2110 restores, after a period of time in a manner described, and switch MMSEQ1 is stepped home. With relay 1860 operated and relay 1840 restored, circuits can now be completed to relays 1970 and 1980, respectively, to permit message transmission. When the next 4 or 5 character control sequence is received to operate relay 1850, it opens contacts 1854 to restore relay 1860.

*Message transmission to a multipoint station*

A message intended for one of the multipoint stations 1, 2 or 3 is processed at the central office 300 and transmitted to a cross office unit, as described in the aforementioned application. A message received from one of the multipoint stations and intended for another multipoint station is processed in the same manner, with the exception that, a translator coding relay corresponding to each of the stations on a multipoint line is provided instead of one individual to a line or channel. It controls the selection of a desired terminal having access to the line 6. When the coding relay is operated an incoming and outgoing channel check, described in the aforementioned application, is not performed. This is because the incoming message may originate at a station on the same line as a station to which the outgoing message is intended to be sent. After the translation is performed, a cross office unit is associated with the incoming line circuit, and the message transmitted thereto, while a cross office unit outgoing selector switch, such as schematically illustrated by block 550, is associated with the outgoing channel unit, over which the message is to be transmitted.

The outgoing selector switch of a cross office unit having a message intended for a multipoint station is set to a terminal individually coresponding to the particular station. The setting of the cross office unit selector is done as explained in the aforementioned application. Thus in the case of a message intended for a single station line, an outgoing channel unit such as 2300 is provided which serves to process outgoing messages to that line. In the case of multipoint stations, a single outgoing channel unit, such as 2300, is provided, however as certain functions individual to each station are required, selector switch bank terminals individual thereto are provided.

Thus with cross office selector switch 550 set to terminal 3 of a multipoint outgoing channel unit 2300, battery is extended over level B through the key contact individual to the terminal, and over lead C2388(23) to energize relay 2340. This relay operates relay 2320, which in turn causes an outgoing finder link (not shown) to be associated with the outgoing channel unit 2300, and it performs a precedence comparison test to determine which cross office unit is permitted to seize the channel. The outgoing selector switch precedence comparison terminals (not shown) of each station on the multipoint line are multipled so that a unit having the highest precedence message seizes the line regardless of the station to which the message is intended. Ground is then extended from the selected cross office unit level A over a lead individual to the station such as C499(23) to operate relay 2320 corresponding to station 1 and in the outgoing channel unit, or relays 520 or 510 individually corresponding to stations 2 and 3, respectively on line 6. The operated one of the relays such as 2320 or 510 individual to a station operates to provide markings individual to the station on the outgoing channel marking switch MMSDR and to provide a marking on a multichannel outgoing relay unit switch MMREC corresponding to the stations. Thus at contacts 2322, relay 2320 extends ground over lead C2301(15) to a contact individually corresponding thereto on switch MMREC level B, and at contacts 2321 removes ground from conductor C2302(15) to mark a contact individually corresponding thereto on level A of switch MMREC. Likewise relay 510 on operating extends ground at contacts 511 over conductor C599(15) to mark a contact corresponding thereto on switch MMREC level B, and removes ground from contacts 512 to mark conductor C598(15) extending to an individually corresponding contact on level A of switch MMREC accordingly. It will be noted that relay 2320 at contacts 2326 extends ground over lead C2327(27) to operate its slave relay 2710. It closes contacts 2711–2715 for extending markings to the tenth contact of switch MMSDR levels F–K so that a character individual to the desired station is transmitted. Relay 510, when operated, closes contacts 515–519 to extend markings over leads C521(27)–C525(27), individually corresponding to one station for marking contact 10 on switch MMSDR levels F–K.

In this example it will be assumed that the message to be transmitted through unit 2300 is directed to station 3 on line 6 and therefore relay 510 is operated. At contacts 514 it operates relay 670, 680 and 690 in the message number assigner 600 individual to the desired station. They connect markings at contacts 671–675, 681–685 and 691–695, levels B–F, respectively, of the corresponding units, tens and hundreds switches MMU', MMT' and MMH', respectively, over leads U1–U5, T1–T5 and H1–H5, respectively, to contacts 14, 13 and 12, respectively, of levels F–K, respectively, of switch MMSDR. At contacts 515–519 markings individually corresponding to the station, are extended over leads C521(27)–C525(27), respectively, to the contact 10 of levels F–K, respectively, of switch MMSDR. As the first two letters of the channel designation are the same for all stations these characters are permanently marked on contacts 8 and 9 of switch MMSDR. It will be noted that relay 2710 individual to station 1 extends markings from contacts 2711–2715 to contact 10 of levels F–K of switch MMSDR, when it is operated, and relay 2310 at contacts 2327 extends ground from contacts 2539' to operate relay 1550 over lead C2392(15). It connects respective levels of respective units, tens and hundredths message number switches associated with station 1 and not shown, to contacts 14, 13 and 12, respectively, of switch MMSDR levels F–K.

Relay 2370 operates from ground at contacts 2324 or from ground furnished by relay 510 at contacts 513 over lead C520(23) or by relay 520 at contacts 521. At contacts 2378 it extends ground over lead C1401(14), contacts 1414, 1365 to the upper winding of relay 1340 which energizes. Relay 1340 at contacts 1344 connects relay 1350 to the contact 8 of switch MMSEQ level B. At contacts 1341 it extends ground from contacts 1328 and 1372 through contacts 1263, 1354 and 1321 to operate relay 1330. This ground also operates relay 1040 over contacts 1074.

Relay 1040 on operating initiates an aforementioned operation for sending a series of "0" characters each followed by a pause in a manner described. These characters are counted by switch MMSEQ. When switch MMSEQ reaches its fourth contact ground on lead C502(5) it is extended over the fourth contact and contacts 1228 and 1216′ to energize relay 1130 so that the transmitter clutch magnet is again energized to transmit another "0" and switch MMSEQ is again stepped. Relay 1130 receives its operating ground from switch MMSEQ wiper B connected from lead C502(5) to contact 1226, when the switch is on contact 5, and the procedure is repeated. At switch MMSEQ level B contact 6, relay 1130 receives its operating ground from contacts 1236. On switch contact 7 the ground from lead C502(5) is extended through wiper B to lead C1203(8), contacts 836′, lead C899(10) to again energize relay 1130. The character pause procedure is then repeated and switch MMSEQ is stepped to contact 8 at which time ground on lead C502(5) is extended over contacts 1344 to operate relay 1350 instead of relay 1130. At contacts 1357 relay 1350 opens the circuit extending to relay 1070 so that the transmitter clutch magnet circuit is opened at contacts 1072. At contacts 1353 relay 1350 extends the ground on lead C2598(13), past contacts 1369 to maintain relays 1510 and 1520 energized, when contacts 1072 open. At contacts 1356 it prepares a connection from relay 1360 to wiper B of switch MMREC, and at contacts 1358 it prepares a connection from the motor magnet of switch MMREC to wiper A of the switch. At contacts 1355 it prepares a holding circuit for relay 1360, and at contacts 1354 opens the circuit to relay 1330, which starts to restore. Relay 1070 on restoring opens contacts 1074 to open the circuit to relay 1040 which restores to open the circuit for relay 1050. Relay 1330 restores to close contacts 1331, and the transmitter clutch magnet circuit is now completed from contacts 1361, 1351, 1331 and 1511 to lead C1501(26) so that the transmitter 2601 now goes through another cycle. This results in an "0" character being transmitted to the multipoint stations, while the relay 1430 is operated from ground on lead C2609(15) to connect the motor magnet switch MMREC to its A wiper at contacts 1433 and the B wiper of switch MMREC to relay 1360 at contacts 1432.

The motor magnet of switch MMREC energizes from ground at contact N level A, over contacts 1358 and 1433, and at the end of the transmitter cycle, when relay 1430 deenergizes to restore contacts 1433, the motor magnet of switch MMREC deenergizes to step its wipers to their first contacts. The switch continues to step in this manner for each transmitter cycle. If relay 2320, corresponding to the first station on line 6, is operated, ground is removed from conductor C2302(15) extending to the first contact of switch MMREC. Likewise ground is present on conductor C2301(15), and it energizes relay 1360. This will halt further stepping and further transmission, as will be explained. If relay 2320 was not energized, and relay 510 corresponding to the third station on line 6, was energized instead, the motor magnet of switch MMREC energizes from ground at contacts 2321 extended over conductor C2302(15), when the switch reaches its first contact and relay 1430 is operated. Relay 1360 remains unoperated. After relay 1430 restores, the switch is stepped to its second contact. The transmitter goes through another cycle, while the motor magnet of switch MMREC is energized from ground extended to the level A contact 2 under control of relay 520 corresponding to the second station, over lead C597(15). Relay 1360 is energized from ground at contacts 511 extended to lead C599(15) when relay 1430 is again operated. The switch then steps to contact 3 corresponding to station 3. At the stations operations take place simultaneously to permit the now selected station to receive, as will be explained.

Relay 1360 opens the clutch magnet circuit at contacts 1361. Relay 1360 closes contacts 1368 to complete its holding circuit over contacts 1355. At contacts 1365 it opens the energizing circuit for the upper winding of relay 1340. At contacts 1369 it opens another point in a circuit to relay 1070, while restoring relays 1510 and 1520. At contacts 1631′ a circuit extending from battery at relay 2480, through contacts 2515, 2523, 2442 and 2376 and lead C2394(13) is prepared to lead C1392(10), contacts 1045 and lead C1301. At contacts 1364 it extends ground from contacts 1342 past contacts 1422 to energize relay 1320 and relay 1010.

Relay 1010 institutes an aforedescribed procedure for restoring switch MMSEQ. Relay 1320 on operating closes contacts 1329 to complete a homing circuit for the motor magnet of switch MMREC over off-normal springs 1533. At contacts 1326 relay 1340 is restored and the circuit to relay 1350 opens when switch MMSEQ steps. Relay 1350 opens contacts 1355, but relay 1360 remains operated over contacts 1368 and 1411. Relays 1010 and 1320 are held operated until the switches step home from off-normal springs 1257 and 1534, respectively. At contacts 1361′ ground is extended, after relay 1320 restores, from contacts 1326 to lead C1301 and a just-described prepared circuit to operate relay 2480. Ground from contacts 1051 is then extended over contacts 1362 and 1013 to energize relay 1060.

Relay 2480 operates to open contacts 2483 to prevent the completion of a circuit to relay 1070, and at contacts 2481 extends ground from contacts 2531 and 2571 to contacts 2521, lead C2602(15), contacts 1512, 1011 and 1073 to lead C1501(26) to energize the clutch magnet of the markable transmitter 2601. An SOM is transmitted to the now selected station from the markings found on switch MMSDR levels F–K contacts 3–7 in a manner similar to that already explained in the aforementioned application. Simultaneously the cross office unit transmits to the monitor reperforator 2602 in the channel unit 2300, an identifying number as described in the aforementioned application. When the identifying number is transmitted to the monitor reperforator and switch MMSDR is on its eighth contacts, relay 2520 is operated, as explained in the aforementioned application. Relay 2520 locks operated from ground at contacts 1513 forwarded over lead C1565(24), contacts 2487, 2526 and 2539.

Relay 2520 switches the monitor reperforator into a series circuit with the transmitting polar relay 2580 so that the channel number comprising the channel letters, the station designation letter and a message number will be transmitted to the selected station on line 6 and to the monitor reperforator 2602. Markings corresponding to the first two characters of the channel designation are permanently strapped to contacts numbers 8 and 9 of levels F–K of switch MMSDR and these characters are transmitted in a manner described to the selected station. Thereafter the operated relay such as 2320 or 510 individual to the selected station on the line, extends markings in a manner explained, to the tenth contacts of switch MMSDR levels F–K and these markings are transmitted in a manner described, so that page printer at the receiving station prints a character conforming to the markings. Figure shift markings are permanently strapped to contact number 11 of switch MMSDR levels F–K, while contacts numbers 12, 13 and 14 are marked under control of the operated relay such as 2310 or 510, as these contacts are connected over leads H1–H5, T1–T5 and U1–U5, respectively, to the wipers of the corresponding channel number message number register switch such as 600. Thus markings are extended to levels F–K contacts 12, 13 and 14, respectively, of switch MMSDR corresponding to the number assigned this message and that number is transmitted to the selected station in a manner similar to that already described. Thereafter switch MMSDR is stepped to contacts 15 of a letter shift character which is permanently strapped to that contact on levels F–K of the switch is transmitted to the selected station.

The switch MMSDR is then stepped to contacts 16 and a circuit completed to relay 2510 in a manner described in the previously mentioned application. It operates relay 2470 via the ground on lead C1565(23), and relay 2470 closes contacts 2474 to complete a circuit from ground extended by the transmitting cross office unit to lead C579(10) in a manner described in the previous application, contacts 1017 and 1054, lead C1091(23), contacts 2355, 2518′ and 2474, lead C2392(13), contacts 1333, relay 1170, lead C1101(24) to battery at relay 2420. Relay 2470 extends ground past contacts 2472 and 2524 to lead C2591(11) for operating relay 1110. Relay 1170 operates to close contacts 1171, thereby preparing another circuit for relay 1040. Relay 2510 also extends ground from contacts 2516′, through contacts 2459 to lead C2499(10), contacts 1042 and lead C1001(15) to operate relay 1540. It permits the operated relay such as 510 or 520 corresponding to the selected station to be controlled from a cross office unit, which initiates a cancelling procedure as described in the aforementioned application. Thus relay 2510 when it opens contacts 2519 permits relay 2320 corresponding to station 1 to be controlled for a cancellation procedure, as explained in the aforementioned application. Likewise it will be noted that relay 1040, when operated, maintains leads C499(5) and C1002(23) connected together at contacts 1041. This maintains the upper winding of relay 2320 shunted so that a cancellation procedure cannot take place then. Relay 1540 at contacts such as 1541 and 1542 maintains lead C1586(5) connected to lead C1587(5) and lead C1588(5) connected to lead C1589(5), respectively. This prevents relays 510 and 520, respectively, from being controlled on a cancellation procedure. It will be observed that when relays 2510 and 1540 are operated after the above information is sent, that relays 2320, 510 and 520 may be controlled to permit message cancellation, as described in the aforementioned application.

At the multipoint stations 1, 2 and 3, the receipt of the first series of eight "0" characters each followed by a pause as counted by switch MMSEQ, results in the stepping of switch MMSEQ1 at the stations in a manner already explained. When the switches reach their respective eighth contacts, the extended pause thereafter permits relay 2180 to restore. Ground is extended from contacts 1953 past contacts 2184 and level B of switch MMSEQ1 to operate relay 1870. It closes contacts 1872 to provide a holding circuit for itself from ground at contacts 2137 and 1953. It opens contacts 1871 to open one of the circuits for operating relay 1920.

Thereafter the receipt of the characters which are sent, while switch MMREC at the central office is stepped to a position corresponding to the desired station, results in the energization and release of relay 2120 for each transmitted character, as already explained. It closes contacts 2121 to prevent the restoration of relay 2110 and at contacts 2123 it extends ground past contacts 1875 to energize the motor magnet of switch MMREC2. At the end of the first transmitted character, the magnet deenergizes, as relay 2120 restores to step its wipers to their first contacts. This opens the circuit extending from contacts 1851 and level A wiper of switch MMREC2, standing in its normal position, to slow-to-release relay 1920. It starts to restore but the second character arrives to operate relay 2120 to reenergize relay 1920 at contacts 2122 and 1923 before it can restore. Switch MMREC2 continues to step as characters are received from the central office. When relay 1360 was operated switch MMREC in the central office is in a position immediately preceding that corresponding to the desired station. Relay 1360 prevents the transmission of further characters to each of the stations, however the character which is transmitted while relay 1360 is operated, results in switch MMREC2 at each station stepping to a position corresponding to the desired station, as does switch MMREC at the central office. Relay 1920 at each station, therefore, receives no energizing pulse, as relay 2120 does not reoperate when the switches are in the position corresponding to the desired station. At this time the station corresponding to the position to which switch MMREC in the central office was stepped, extends ground from contacts 2015 and 2132 to terminal RS and the level B wiper of switch MMREC2 at that station standing on the contact assigned that station and contacts 1922 to energize relay 1740 at the desired station.

Relay 1740 closes contacts 1741 to complete a holding circuit for itself over contacts 1914 and 1953. At contacts 1743 it disconnects ground from the page printer magnet 1770 and connects lead C2201(22) thereto at contacts 1744 so that the magnet 1770 may be controlled to print the incoming message by the polar relay contacts 2231 as the polar relay 2230 is pulsed in accordance with the received message characters.

During the pause which occurs between the sending of the characters to step switch MMREC2 at each station and the transmission of message characters as previously described, relay 2120 remains restored. This causes relay 2110 to restore and it completes a described circuit to relay 2130. Relay 2130 initiates restoration of switch MMSEQ1, as described, and also completes a homing circuit for switch MMREC2 over interrupting springs 2024, off-normal springs 2025 and contacts 2138. At off-normal springs 2026 a holding circuit is provided for relay 2130, until switch MMREC2 is stepped home. Relay 1870 is restored when relay 2130 operates to open contacts 2137, while relay 1920 is reoperated when switch MMSEQ1 or MMREC2 are home.

When the EOM is detected at the cross office unit, relay 2450 in the outgoing channel unit 2300 is operated in a manner described in the aforementioned application. It releases relay 2470, which in turn releases relay 1110 at contacts 2472. At contacts 2459 it opens the circuit to relay 1540 which restores to prevent relays 510 or 520 to be controlled for a cancellation procedure. At contacts 2452 it prevents relay 2320 to be controlled for cancellation. At contacts 2453 relay 2370 is restored. Relay 2450 at contacts 2452 extends ground over contacts 2375 to lead C601(6) extending to the message number switch 600 and other switches individual to other stations. Ground on lead C601(6) is extended over contact 676 to energize the motor magnet of switch MU′. Relay 670 corresponds to the station, which was selected to receive the outgoing message, and as other message number switch relays such as 670 corresponding to other stations, are not operated, the ground is not extended to their corresponding message number switch motor magnets. Therefore only the message number switch 600 corresponding to the selected station will be stepped. This advances the message number switch for providing markings to contacts 14, 13 and 12 of switch MMSDR so that a succeeding message number is assigned to the next message transmitted to the station. The energized motor magnet returns the energizing ground over contacts 612, lead C602(24) and contacts 2456 to energize relay 2460, If the switch MU' is on contact 1 corresponding to the digit 9, off-normal springs 614 close, so that the energizing ground for MMU' on the succeeding message is also forwarded to energize the motor magnet of switch MT'. It steps when MMU' energizes. Likewise switch MH' energizes, if off-normal springs 634 are closed by switch MT' on its first contact corresponding to the digit 9. Relay 2460 signals the cross office unit to restore, as explained in the aforementioned application. The cross office unit then releases relay 2320, 510 or 520, depending on which was operated. Relay 510, for example, restores relays 670, 680 and 690. Relay 670 opens contacts 676 to step switch MU'. At contacts 2462 ground is extended over lead C2488(13) to energize the lower winding of relay 1370. An EOM is transmitted to the outgoing line 6 and the receiving station under control of the markings on switch MMSDR and thereafter the various channel unit relays release, in the manner explained in the aforementioned application.

Relay 1370 closes contacts 1375 to prepare a circuit for the lower winding of relay 1410, which will be completed when relay 2460 restores. At contacts 1374, its upper winding is operated from ground at contacts 1367. After the EOM is transmitted and relay 2460 restores to open contacts 2462, the lower winding of relay 1370 is deenergized. Contacts 2461 close to extend ground over lead C2487(24), contacts 1425, the lower winding of relay 1410 to battery at contacts 1375. Relay 1410 is energized. At contacts 1411 relay 1410 restores relay 1360. Relay 1360 opens the holding circuit to the upper winding of relay 1370 and restores relay 1060 at contacts 1362. Relay 1370 restores. Relay 1410 energizes its upper winding over contacts 1415 to ground at both contacts 1324 and 1424. With relays 2470, 2480, 2520 and 1360 restored, relay 1070 in the Control Unit 1000 is operated.

At contacts 1412 relay 1410 extends ground over contacts 1074 and 1263, respectively, to energize relays 1040 and 1330. Relay 1130 is therefore energized in a manner explained and the transmission sequence of "0" character each followed by a pause now takes place, in a manner explained, from the central office to the multipoint stations 1, 2 and 3. Relay 1130 is energized in a manner previously explained, as switch MMSEQ steps over its first 7 contacts. On its eighth contact, ground is extended from lead C502(5) past contacts 1345 to energize relay 1130 and an eighth character is transmitted followed by a pause. The switch is then stepped to its ninth contact, where ground on lead C502(5) instead of energizing relay 1130 is extended over contacts 1416 to energize the lower winding of relay 1420. Thus a total of nine "0" characters each followed by a pause is transmitted to stations 1, 2 and 3.

Relay 1420 at contacts 1424 opens one circuit for the upper winding of relay 1410, and at contacts 1425 opens the now incomplete circuit to the lower winding of relay 1410. At contacts 1421 relay 1420 extends ground past contacts 1413 and 1363 to energize relays 1320 and 1010 an aforedescribed release operation now takes place. In addition relay 1320 at contacts 1324 restores the upper winding of relay 1410 so that the relay releases to open the circuit to the lower winding of relay 1420 at contacts 1416. Relay 1420 remains operated over a circuit to its upper winding including contacts 1423 and 1366. It remains operated until relay 1360 is again operated on the selection of a station to receive the next message. It releases relay 1420 at contacts 1366.

At the stations 1, 2 and 3, a sequence of nine characters each followed by a pause is received, and it results in the stepping of switch MMSEQ1 at each station to its ninth position in a manner explained. The ground forwarded, in a manner explained, to the wiper of level B of the switch, is extended to energize relay 1910. Relay 1910 locks operated over contacts 1912, 1873, 1943 and 1951. It closes contacts 1915 to ground magnet 1770 and prevents further characters from being printed. It closes 1911 to forward the ground from the C wiper of switch MMSEQ1 to relay 2140. Relay 2140 energizes relay 2130 to initiate release of switch MMSEQ1. At contacts 1914 the holding circuit for relay 1740 at the receiving station is opened, and it releases to restore the original circuit for the magnet 1770. Relay 1870 reoperating at some later time on the receipt of an eight character control sequence, opens the holding circuit to relay 1910 to restore that relay. This enables another message to be received.

*Outgoing message interruption*

If during the transmission of a message to one station on line 6, a station thereon has a message to send to the central office, a series of characters each followed by a pause must be sent to the station to permit it to transmit to the central office. Likewise under certain other conditions a control sequence must be sent to one of the stations while line 6 is in use. Thus the outgoing message must be interrupted.

Relays 1210, 1220 or 1230 when operated in a manner already explained, indicate possible occasions for outgoing message interruption. Each completes an aforedescribed circuit for relay 1330. It will be recalled that when a message is being transmitted relay 1070 is restored while relay 1170 is operated. Relay 1170 is operated after the transmission of the message number. If any of the above relays 1210, 1220 or 1230 are also operated, then relay 1040 is operated over a previously described circuit, except that contacts 1171 are utilized in place of contacts 1074. At contacts 1041 relay 1040 connects lead C499(23) to lead C1002(23) thereby preventing relay 2320 from being controlled to allow the outgoing message to be cancelled. At contacts 1042 it restores relay 1540 to prevent relays such as 510 from being controlled to permit outgoing message cancellation. Relay 1050 is operated, as before. At contacts 1051 relay 1050 opens the circuit to relay 1060. At contacts 1054 a previously described circuit, using contacts 1332 and the upper winding of relay 1170 instead of 1333 and the lower winding of relay 1170, and extending through relays 2420 and 1170 to the cross office unit relay previously mentioned, is opened, and relay 2420 and the cross office unit relay restore. The relay in the cross office unit on releasing opens the transmitter clutch magnet circuit thereat so that the transmitter steps after sending the character to the outgoing channel unit monitor reperforator 2602 and polar relay 2580.

Relay 1060 releases, after delay long enough to allow the character being transmitted from the cross office unit, to be sent plus time to release relay 2170 at the receiving stations. This relay was operated in an explained manner, when message characters are received at a station. Its release enables aforedescribed operations to be completed for stepping the switches at each station in response to characters transmitted from the central office. Relay 1060 also completes a described circuit to relay 1130 from ground at contacts 1052. Relay 1140 is then energized from contacts 1111 and 1133 and an already described sequence is completed for advancing switch MMSEQ. The channel unit markable transmitter clutch magnet circuit is not completed now, as contacts 1071 are open, however, characters which are transmitted from the cross office unit as part of the message, and which are each now followed by a pause, controlled by the release time of relay 1130 represent a character pause control sequence in the same manner as a character "0" followed by a pause, as will be explained.

Relay 1130 on operating closes contacts 1137 to extend resistance battery through contacts 1144, when relay 1140 is restored, contacts 1112 and 1053 to lead C579(5) to energize the cross office unit relay, which controls the transmitter thereat. It allows a character to be transmitted. Relay 1140 on operating opens this circuit and simultaneously completes a circuit for energizing the motor magnet of switch MMSEQ. Relay 1130 restores, after relay 1140 operates, to step switch MMSEQ. Its restoration time followed by that of relay 1140, determines the period between characters. After release of relay 1140, relay 1130 reoperates and another character is sent, followed by a pause. Thus a series of characters each followed by a pause is transmitted and each time relay 1140 operates to open contacts 1144 the cross office unit transmitter is stopped.

The number of characters transmitted is determined by whether relays 1210, 1220 or 1230 are operated, as previously described, as these relays control when relay 1260 or 1240 is operated. With relay 1240 operated ground over contacts 1151, 1231 and 1242 operates relays 1320 and 1010 and they perform a predetermined release operation. As relay 1130 is restored the cross office unit relay circuit for allowing transmission remains open. When selecting a station to transmit both relays 1260 and 1240 are operated, as 1240 is operated as a result of a 6 character control sequence sent after the last message, while relay 1230 is not operated to restore it. Thereafter switches MMTR1 and MMTR2 are stepped, if relay 1260 is operated, to permit a station to be selected for transmission to the central office. The clutch magnet of the markable transmitter 2601 in the unit 2300 is operated as described on release of relay 1330. Relays 1510 and 1520 are operated over contacts 1262, 1241 and 1132 so that the selection is done in a manner previously explained, by the transmission of "0" characters on a first sequence to step switch MMTR1 succeeded by a character sequence of "0's" each followed by a pause, as already described, to select the station to transmit a message.

When relay 1510 is operated, it opens contacts 1513 to remove ground from lead C1565(24) to release relays 2470 and 2520 in the outgoing channel unit 2300. They remove ground from lead C2591 to restore relay 1110. With relay 1110 restored, contacts 1113 close to prepare a circuit to the cross office unit transmitter control relay through relays 1170 and 2420, however this circuit is held open at contacts 2474.

When the selected station starts transmitting to operate relay 1270 as previously described, relays 1240 and 1260 are restored, as described. It releases relays 1510 and 1520. Circuits to relays 2470 and 2520 are therefore restored, and those relays operate to reoperate relay 1110. Relay 1270 initiates operation of relays 1010 and 1320 and release of switches MMSEQ, MMTR1 and MMTR2 and restoration of relays 1040 and 1050, as described. The circuit to transmitter control relay in the cross office unit is now recompleted and transmission again resumes to the selected receiving station. It will be noted that transmission cannot resume until relay 1330 restores to connect the low resistance relay 1170 in series with the cross office transmitter control relay. It does not restore until some time after relay 1320 restores to open its circuit at contacts 1322. This time interval is therefore sufficient to allow the station switches to be reset in an explained manner.

The aforedescribed sequence may have started at the time the last few characters of an outgoing message were being sent, so that relay 1110 is restored by operation of relay 2530, as described. Operation of relay 1140 is therefore prevented, before the control sequence is completed. The operation of relay 2450, as a result of the EOM signal from the cross office unit completes a circuit to relay 1370, as previously described. It completes a circuit from ground at wiper C of switch MMSEQ on any of its first nine contacts, through contacts 1373 to operate relays 1320 and 1010 to initiate an aforedescribed release operation. The stations then discard the received sequence as all switches are reset in an explained manner, and a new sequence is sent in a manner described.

At the stations the pause introduced by the operation of relay 1050 and the release time of relay 1060 allows relay 2170 to restore. Switch MMSEQ1 at each of the stations is then stepped, as explained, by the transmitted cross office unit characters followed by pauses to operate either relays 1840, 1850, or both, or 1860 at each of the stations. At contacts 1857 ground is extended to magnet 1770 to prevent it from reacting to the following "0" characters which are sent as part of the station selecting sequence in the event magnet 1770 is connected to lead C2201(22). Thereafter relay 1850 is restored, due to operation of relay 2130, as explained. It removes ground from magnet 1770 to allow succeeding message characters to be recorded.

*Interrupting incoming message transmission*

It will be recalled that in the event an incoming message to the Central Office 300 was interrupted, ground was extended from contacts 1244 over contacts 1233 and 1224 to contacts 1214 and lead C1202(8) to operate relay 835. As relay 1240 is not operated, relay 1160 cannot be operated to operate relay 1210. At contacts 836 relay 835 removes ground from lead C1201(12) to restore relay 1270. Relay 1270 on restoring closes contacts 1277 to extend ground over lead C375(3) and thereby prevent polar relay 302 from responding to incoming signals. This prevents garbling of the message at the line circuit reperforator. Relay 835 opens contacts 835′ to remove ground from the contact corresponding to this unit in the banks of the canceled transmission switch 2810 having access to the cancel request unit 800. It connects battery from relay 840, contacts 846 and 837 and lead C2806 to the bank terminal corresponding to this unit in the selector switch 2810. Contacts 837′ extend ground from contacts 849 to operate a relay ST at switch 2810 to start the selector switch in search of unit 800. It operates in a manner described in the aforementioned application for operating a similar switch in search of a cross office unit demanding cancel transmission equipment for cancelling an outgoing message.

When the unit 800 is found, a relay at switch 2810 is operated by the marking battery from relay 840. The cancel transmission selector switch operates a relay ST′ in the cancel transmission unit 2800 and a switch 2859 therein now searches for the selector switch 2810. When the selector switch is found a selection is made of a markable transmitter corresponding in speed to the line circuit reperforator magnet M. Relay 840 is operated when the relay it is in series with connects a low resistance grounded winding thereto. This is all done in a manner similar to that explained for a corresponding cancel transmission operation using a cross office unit as described in the aforementioned application.

Relay 840 on operating closes contacts 843 to extend ground from contacts 845′ over lead C2890 to operate relay 2870 in the cancel transmission unit 2800. This relay, which was not provided in the cancel transmission unit described in the aforementioned application, avoids a precedence comparison test, normally performed by the unit 2800, by operating relay 2850 over contacts 2875 and 2862. At contacts 841 relay 840 also extends ground to the upper winding of relay 845, however, the canceled transmission unit 2800 has already extended ground to lead C2801(28) and contacts 842 to prevent relay 845 from operating at this time. At contacts 845″ lead C350(3) is extended through contacts 848′ to lead C2803(28), contacts 2854 to the signal lead MTD′ of the selected markable transmitter associated with the cancel transmission unit. Lead C350(3) is disconnected from lead C366(3) and the contacts 304 of polar relay 302 at contacts 844.

Relay 2850 closes contacts 2855 to energize the motor magnet switch MMCT from its self-interrupting contacts and off-normal springs 2819. The switch opens its self-interrupting contacts, and takes one step at which time off-normal springs 2819 open and off-normal springs 2820 close to prepare a homing circuit. With switch MMCT level A wiper on its first contact ground is extended to energize the motor magnet of the markable transmitter 2840 associated with the cancel transmission unit 2800. It now goes through a cycle and transmits to its signal lead MTD' the markings on contact 1 of levels C, E, G, J and L in sequence. During each cycle of the transmitter, ground is extended to the motor magnet of switch MMCT at lead CNP. The switch therefore steps at the end of each cycle and extends energizing ground to the clutch magnet of the transmitter from the level A wiper in each of its positions. Thus the markings on switch levels C, E, G, J and L are transmitted through the sequentially closed contacts of the markable transmitter and to lead MTD', contacts 2854, lead C2803, contacts 848' and 845" to lead C350(3) extending to the reperforator magnet M in line circuit 400. It perforates a tape in accordance with a series of characters described in the aforementioned application.

Switch level A continues to energize the motor clutch magnet of the transmitter from each of its contacts, thereafter the wipers of levels B, D, F, H, K and M are associated with their contacts. Level B wiper then extends ground for energizing the clutch magnet of the markable transmitter and transmission continues to the reperforator magnet M in accordance with the markings on levels C, E, F, H, K and M of switch MMCT. When switch MMCT level B is on its second contact, ground from the switch self-interrupting contacts is effective to operate the transmitter motor magnet. When switch MMCT level B reaches its third contact, ground from contacts 2871 is extended past level B to energize the clutch magnet of the transmitter. Thereafter ground from the multipled third to ninth contacts of level B is extended to the markable transmitter, and when the switch steps to contact 10 ground from the switch self-interrupting contacts is again extended to energize the clutch magnet of the markable transmitter. When the switch steps to contacts 11 battery from relay 2850 is extended through contacts 2856, the winding of relay 2860, contacts 2864 and 2873 to the clutch magnet.

Relay 2860 operates in this circuit while the transmitter clutch magnet does not. Relay 2860 closes contacts 2863 and opens contacts 2864 to disconnect the transmitter clutch magnet. Contacts 2863 complete a holding circuit for relay 2860 over contacts 2856 to a holding ground, not shown. It will be noted that in addition to the characters that are sent as described in the aforementioned application, four additional line feed characters and four N characters are also transmitted in sequence while the switch wipers D, F, H, K and M are stepped from contacts 3–10. Thus an EOM is perforated in the tape by the reperforator magnet M and it is sensed by the tape reader so that the line circuit 400 provides appropriate operations. Relay 2860 also complete a circuit for relay RLS over contacts 2875 and 2861 for removing ground from lead C2801(8), for causing release of the equipment and restoration of switch MMCT.

After the sequence is sent ground is removed from lead C2801(8) to cause the upper winding of relay 845 to energize. Relay 845 extends its operating battery through its lower winding, through contacts 848 to lead C881(12) extending to ground at contacts 1244. Relay 845 opens the circuit to relay 840 at contacts 846 and extends ground at contacts 847 over contacts 837 to mark the unit as idle in the selector switch bank. Relay 840 at contacts 841 opens the circuit to the upper winding of relay 845, but it remains operated over its lower winding. At contacts 848' relay 845 disconnects the signal lead from the cancel transmission unit and at contacts 847' prepares an alternate circuit from lead C366(3) to lead C350(3), which is also established when relay 840 restores to close contacts 844. At contacts 845' it removes ground from lead C2890 to restore relay 2870. At contacts 849' relay 845 disconnects lead C751(7) from lead C801(4) to restore an operated relay such as 720 in the message comparator 700, so that the message comparator switch is advanced. This permits the next message number to be checked in a described manner.

In the central office control unit 1000, relay 1220, which operated initially on the message interruption, completes at contacts 1222 a circuit for relays 1330 and 1040, so that relay 1130 is operated and a series of "0" characters, each followed by a pause are transmitted to the stations. Switch MMSEQ is stepped in a described manner to its fourth contact at which time relay 1130 energizes from the switch level B and contacts 1227. Another character is then transmitted and switch MMSEQ stepped to contact 5. On its fifth contact switch MMSEQ energizes relay 1130 over contacts 1225 and 1216' so that another character is transmitted. Switch MMSEQ is then stepped to contact 6. At this time relay 1130 is energized over contacts 1236 and 1227 so that another character is transmitted and switch MMSEQ is stepped to contact 7.

At this time ground from lead C502(5) is extended over contacts 7 level B of switch MMSEQ to lead C1203(8). As relay 835 is operated, this ground is extended over contacts 839 to operate relay 850 instead of as previously described operating relay 1130. Relay 850 closes contacts 851, so that when relay 845 operates to close contacts 846', ground is extended over lead C1204(12) to energize relay 1240. It opens contacts 1244 to release relays 845 and 835. Thus a sequence of seven characters each followed by a pause is transmitted to each of the multipoint stations. Relay 835 restores its contacts to open the circuit to relay 850 at contacts 839. Relay 850 opens contacts 851 to open the circuit to the upper winding of relay 1240, however it is energized over its previously described holding circuit. With relay 1240 operated, relay 1160 is now operated by ground on lead C373(11) to operate relay 1210, and an aforedescribed sequence now takes place for selecting the station to transmit.

At each of the stations on line 6, the receipt of the seven character control sequence steps switch MMSEQ1 thereat in a manner described. When reaching its seventh contact, it extends ground over level B to energize relay 1860 at those stations which are not transmitting, and to energize the lower winding of relay 1760 over contacts 1733 at the station whose message was interrupted. Relay 1760 closes contacts 1766 to forward its operating ground for energizing the upper winding of relay 1860. Relay 1760 energizes its upper winding over contacts 1765 and key contacts 1719. At contacts 1763 it opens an incomplete holding circuit to relay 1980. At contacts 1762 it opens the circuit to the clutch magnet M5 of the transmitter 2222, and at contacts 1761 light a signal lamp. At contacts 1764 it prevents the operation of relays 1680 and 1750 or the completion of holding circuits to either relays 1820 or 1830. Relay 1860 at contacts 1866 opens the holding circuits to relays 1810, 1720 and 1830. At contacts 1863 ground from level C contacts 7 of switch MMSEQ1 at each station is extended to operate relay 2140. Relay 2140 operates relay 2130 and aforedescribed release operations now take place. The operator at the station at which the message is interrupted, must open key contacts 1719 to restore relay 1760 and the operator then backs up the message for retransmission.

In the event an operator desires to cancel a message being transmitted from her associated station, she closes key contacts 1795 to extend ground from contact N level A of switch MMSEQ1, through contacts 1732, already operated by relay 1730, the key contacts 1795 and contacts 1852 to operate relay 1980. Relay 1980 opens contacts 1982 to send the aforementioned blank signals to the central office. This gives rise to an already described canceling sequence.

The foregoing description pertaining to a multipoint or party line telegraph system merely illustrates a preferred embodiment of the invention, the concepts of which are believed to be more fully covered in the following claims.

What is claimed is:

1. In a telegraph switching system wherein a central office has a first line for receiving a message transmitted from one of a plurality of stations common to said line and a second line common to each of said plurality of stations for transmitting signals to each of said plurality of stations, the improvement comprising means at said central office for transmitting successive message characters over said second line to one of said stations, and other means for transmitting over said second line to each of said stations a series of predetermined characters with a time period therebetween different than the time period between said successive message characters whereby said stations are each successively selected to transmit a message to said central office over said first line.

2. A system such as claimed in claim 1, in which said other means comprises a transmitter, and last means for controlling said transmitter to transmit a first series of said predetermined characters over said second line to simultaneously enable any one of said stations to be selected.

3. A system such as claimed in claim 1, in which said other means comprises an arrangement for selecting the last station to transmit a message over said first line to said central office, and means for thereafter selecting another station to transmit signals over said first line to said central office.

4. In a system as claimed in claim 1, means at each of said stations for interrupting a message in transmission and for signalling said central office accordingly, and means at said central office thereafter operated for transmitting a series of said predetermined characters over said second line for indicating to the station from which said message originated of its interruption.

5. In an automatic telegraph switching system wherein a plurality of stations are connected over a common line to a central office to enable the transmission of a message to said central office and said stations are connected over another common line to said central office to enable said central office to transmit a message to one of said stations, the improvement comprising first means at said central office responsive to a signal supplied by one of said stations over said first line for transmitting a predetermined character a plurality of times each followed by a time period longer than the period between ordinary message characters to form a control message transmitted over said other line simultaneously to all of said stations, and means thereafter effective to permit a station to transmit a message over said first line to said central office.

6. A system such as claimed in claim 5, in which said first means comprises an arrangement for transmitting said control message in a plurality of series of said predetermined character.

7. A system such as claimed in claim 5, in which said first means is responsive to a signal of one type supplied by one of said stations for transmitting a corresponding type of control message and in which said first means is responsive to a signal of another type supplied by one of said stations for transmitting another type of control message.

8. In a system such as claimed in claim 7, control means at said central office operated responsive to a signal of said other type from one of said stations for interrupting transmission of a message over said first line.

9. A system such as claimed in claim 8, in which said control means comprises means operated for transmitting a special control sequence to said stations.

10. In a telegraph switching system having a switching center, a plurality of stations, a first line extending from said plurality of stations to said switching center, a second line extending to said plurality of stations, initiating means at each station responsive to any one of said stations preparing a message for transmission for first transmitting a request-to-transmit signal over said first line to said switching center, transmitting means at said switching center for transmitting to each of said stations a series of predetermined characters over said second line to form control signals, means at the switching center operated in response to said request-to-transmit signal received over said first line, for controlling said transmitting means to transmit one series of said characters to prepare said stations for transmission over said first line, means at said switching center following said transmission of said one series of characters for controlling said transmitting means to transmit another series of said predetermined characters over said second line to successively enable said stations for transmission over said first line and means at said central office effective on the transmission of a signal over said first line in response to one of said stations being enabled to transmit for enabling a message to be received at said switching center only from said one station.

11. In a telegraph switching system having a switching center, a plurality of stations, a first line extending from said plurality of stations to said switching center, a second line extending from said switching center to all said stations, initiating means at each station responsive to any one of said stations preparing a message for transmission for first transmitting a request-to-transmit signal over said first line to said switching center, means at said switching center operated in response to the receipt of said request-to-transmit signal for transmitting a number of control signals from said switching center over said second line to said stations, a switch at each station stepped in response to the receipt of said control signals to a position corresponding to the station which last transmitted a message to said central office, means at each station operated by each switch in response to its being in said position for preparing its associated station to transmit a message, means at said switching center following said transmission of said first control signals for thereafter transmitting a number of control signals of another type over said second line whereby one of said stations is enabled to transmit a message to said central office, and means at said central office effective on the transmission of a signal over said first line in response to one of said stations being enabled to transmit for enabling a message to be received at said switching center only from said one station.

12. In a telegraph switching system having a switching center, a plurality of stations, a first line extending from said plurality of stations to said switching center, a second line extending from said switching center to said station, initiating means at each station responsive to any one of said stations preparing a message for transmission for first transmitting a request-to-transmit signal over said first line to said switching center, means at said switching center operated in response to the receipt of said request-to-transmit signal for transmitting a number of control signals comprising the successive transmission of one predetermined character from said switching center over said second line to said stations, a switch at each station stepped in response to the receipt of said control signals to a position corresponding to the station which last transmitted a message to said central office, means at each station operated by each switch when in said position for preparing its associated station to transmit a message, means at said switching center following said transmission of first control signals for thereafter transmitting a number of control signals of another type in accordance with the number of said stations whereby one of said stations is enabled to transmit a message to said central office, and means at said central office effective on the transmission of a signal over said first line in response to one of said stations being enabled to transmit for enabling a message to be received at said switching center only from said one station.

13. In an automatic telegraph system of the type wherein any one of a plurality of stations having a common connection to a central office may transmit a message having an end of message indication to said central office and an arrangement whereby a message in the process of being transmitted may be interrupted to permit another message to be transmitted to said central office, the improvement comprising means at said central office operated on the interruption of said message, canceling equipment controlled by said operated means for providing an end of message indicator to said interrupted message, means operated by said operated means for transmitting a control message to one of said stations for indicating that said first message is interrupted, and means operated immediately after said end of message indicator is provided and said control message is transmitted for releasing said first means.

14. A telegraph switching system including a central office with apparatus for automatically routing a telegraph message having a start of message indicator and a precedence designation through said central office in accordance with a routing indicator in said message corresponding to a station, a line from said central office extending to a plurality of stations whereby a message having a start of message indicator is transmitted to the station corresponding to a routing indicator in said message, canceling equipment for canceling said message in the event a message having a higher precedence designation has a routing indicator corresponding to any of said plurality of stations, means individual to each of said stations and common to said line operated by said apparatus when a message having a routing indicator representing one of said stations is routed through said office for rendering said canceling equipment ineffective to cancel said message while said start of message indicator is transmitted.

15. In an automatic telegraph system of a type wherein a message having one precedence and preceded by a start of message indicator is transmitted from a central office over one line to one of a plurality of stations connected to said line, canceling equipment operated to cancel said message in the event another message having another precedence is awaiting transmission over said line, and means associated with said line for preventing operation of said canceling equipment to cancel said first message during transmission of said start of message indicator over said line.

16. In an automatic telegraph system of a type wherein a message having one precedence and preceded by a start of message indicator is transmitted from a central office over one line to one of a plurality of stations connected to said line, canceling equipment operated to cancel said message in the event another message having another precedence is awaiting transmission over said line, means associated with said line for preventing operation of said canceling equipment to cancel said first message during transmission of said start of message indicator over said line, and means for preventing the operation of said canceling equipment for canceling said first message during transmission of an end of message indicator in said first message over said line.

17. In a telegraph switching system of the type wherein a variable number of stations have a common connection to a central office and wherein control message characters each followed by a pause of predetermined time duration are transmitted to said stations, the improvement comprising means for transmitting a number of message characters each followed by a pause and a number of message characters which are not followed by a pause, and means for varying the number of said characters in accordance with the number of stations.

18. In a telegraph system, a central office, an outgoing multi-station party line extending from said central office and having a plurality of stations commonly connected to said outgoing line, apparatus in said central office for automatically routing received telegraph messages over said outgoing line to said stations, each of said stations being assigned an individual station routing indicator for controlling the routing of the telegraph messages thereto, selecting means operated by said apparatus in response to the receipt of a telegraph message having a station routing indicator designating any one of said plurality of stations for seizing said common outgoing line and for selecting a particular one of said stations corresponding to the individually assigned station routing digit included in said received telegraph message, a number assigning means individual to each said station at said central office for assigning a message number to each telegraph message transmitted to the corresponding station over said common outgoing line, means responsive to said seizure of said outgoing line and said selection of said particular one station by said selecting means for operatively connecting the particular one of said number assigning means individual to said selected particular one station to said outgoing line, means responsive to said connection of said one operatively connected number assigning means to said common outgoing line for operating said connected one of said number assigning means to assign a message number to said received telegraph message for transmission to said selected particular one station, said assigned message number being dependent upon the number of telegraph messages previously transmitted over said common outgoing line to said selected particular station, and means including said apparatus responsive to said selection of said particular one station for enabling only said particular one station to receive said telegraph message including said assigned message number on transmission of said telegraph message over said common outgoing line.

19. In a telegraph switching system having a central office for receiving and transmitting telegraph messages, a plurality of stations for receiving and transmitting telegraph messages, a multi-station party line connected to all said stations and extending to said central office; initiating means at each said station independent of control from said central office or any prior telegraph message transmission and controlled solely by the preparation of a telegraph message thereat for first transmitting a request-to-transmit signal over said line to said central office, a first means at said central office operated in response to the receipt of said request-to-transmit signal from any one of said stations, and means effective in response to the operation of said first means for enabling only a particular station on said multi-station party line to transmit its prepared telegraph message to said central office.

References Cited in the file of this patent

UNITED STATES PATENTS

| | | |
|---|---|---|
| 2,451,045 | Potts | Oct. 12, 1948 |
| 2,501,063 | Levin | Mar. 21, 1950 |
| 2,545,207 | Martindell | Mar. 13, 1951 |
| 2,599,344 | Oberman | June 3, 1952 |
| 2,667,533 | Zenner | Jan. 26, 1954 |
| 2,677,011 | Burwell | Apr. 27, 1954 |
| 2,766,318 | Bacon | Oct. 9, 1956 |
| 2,796,460 | Andres | June 18, 1957 |
| 2,805,283 | Stiles | Sept. 3, 1957 |
| 2,871,286 | Bacon | Jan. 27, 1959 |